US006400964B1

(12) United States Patent
Zicker et al.

(10) Patent No.: US 6,400,964 B1
(45) Date of Patent: *Jun. 4, 2002

(54) MODULE FOR PROVIDING WIRELESS CALL COMMUNICATION SERVICES THROUGH WIRE-CONNECTED TELEPHONE EQUIPMENT

(75) Inventors: Robert G. Zicker; John K. Dion, both of Roswell, GA (US)

(73) Assignee: GTE Wireless Service Corporation, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/723,649

(22) Filed: Nov. 27, 2000

Related U.S. Application Data

(60) Continuation of application No. 09/575,769, filed on May 22, 2000, now Pat. No. 6,243,593, which is a continuation of application No. 09/241,814, filed on Feb. 1, 1999, now Pat. No. 6,151,510, which is a continuation of application No. 09/010,429, filed on Jan. 21, 1998, now Pat. No. 5,878,344, which is a continuation of application No. 08/721,812, filed on Sep. 27, 1996, now Pat. No. 5,832,378, which is a division of application No. 08/201,445, filed on Feb. 24, 1994, now Pat. No. 5,594,782.

(51) Int. Cl.[7] .............................. H04B 1/38; H04Q 7/20; H04M 3/00; H04M 3/42

(52) U.S. Cl. ........................ 455/553; 455/426; 455/552; 455/419; 455/445; 455/414

(58) Field of Search ................................. 455/553, 552, 455/426, 419, 418, 550, 551, 74.1, 414, 462, 465, 403; 379/56.2

(56) References Cited

U.S. PATENT DOCUMENTS

| 4,737,975 A | 4/1988 | Shafer | 379/58 |
| 4,864,599 A | 9/1989 | Saegusa et al. | 379/61 |

(List continued on next page.)

FOREIGN PATENT DOCUMENTS

JP 4162429 6/1992 ................. 7/26

OTHER PUBLICATIONS

"Wireless Rural Telephony: A Study of the Application of Wireless Digital Loop Carrier To Upgrade Rural Multi–Party Services", Paul E. Clements, Telecommunications and Pacific Development: Alternatives for the Next Decade, PCT'88, pp. 553–560;.

"BETR: Digital Radio In The Local Loop", Paul Clements, TE& M, Aug. 15, 1988, pp. 90–93.

(List continued on next page.)

Primary Examiner—Tracy Legree
(74) Attorney, Agent, or Firm—James K. Weixel

(57) ABSTRACT

A multiple mode, personal, wireless communications system exists within a radiotelephone network serving general customers and provides additional services to a select group of customers. The system uses handsets (32) which automatically switch between a standard cellular radiotelephone mode of operation (1901) and an enhanced cordless mode (1420) when the handsets (32) are within range of pico cells (26) that are interconnected to the public switched telephone network (20). Each pico cell is controlled via a framework of overlay cells (10b) that operates independently of the radiotelephone network and uses a unique control protocol on a small number of reserved cellular channels. Each pico cell consists of a spectrally dynamic, non-capturing, frequency agile, multi-purpose base station (26) provided at customer-selected locations to cooperate with the overlay cell framework. Each pico cell is capable of supporting multiple handsets (32) and uses low power operation that achieves limited coverage. Each pico cell reduces traffic on the standard cellular radiotelephone network by independently handling registered handsets (32). An alternate line option module (22) provides wireless local interconnect capability to selectively route call traffic between land lines (24) and the standard cellular radiotelephone network. Service control units (12) and host stations (17) facilitate wireless activation and control of each pico cell and handset (32) via the overlay cell framework.

45 Claims, 32 Drawing Sheets

U.S. PATENT DOCUMENTS

| | | | |
|---|---|---|---|
| 4,922,517 A | 5/1990 | West, Jr. et al. | 379/58 |
| 4,959,851 A | 9/1990 | Tobolski, Jr. et al. | 3798/59 |
| 4,972,457 A | 11/1990 | O'Sullivan | 379/59 |
| 4,991,197 A | 2/1991 | Morris | 379/58 |
| 5,046,082 A | 9/1991 | Zicker et al. | 379/59 |
| 5,117,450 A | 5/1992 | Joglekar et al. | 379/58 |
| 5,127,042 A | 6/1992 | Gillig et al. | 379/59 |
| 5,247,565 A | 9/1993 | Joglekar | 379/58 |
| 5,260,988 A | 11/1993 | Schellinger et al. | 379/59 |
| 5,297,191 A | 3/1994 | Gerszberg | 379/59 |
| 5,297,192 A | 3/1994 | Gerszberg | 379/59 |
| 5,404,579 A | 4/1995 | Obayashi et al. | 455/57 |
| 5,475,735 A | 12/1995 | Williams et al. | 455/417 X |
| 5,479,480 A | 12/1995 | Scott | 379/59 |
| 5,485,505 A | 1/1996 | Norman et al. | 379/58 |
| 5,504,803 A | 4/1996 | Yamada et al. | 379/59 |
| 5,526,402 A | 6/1996 | Dent et al. | 455/74.1 |
| 5,526,403 A | 6/1996 | Tam | 379/59 |
| 5,544,227 A | 8/1996 | Blust et al. | 379/63 |
| 5,594,779 A | 1/1997 | Goodman | 379/59 |
| 5,610,970 A | 3/1997 | Fuller et al. | 379/57 |

OTHER PUBLICATIONS

"Telco tries wireless system for local loop", Art Biggs, Telephone Engineer & Management, Oct. 1, 1985, pp. 123–125;.

"Applications of Wireless Technology in the Local Loop in Hungary", ICPWC'94, IEEE 1994, pp. 60–63.

"Introduction Of Radio Technology Into The Local Loop", Paul Donovan, 1992 IEEE, pp. 1828–1832; "Deploying Wireless Technology In the Local Loop", Kevin Dick, Telesis Issue No. 94, pp. 71–79.

"Servicing Cordless Telephones", Christopher Kite, Radio –Electronics, May 1985 Issue; pp. 77–80 and p. 118;.

"New Wireless Digital Carrier System for Rural Local Loop", D. Venkatasubbiah, Telecommunications Jun. 1990, pp. 24–29.

"Evolution of Wireless Access Techniques for locat loop and rural applications—Network and Switching Impacts", Martin C. Sanne, Proceedings of 1992 International Conference on Communication Technology (ICCT'92), 7 pages.

"Fixed Wireless Access: A Cost Effective Solution for Local Loop Service in Underserved Areas", David L. Jones, 1992 IEEE International Conference On Selected Topics in Wireless Communications, Jun. 25–26, 1992, pp. 240–244.

"Wireless Digital Carrier For the Rural Local Loop", Paul E. Clements, TE&M, May 15, 1987, pp. 82–85;.

FIG. 28

A. OHD WORD 1 — 2801

| T1T2 = 11 | DCC | SID1 | RSVD = 000 | NAWC = 0010 | OHD = 110 | PARITY |
|---|---|---|---|---|---|---|
| 2 | 2 | 14 | 3 | 4 | 3 | 12 |

B. OHD WORD 2 — 2802

| T1T2 = 11 | DCC | S=1 | E=1 | REGH=1 | REGR=0 | DTX=00 | N-1 | RCF=1 | CPA=1 | CMAX-1 | END=0 | OHD=111 | PARITY |
|---|---|---|---|---|---|---|---|---|---|---|---|---|---|
| 2 | 2 | 1 | 1 | 1 | 1 | 1 | 5 | 1 | 1 | 7 | 1 | 3 | 12 |

C. OHD WORD 3 — 2803

| T1T2 = 11 | BASE SERIAL NO. | END = 1 | OHD = 000 | PARITY |
|---|---|---|---|---|
| 2 | 22 | 1 | 3 | 12 |

D. OHD CONTROL FILLER WORD — 2804

| T1T2 = 11 | DCC | 010111 | CMAC | RSVD = 00 | 11 | RSVD = 00 | 1 | WFOM = 1 | 1111 | OHD = 001 | PARITY |
|---|---|---|---|---|---|---|---|---|---|---|---|
| 2 | 2 | 6 | 3 | 2 | 2 | 2 | 1 | 1 | 4 | 3 | 12 |

E. COMMAND WORD 1 — 2805

| T1T2 = 01 | DCC | MIN 23-0 | PARITY |
|---|---|---|---|
| 2 | 2 | 24 | 12 |

F. COMMAND WORD 2 — 2806

| T1T2 = 10 | SCC = 11 | MIN 33-24 | RSVD = 0 | LOCAL = 00000 | ORDQ = 001 | ORDER = 11110 | PARITY |
|---|---|---|---|---|---|---|---|
| 2 | 2 | 10 | 1 | 5 | 3 | 5 | 12 |

G. COMMAND WORD 2 — 2807

| T1T2 = 10 | SCC = 11 | MIN 33-24 | RSVD = 0 | LOCAL = XX111 | ORDQ = 000 | ORDER = 11110 | PARITY |
|---|---|---|---|---|---|---|---|
| 2 | 2 | 10 | 1 | 5 | 3 | 5 | 12 |

H. COMMAND WORD 2 — 2808

| T1T2 = 10 | SCC = 11 | MIN 33-24 | RSVD = 0 | LOCAL = 10NNN | ORDQ = 000 | ORDER = 11110 | PARITY |
|---|---|---|---|---|---|---|---|
| 2 | 2 | 10 | 1 | 5 | 3 | 5 | 12 |

I. COMMAND WORD 2 — 2809

| T1T2 = 10 | SCC = 11 | MIN 33-24 | RSVD = 0 | LOCAL = 11NNN | ORDQ = 000 | ORDER = 11110 | PARITY |
|---|---|---|---|---|---|---|---|
| 2 | 2 | 10 | 1 | 5 | 3 | 5 | 12 |

--- START OF WORD
COMMAND WORD 1

A.
| T1T2 = 00 | DCC = 11 | SERIAL NUMBER = 00 + 22BITS | PARITY |
|---|---|---|---|
| 2 | 2 | 24 | 12 |

2901

COMMAND WORD 1

B.
| T1T2 = 01 | DCC = 11 | SERIAL NUMBER = 00 + 22BITS | PARITY |
|---|---|---|---|
| 2 | 2 | 24 | 12 |

2902

COMMAND WORD 2

C.
| T1T2 = 10 | SCC = 11 | MIN 2 = 000..000 | RSVD = 0 | LOCAL = 10010 | ORDQ = 000 | ORDER = 11110 | PARITY |
|---|---|---|---|---|---|---|---|
| 2 | 2 | 10 | 1 | 5 | 3 | 5 | 12 |

2903

COMMAND WORD 2

D.
| T1T2 = 10 | SCC = 11 | MIN 2 = AAZZ..ZZZ | RSVD = X | LOCAL = 10011 | ORDQ = 000 | ORDER = 11110 | PARITY |
|---|---|---|---|---|---|---|---|
| 2 | 2 | 10 | 1 | 5 | 3 | 5 | 12 |

2904

COMMAND WORD 2

E.
| T1T2 = 10 | SCC = 11 | MIN 33-24 | RSVD = 0 | LOCAL = 11110 | ORDQ = 001 | ORDER = 11110 | PARITY |
|---|---|---|---|---|---|---|---|
| 2 | 2 | 10 | 1 | 5 | 3 | 5 | 12 |

2905

COMMAND WORD 3

F.
| $T_1T_2$ | PARAMETER INFO. | PARITY |
|---|---|---|
| 2 | 26 | 12 |

MODULE FOR PROVIDING WIRELESS CALL COMMUNICATION SERVICES THROUGH WIRE-CONNECTED TELEPHONE EQUIPMENT

RELATED PATENTS

The present application is a continuation of "Module For Providing Wireless Call Communication Services Through Wire-Connected Telephone Equipment" by Robert G. Zicker, Ser. No.: 09/575,769, filed May 22, 2000 now U.S. Pat. No. 6,243,593; which is a continuation of "Module For Providing Wireless Call Communication Services Through Wire-Connected Telephone Equipment" by Robert G. Zicker, U.S. Ser. No. 09/241,814 filed Feb. 1, 1999 issued Nov. 21, 2000 as U.S. Pat. No. 6,151,510; which is a continuation of "Module For Selectively Providing Wireline And Wireless Call Communication Services," by Robert G. Zicker, U.S. Ser. No. 09/010,429 filed Jan. 21, 1998 now U.S. Pat. No. 5,878,344; which is a continuation of "Module For Selectively Providing Wireline And Wireless Call Communication Services," by Zicker et al U.S. Ser. No. 08/721,812 filed Sep. 27, 1996, now U.S. Pat. No. 5,832,378; which is a divisional of "Multiple Mode Personal Wireless Communication System," by Zicker et al U.S. Ser. No. 08/201,445 filed Feb. 24, 1999 now U.S. Pat. No. 5,594,782.

BACKGROUND OF INVENTION

1. Field of Invention

The present invention relates to an improved wireless communications system. More particularly, the preferred embodiment of the invention concerns a multiple mode communications system, including special handsets designed to operate with standard analog or digital protocols when within the coverage of a standard cellular radiotelephone network, and to automatically switch to an enhanced cordless mode that operates with unique protocols when within the coverage area provided by independent, low power "pico" cells that are connected to the wireline telephone network. Pico cells are provided at customer selected locations to cooperate with a framework of overlay cells that operate independently of the cells of the cellular network.

This overlay cell framework allows the service provider to exercise complete control over the operation of each special handset and the pico cell system by means of service control units and host stations. The standard cellular system can be further enhanced by the addition of zone identifier overhead messages which are ignored by standard handsets but interpreted by the special handsets to inform those customers continuously of the special handset's current operating mode.

2. Description of Related Art

There has long been a recognized need for ubiquitous telecommunications services wherein each customer is assigned a personal service number and provided with suitable equipment which will permit the customer to have two-way communication capability (i.e., the ability to make and receive calls) regardless of the customer's changing location.

Systems that extend beyond traditional wireline telephone service have been developed in order to more closely achieve this capability from a technical perspective. For example, recent innovations in paging, standard cordless within the home telephone service, cellular telephone service and personal communications systems are well known. The designs of such systems all comprise efforts to cost effectively satisfy the need for ultimate ubiquitous service. However, each system has well recognized technical and cost disadvantages which cause it to fall short of providing ubiquitous telecommunications service.

Accordingly, a need still exists for an improved communications system that comes closer to providing ubiquitous communications service to customers than existing systems.

RELATED PATENTS

The following U.S. Patents assigned to the assignee of the present invention were issued to Robert G. Zicker et. al. and are related to this invention to the extent that they relate generally to improvements in telecommunications systems or service:

| U.S. Pat. No. | Title |
| --- | --- |
| 5,046,082 | Remote Accessing System for Cellular Telephones |
| 5,144,649 | Cellular Radiotelephone Credit Card Paystation Method |
| 5,159,625 | Method of Selecting the Cellular System with Which a Cellular Mobile Radiotelephone Communicates |
| 5,220,593 | Cellular Radiotelephone Credit Card Paystation Method |
| 5,247,564 | Adaptive Vehicle Alarm Detection and Reporting System |
| 5,247,160 | Method for Transmitting Credit Card Information for a Group of Passengers |

SUMMARY OF INVENTION

Therefore, it is an object of this invention to provide an improved telecommunications system which more completely meets customer needs for low cost, ubiquitous telecommunications service.

It is another object of the invention to provide an improved telecommunications system, designed to include a standard cellular network, and which further includes a network of overlay cells that operate independently of the cells of the cellular network.

It is a further object of the invention to provide, in such a system, a multi-channel pico station at each customer location that, in turn, supports multiple portable telephone handsets, with each handset being capable of operating in a wireless or pico mode when within the customer premises, and in a standard cellular mode when away from the customer premises and yet within the cellular coverage area.

It is yet a further object of the invention to provide such an improved telecommunications system wherein call forwarding capability is provided in conjunction with distinctive ring so that a customer with a portable personal handset selected to operate in one of the dual modes can receive and readily identify incoming calls, directed to the assigned cellular customer number, through the unselected or inactive mode of the system.

It is yet another object of the invention to provide automatic registration and control of such a dual mode portable handset, without customer action, and with the customer being provided with a display advising the status or mode which the handset is set to operate in at any time, so that the customer can make informed, cost-effective decisions as to call placement.

It is another object of the invention to provide in a dual mode system using one radio per handset, a mode of operation based upon a unique, though cellular compatible, protocol that permits easy dynamic channel allocation and occupancy.

It is another object of the invention to provide an alternate line option capability which permits selective allocation of call traffic between the customer premises and the cellular network.

These objects and other features and advantages of the invention are attained in a telecommunications system that is designed to operate in conjunction with a standard cellular network having multiple cell sites of either analog or digital configuration and embodying standard geographical coverage. The system also includes a comparable network of overlay cells that operate independently of the standard cell sites of the cellular network. Alternatively, the system could be used within a radiotelephone network of other character, such as an SMR network, for example.

Preferably, each overlay cell provides radio communication coverage to a geographical area that corresponds generally to the cellular site area, but on a set of reserved cellular frequencies that are selected with the maximum possible separation with respect to the assigned cellular network signaling frequencies, so as to be non-interfering.

To cooperate with the overlay cells a base station, referred to hereinafter as a pico station, is provided at each customer site. Each pico station is designed to support up to six improved portable handsets which function in dual modes. In a first mode each handset functions as a normal portable network or cellular telephone, when it is physically removed from the proximity of the pico station. A second wireless mode of operation is described herein for the handsets of the system which has been referred to herein as enhanced cordless on the first iterations and will be referred to as the pico mode in subsequent usage. The enhanced cordless mode of this invention differs from the operation of standard cordless telephones in several respects. This system employs a unique burst mode s communication control protocol between the handsets and the pico station which is not found in standard cordless operation. This protocol is compatible with cellular standards to permit dual mode operation which would not be possible with standard cordless. Moreover, the standard cordless frequency arrangement is obviously different from cellular frequencies used in this system. Other differences will become apparent from the description that follows, which result in operational improvements in the service offered.

The use of the unique protocol of this system permits remote activation and control using the 10 k bit Manchester encoded data pathway inherent in cellular telephone hardware. Therefore, when dose to the pico station, the handset operates as a cordless telephone supported by the pico station via a connection to the house PSTN wiring.

In the preferred mode, call delivery is provided through a link that may also include an alternate line option module connected between the pico station and the PSTN. With that arrangement, service can be provided through direct access from the pico station to the public switched telephone network, or alternatively, service from the pico station can be selectively redirected back to the cellular network by the radio of the alternate line option module. A significant advantage of the system arises from the capability of allocating selected portions of call traffic between these two paths, in order to accommodate call capacity and varying call demand. This permits deployment of the system in areas with limited cellular capacity, without necessitating rationing of service.

Service control units and a host station are provided to facilitate set up and control of the portable handsets and pico stations using remote programming techniques which were not previously practical.

Each handset includes components comparable to that of a standard analog cellular telephone having one radio transceiver. In addition, the handset has added software to permit it to operate in the pico mode, in cooperation with the pico station located at the customer premises. As an alternative to analog technology, the modified handsets can embody compatible digital technology, again with the same necessary additions or modifications to support pico operation.

After initial set-up, each handset employs a process to identify when it is in the general neighborhood of its authorizing pico station. Only then will the handset seek out its authorizing pico station by periodically transmitting a signal to determine if it is within acceptable communication range. If the pico station receives an acceptable level handset signal, it responds and exchanges registration information with the handset to establish or register the handset in the pico mode.

The handset then sends a message to the cellular system upon which it also operates, directing that all incoming calls subsequently attempted on the cellular network be forwarded to this authorizing pico station telephone number (this may be the customer home PSTN number). Finally, the handset is switched to the pico mode and sends a response control message to the pico station indicating that it is "home" and in service. At that time, a message on the handset display indicates to the user that the handset is in the pico mode, as opposed to the cellular mode.

When in the pico mode, the system operates at a lower power level on selected, reserved cellular channels with the same basic technical standards as analog AMPS type cellular systems. During this mode, the pico station can and does function as a telecommunications base station with no hand-off capability.

Up to six handsets may be registered with the pico station. In the preferred embodiment only one handset may transmit at any one time. However, the system supports the capability for other handsets to join calls in progress. The handset to pico station link is accomplished at very low power levels during call activity, which results in low battery drain.

The pico station is connected directly to home telephone wiring for call delivery, but is always controlled via a radio frequency link to a service control unit and an overlay host station located within the network area. When the handset is carried out of range of the pico station in an operating state, it automatically switches back to the cellular mode and cancels any existing call forwarding.

It should be noted that operation of the special handsets and overlay network of the invention is transparent to, and will not interfere with, standard cellular network operations.

BRIEF DESCRIPTION OF THE DRAWINGS

FIG. 28 is a bit assignment chart of pico station message formats for forward control channel overhead and registration command words for components of the system operating in the pico mode;

FIG. 29 is a bit assignment chart of pico station message formats for forward control channel call processing commands and authorization command words for components of the system operating in the pico mode;

DETAILED DESCRIPTION OF THE INVENTION

Systems Overview

The system of the invention includes a combination of elements that produce economical, convenient telecommunications services in the home, or at another customer site, as well as when the customer is away from the home site.

From the service provider point of view, the system of the invention is designed to provide a special service to a select group of customers, and yet operate in conjunction with and within a standard radiotelephone network such as a cellular network of either analog or digital configuration that concurrently supports regular cellular customers. In addition, the system generally includes an overlay cell network generally corresponding to the cell sites within the cellular standard network. The overlay cell network provides radio communication coverage to a geographical area that generally corresponds to the cellular site area, but on a set of reserved cellular frequencies that are selected with the maximum permitted separation with respect to the cellular signaling frequencies, so as to be non-interfering. A pico station is provided at each selected customer site to interact with a conveniently located overlay cell. The pico station receives calls from a special handset and transfers these calls through the house wiring to the PSTN. In this manner, the system is capable of supporting a wireless or pico mode of operation for the select group of customers when they are at their home or service site, in addition to the service provided on the standard network.

The improved wireless communications system is capable of supporting multiple, dual mode telephone handsets associated with each pico station, with each handset being capable of operating in a pico mode when within the customer premises; and capable of operating in a standard or cellular mode when located away from the customer premises, and yet still within the standard or cellular network coverage. The advantage of this system is that it is able to handle a substantial increase in call traffic since it permits efficient utilization of all the facilities of the system.

The pico stations are spectrally dynamic, non-capturing, network transparent, personal pico cells within the network.

System Components

Figure 1:
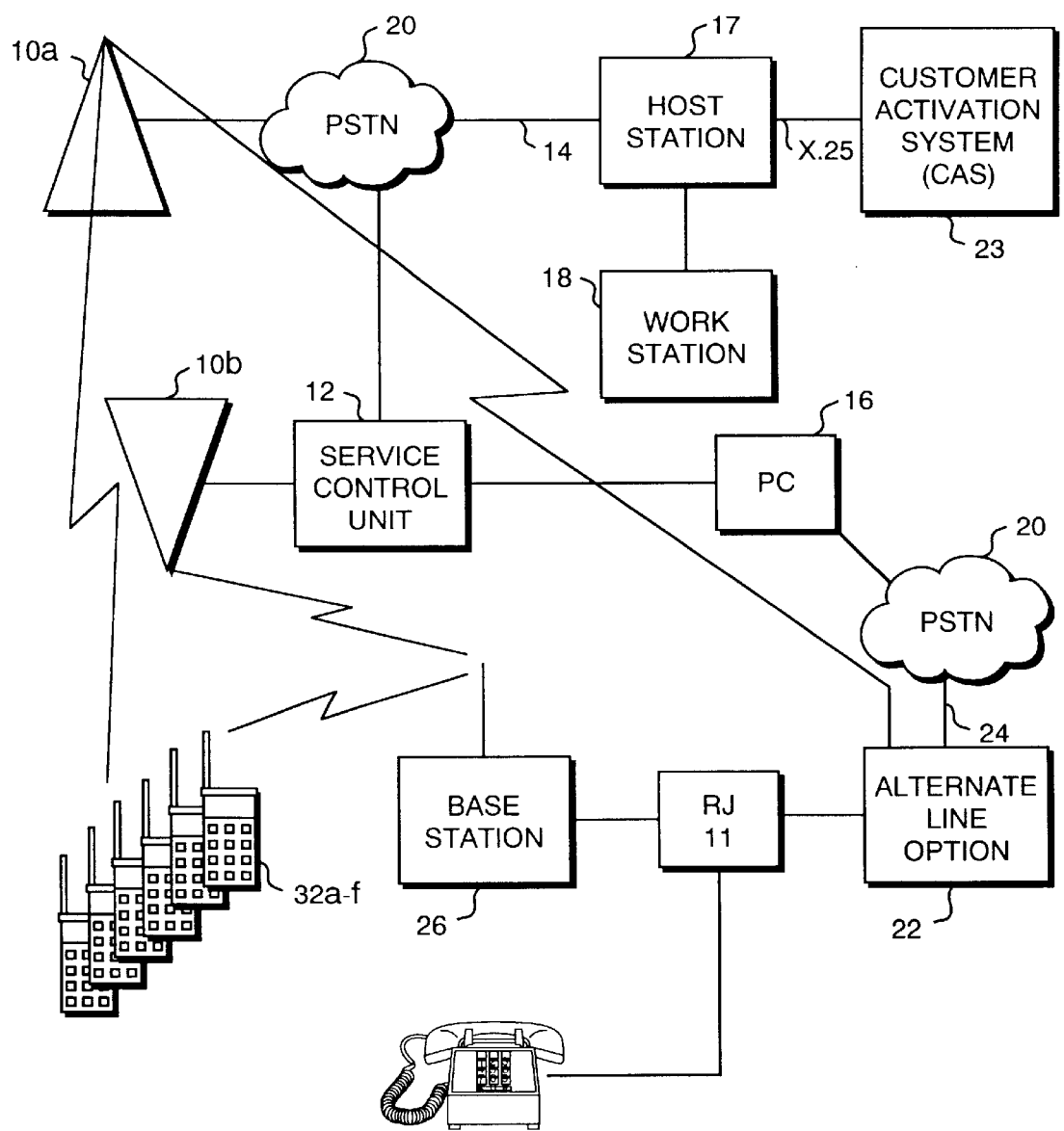
FIG. 1 is a system block diagram of one preferred embodiment of the system of the invention.

Referring now to the drawings and particularly to FIG. 1, a preferred embodiment of the invention will be described. FIG. 1 shows one of many cellular switches or cell sites 10*a* of an existing cellular system. The cell site could be configured for standard operation of AMPS, or TDMA or CDMA digital service, of conventional design. EIA or TIA Standard 553, defines Specifications for Mobile Station and Land Station compatibility of Cellular Systems with which all licensed cellular operations within the United States comply. The system of this invention is intended to adhere to these standards or to be compatible therewith.

The cell site illustrated can also be the physical residence of an overlay cell and antenna 10*b* which provide radio coverage of the same general geographical area as the cellular site.

However, the overlay cell operates on a set of reserved frequencies that are selected to have suitable frequency separation with respect to the cellular frequencies, so that they do not interfere with cellular radio operations. At least one channel is reserved for command purposes only, and the other reserved channels can provide both call and command capability. In this regard, it should be further recognized that all communications from handset to pico station are on the reserved call channels with the exception of authorization communications, whereas service control unit to pico station communications are predominantly command channel only communications.

Standard cellular frequency allocations are specified in EIA-553 section 2.1.1.1. In the preferred embodiment, the reserved common control channel selected for B-Side use is 799 which is the channel most removed from the B-Side signaling assignments. The reserved call channels for B-Side will typically be channels 798–789.

For A-Side usage, the reserved common control channel is 991 which is selected to obtain the maximum separation from the A-Side signaling assignments. The reserved call channels for A-Side will typically be 992–1001. Clearly, fewer or additional channels could be reserved, with six to twelve channels being a preferred range.

Alternatively, a separate geographically located array of overlay cells could be utilized, as compared to cellular cells, as long as radio coverage generally comparable to the geographic area of the related cellular network is attained.

A pico station 26 is provided at a customer location that is interconnected with the PSTN by a cable passing through a standard RJ11 interface connected to the existing house telephone wiring. In the embodiment illustrated, an alternate line option module 22 is connected between the pico station and the PSTN 20 via a cable 24. The alternate line option module resides on or near a customer location, which may represent a residential premises or a business premises in this preferred embodiment A standard wireline telephone handset or handsets can be interconnected with the house wiring as shown, if desired, although such is not required. If desired, the alternate line option module may be omitted from the system, or deployed selectively, with or without an associated pico station on the same premises. Thus, the alternate line option module is an independent device capable of use with any device interfaced with the house wiring.

Up to six dual mode portable handsets (32a–f) are provided, each being associated with the pico station, and being capable of operation in dual modes under the support of the pico station and control of a service control unit as will be explained in detail hereinafter.

In a first mode, each portable handset functions as a portable cellular telephone operated through a direct wireless connection to cell 10a. In a second mode, the handset functions as an enhanced cordless telephone supported by the pico station at the customer premises. In the latter or pico mode, call delivery can be provided to the public switched telephone network via a connection from the pico station through the wired telephone service in the home, in effect using a combination of wireless and PSTN support. If the alternate line option module is provided in the system, it provides yet a further capability of selectively channeling calls to and from the handset via the pico station, the alternate line option module, and over the cellular network represented by cell 10a, on the indicated wireless link.

At least one service control unit 12 is provided for each overlay cell, associated with the system through a cabled connection to the cell site, and a personal computer 16 is associated with the service control unit also via a cable connection. The service control unit is connected through the PSTN and a cabled connection 14 to a host station 17 having a work station 18 associated therewith. The host is further connected via a standard X.25 channel to a customer activation system 23, such as are commonly employed by cellular carriers to control the activation and programming of cellular handsets permitted to function on a given cellular network. The remote programming functions of the host system are suitably fulfilled by a subsystem such as is described in U.S. Pat. No. 5,046,082, previously referred to, and hereby incorporated by reference.

Figure 3:
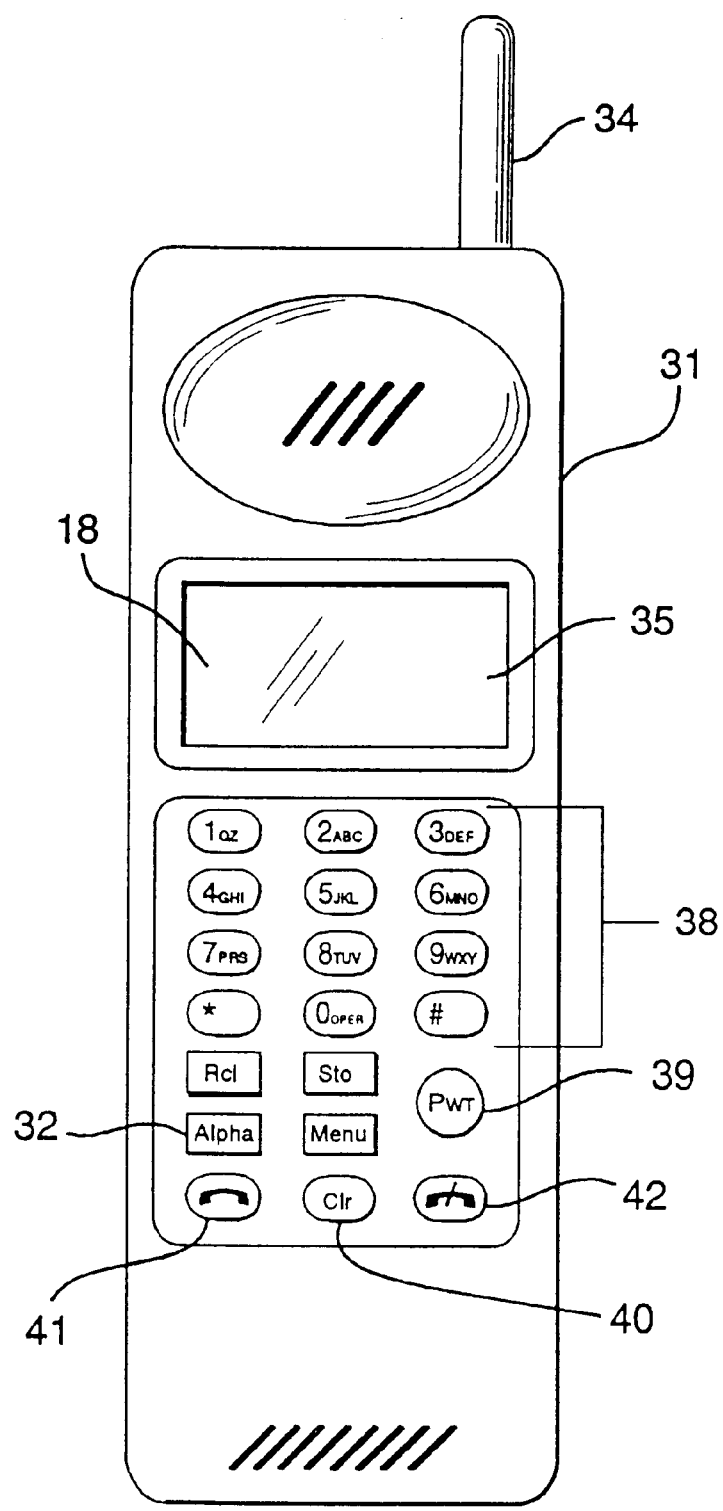
FIG. 3 is a diagram of a handset of the system illustrating the keypad layout and other external features.

Referring now to FIG. 3, a handset for the system is illustrated including an outer case 31, a keypad 32, an antenna 34, and a display screen 35. The keypad includes a standard twelve key portion 38, a power switch 39, and a dear key 40. The usual "send" key is replaced with a green key 41 bearing a special logo and the "end" key is replaced with a red key 42 also marked with a special logo. The green or off hook key, when depressed, serves to initiate dial tone and start a call sequence. The red or on hook key 42, when depressed, terminates a call sequence.

The handsets vary from standard cellular exterior design only in the variation of function keys 41, 42 and in that the handset provides precision dial tone, through use of the standard DTMF generator of the handset in accordance with flow processing control explained in connection with FIG. 20, herein, since the handset does not contain a send key. The dial tone is used in conjunction with the North American Numbering Plan function to detect completion of dialed number status. Consequently, the handset dial plan differs from standard cellular dialing in that the handset generates local dial tone immediately when placed off-hook to indicate to the user that service is available and a call can be placed. The dialing process then follows the standard PSTN practices (of off-hook, dial tone, dial number, call progress, connection, conversation and on-hook), with which telephone customers are familiar.

The handset also includes the capability to display for the user which mode of operation the handset is currently set to provide, i.e. pico or cellular. This information, as well as other message information, is displayed on the standard LCD display screen 35 on the handset (for example, suitable messages would include, Wireless=Home #n; Neighborhood Cellular=Local; Cellular=PREMIUM). The displayed status information allows the user to make informed decisions when placing or receiving calls, especially if special service provider rate plans are available.

Figure 2:
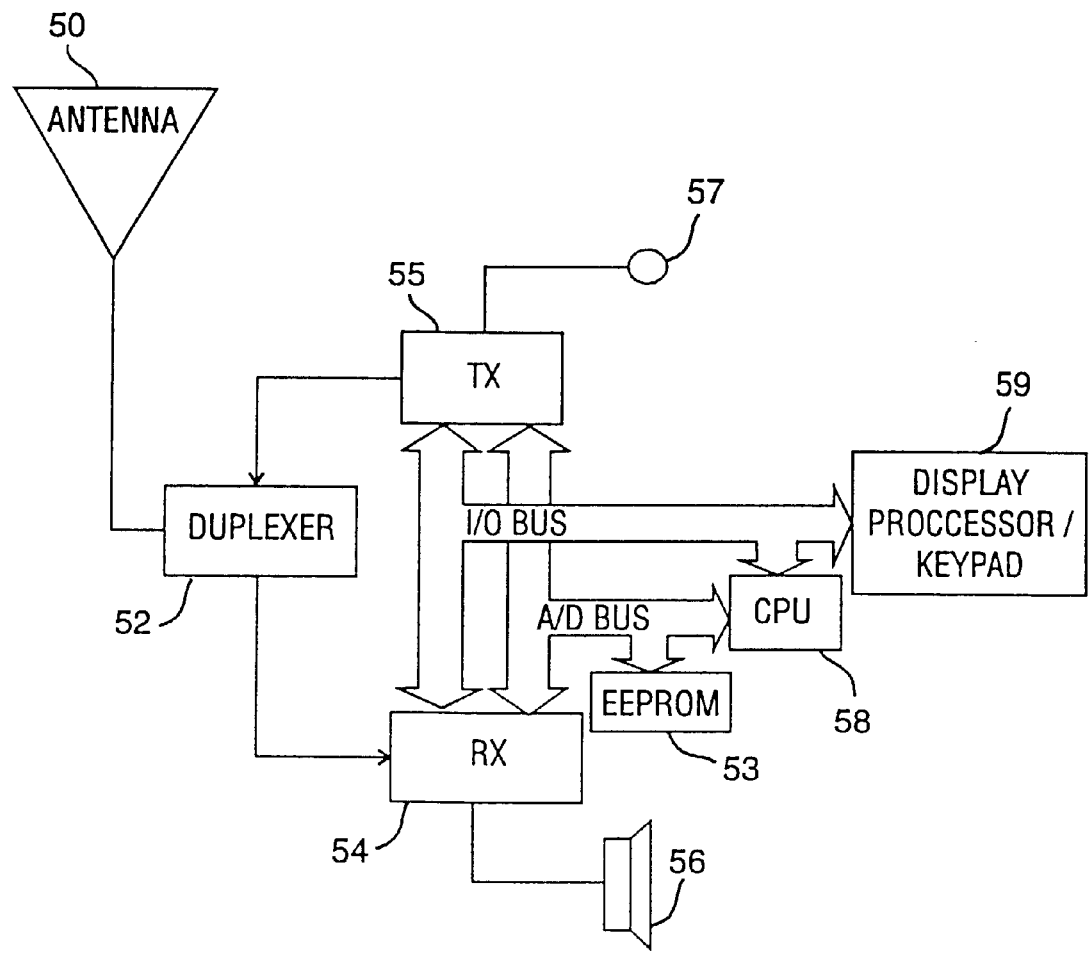
FIG. 2 is a component diagram of a handset usable with the system of the invention.

Referring now to FIG. 2, a component diagram for a handset is illustrated, which is similar to that of a conventional cellular handset. An antenna 50 is connected to a duplexer 52, that is in turn connected to a receiver section 54 and a transmitter section 55. A speaker 56 is connected to the receiver and a microphone 57 is connected to the transmitter. A central processing unit 58 is interconnected with both the receiver and transmitter sections by an input/output buss and by an address/data buss. A display processor/keypad section 59, is also interconnected to the I/O buss in conventional fashion. A non-volatile memory EEprom 53 is also interconnected to the A/D buss in conventional fashion.

Each handset is assigned a unique Mobile Identification Number (MIN) that is used by the cellular system as the handset telephone number. When the handset transitions from the cellular system service to the pico station for pico mode service, the handset automatically informs the cellular system to forward any incoming calls placed to its MIN to the PSTN telephone number associated with the instant pico station it is switching to. This process is reversed each time that the handset transitions back into the cellular system service area and out of the pico station or pico mode service area, as is explained in connection with flow process descriptions hereinafter. The special functions of the handset are accomodated by added software executed by the handset central processor.

Figure 4:
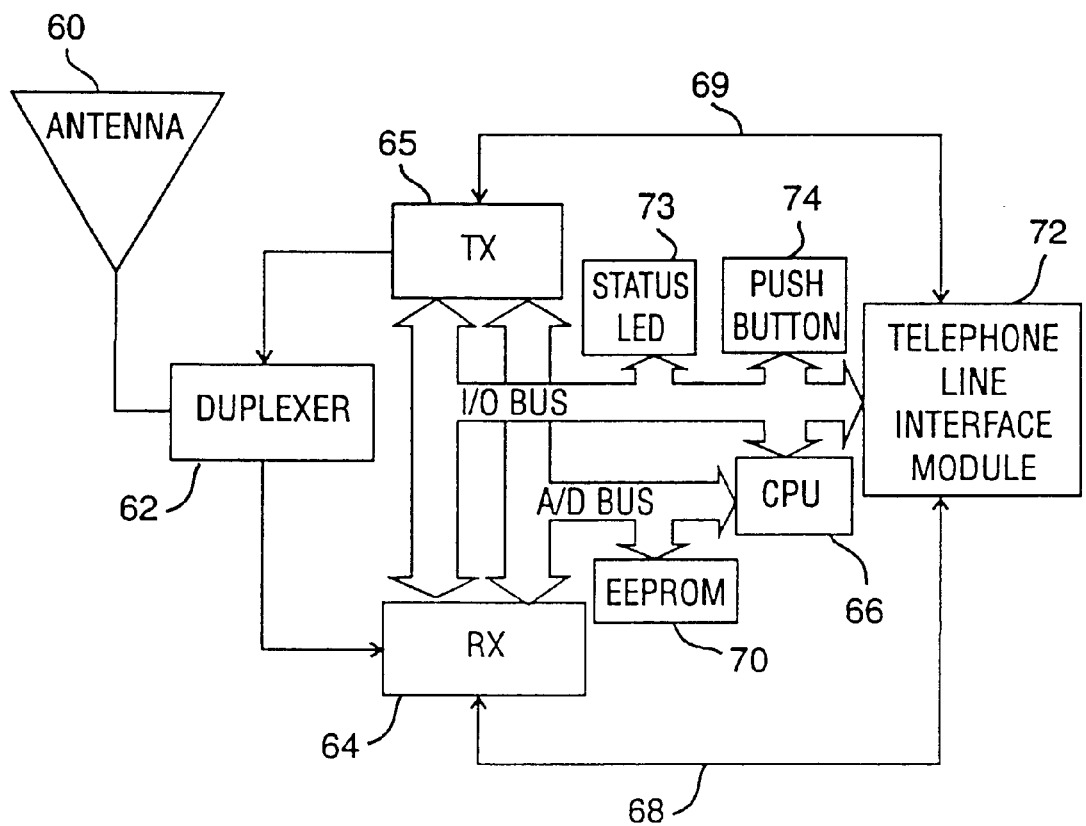
FIG. 4 is a component diagram of a pico station of the system.

Referring now to FIG. 4, a component diagram for a pico station is illustrated, including an antenna 60, connected to a duplexer 62, that is in turn connected to a receiver section 64 and a transmitter section 65. A central processing unit 66 of standard configuration is provided, and a standard telephone line interface module 72 is connected to the receiver section and the transmitter section by audio cables 68, 69 respectively. The interface module is also connected to the house telephone line which connects to an alternate line option module , if desired, as is illustrated in FIG. 1. An I/O buss is interconnected between the transmitter and receiver section and the central processing unit, as is an address/data buss. Also connected to the A/D buss is a non-volatile EEprom 70. A status LED 73 and an authorization mode push-button 74 are respectively connected to the I/O buss.

The purpose of the pico station is to provide an interface between each of its authorized handsets and the customer site PSTN telephone line, or the cellular system if it is so configured. Each pico station is designed to support up to six handsets and each handset can be authorized for use with up to three pico stations to provide customer flexibility. The pico station preferably operates in the cellular spectrum and always functions as the land station device during communications sessions with the handset in the pico mode. However, unlike standard cellular land stations, the pico station operates in a pico mode and does not transmit a continuous overhead message data stream on a known channel for the handset to lock onto. Instead, the pico station and each handset utilize a unique operating protocol with burst mode communication to locate and access each other only when communication between those specific units is desired. This results in significant system improvement in that channel usage is dedicated primarily to call exchange. In addition, handset battery capacity is conserved.

This unique operating protocol is initiated by the originating device (either the pico station or the handset) after the originating device selects a communications channel from one of the plurality of reserved channels. The channel selection process is dependent upon the originating device measuring the strength of any signal present on the selected channel and comparing this measurement to a predetermined acceptable value. If the signal present on the selected channel is less than this predetermined value, the channel is considered to be available for this communications session. If the level is greater than the known value, the originating device selects another channel from the plurality of known communications channels and performs the measurement and comparison procedure again, until an acceptable channel is located. The selected channel is occupied only for the duration of the communications session and then vacated. Once it is vacated, any nearby pico station or handset that was avoiding this channel due to measured signal presence, can now use the channel for a corresponding communications session, and then release it in turn.

Both the pico station and handset utilize very low transmit power. This fact, coupled with the unique channel selection process and other advantages of the system, allows a relatively small number of channels to serve a very large population of customer sites. Another benefit of the dynamic channel selection and usage protocol is the elimination of effort currently required to preassign radio channels in adjacent pico cell areas to avoid interference that is experienced in standard cellular land station systems. This elimination of frequency planning simplifies the deployment of the system, allows it to be used successfully in neighborhoods, and allows the public to rapidly avail itself of the benefits this system provides.

Figure 5:
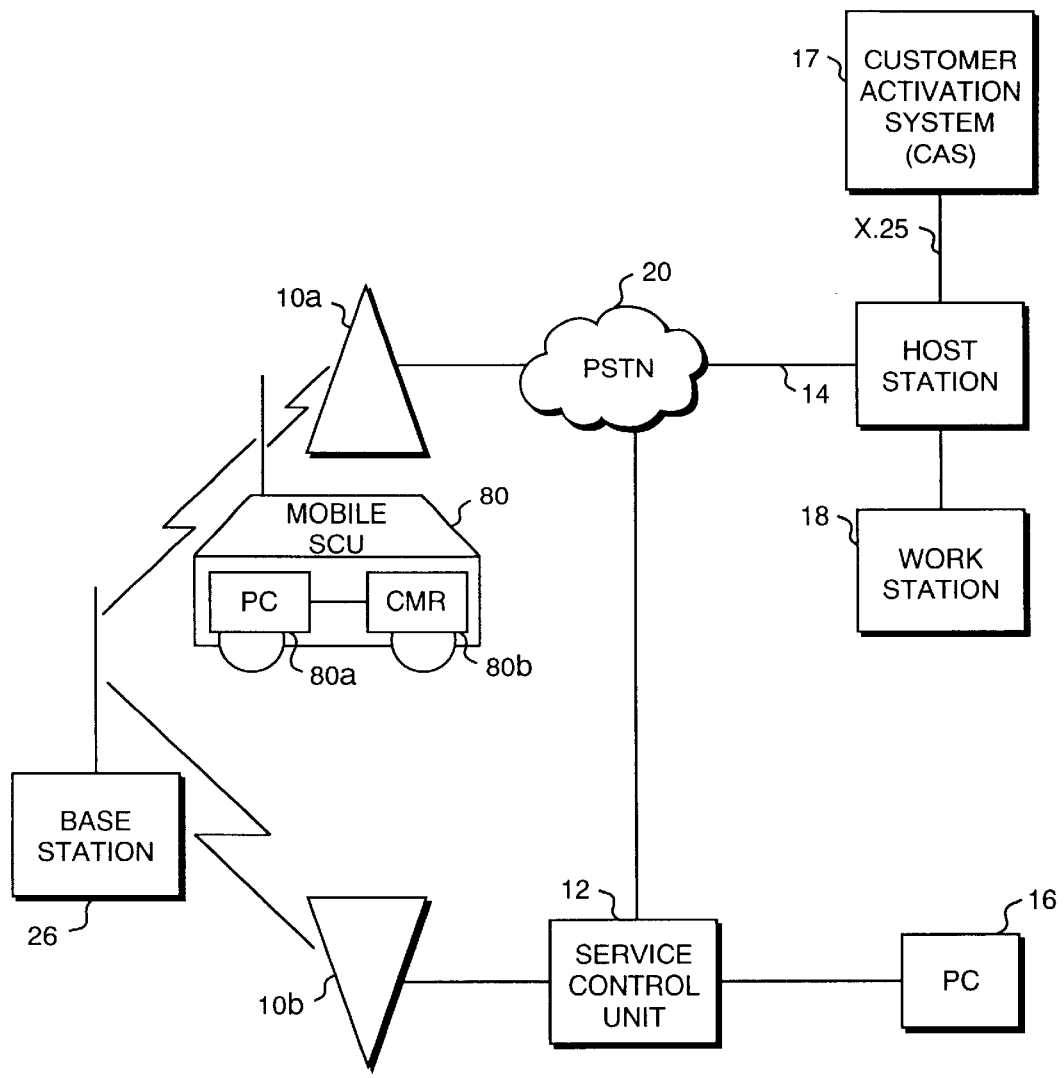
FIG. 5 is a block diagram of a service control unit configuration of the system.

Activation and positive control of the pico station is maintained by the cellular service provider through the use of a service control unit such as that illustrated in FIG. 5.

Referring now to FIG. 5, it includes a number of elements that are illustrated in FIG. 1, being designated by like numbers in FIG. 5. FIG. 5 illustrates, in addition, a mobile service control unit 80 useful with fixed unit 12. Unit 80 comprises a mobile vehicle including a personal computer 80a interconnected with a cellular mobile radio unit 80b having a design similar to a handset, particularly in that it further includes the necessary software capability to perform pico mode overhead control operations in addition to standard cellular overhead protocols.

In the embodiment illustrated, the mobile unit provides service control unit function to pico stations which may be out of reach of a fixed service control unit; or alternatively mobile units can be used in lieu of a fixed service control unit such as is indicated by numeral 12. When a mobile service control unit is utilized, it operates with a communication is path from host station 17 through the PSTN to cellular cell site 10a. A communications path is then established between cell site 10a and unit 80 via a standard cellular wireless link. To communicate with and to control a pico station, unit 80 uses a wireless link on one of the pico frequencies that is selected to be the dedicated control channel identified as a common setup and control channel hereinafter. This wireless link follows a unique communication protocol as described in detail hereinafter which is compatible with the pico mode protocols, but is a special subset thereof. The message formats for this protocol are illustrated, in particular, in FIG. 31.

When the fixed service control unit 12 is utilized, a transmission link from host station 17 through the PSTN to the service control unit is utilized. In addition, the service control unit is connected via a cable to cell 10b of the system. Communication from the service control unit to the pico station is then effected via a wireless link from cell 10b to the pico station using the dedicated control channel and the word operating protocol illustrated in FIG. 31.

It should be apparent that the fixed service control unit would be the preferable manner of communicating with pico stations. However, in the initial stages of installation of a system where gaps exist in the overlay network, it may be necessary to use one or more mobile units. Alternatively, both mobile units and fixed units could be used interchangeably or in the same general area. It should also be recognized that when a mobile unit is utilized, it can depend entirely upon transmissions from the host station or it can convey to the selected pico station information which is preloaded in the mobile unit by cassette or other media loaded on the PC. The same capability is possible for the fixed service control unit.

At a minimum, one of these devices needs to be located within each cell site serving the neighborhood in which the pico station is deployed. With essentially ubiquitous cellular system coverage, every household in an urban or suburban area is illuminated with cellular radio energy. (Most rural households also fall within the service contour of a typical cellular provider and could also be provided with this service option.) The service control unit capitalizes on this situation to contact any pico station within its territory using the reserved channel wireless link between cell 10b and the pico station to activate, update, audit and control its functions and operation.

Like the handset in the pico mode, the control unit also utilizes a unique operating protocol during its communications sessions with the pico station. These sessions, however, always occur on the common control channel reserved for this purpose. Service control unit initiated activation sessions remain entirely on the common control channel. All other control unit sessions are initiated on any idle channel within the desired pico station's known multiple channels, and then move immediately to the common control channel for culmination. Any pico station can also initiate a session with the control unit by transmitting its request on the common control channel whenever this channel is idle.

The service control unit is linked to a centralized host station which maintains a data record of all active pico stations and handsets within the cellular carrier's service area. The host station, in turn, is linked to the central cellular customer activation system (of the carrier) through which the host station receives data on the sale of each pico station and handset. This data is Utilized by the host station during activation of each pico station and for control of the services provided. Through the customer activation system, the host station also is updated with changes to the customers service profile. These updates are immediately passed by the host station to the appropriate pico station via the control unit.

Figure 6:
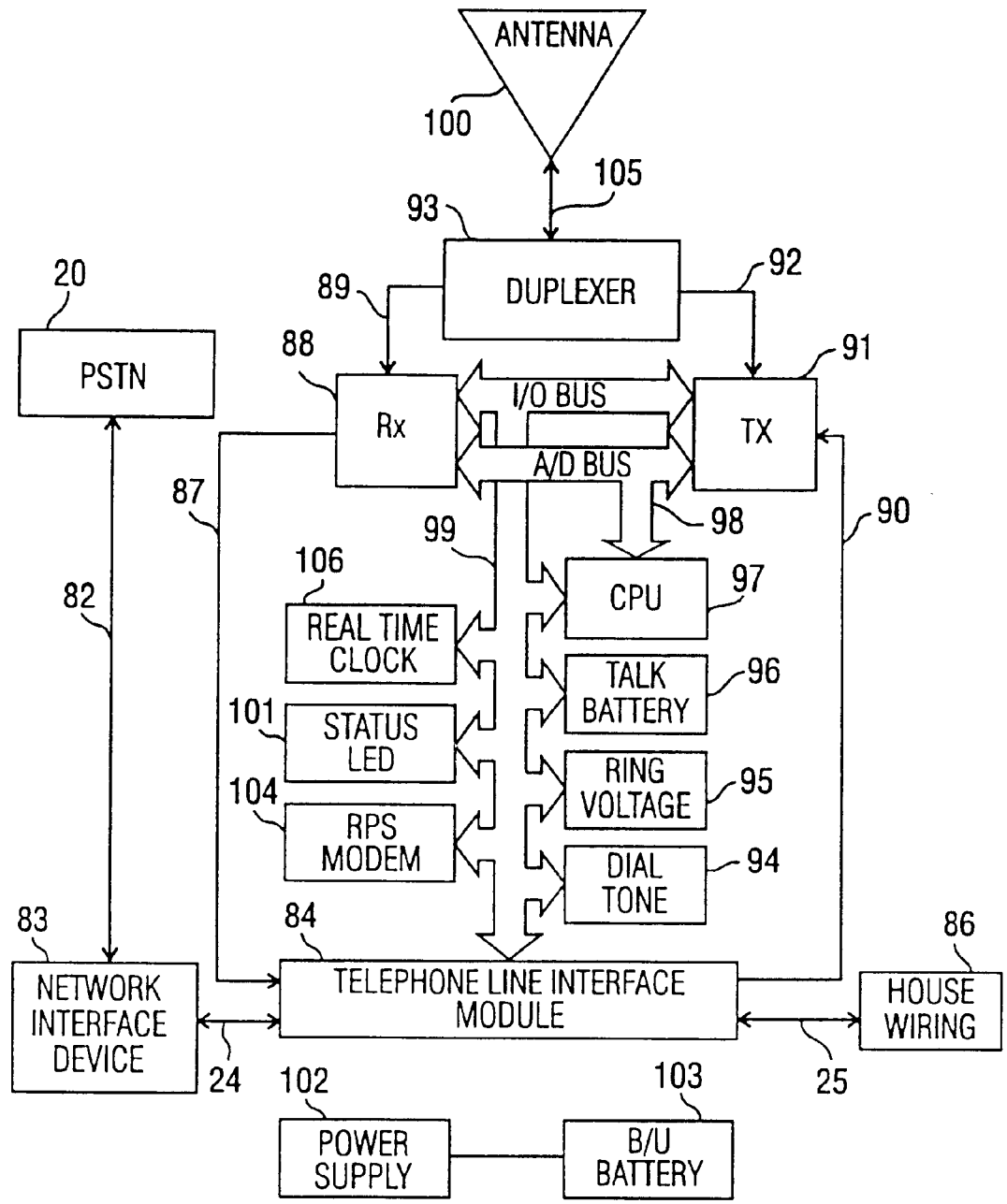
FIG. 6 is a component diagram of an alternate line option module usable with the system of the invention.

The elements of the alternate line option module are depicted in FIG. 6. As shown, the PSTN is connected via cable 82 to a network interface device 83. The network interface device is provided by the local exchange carrier as the demarcation device between the local exchange carrier facilities and the house wiring within the customer premises. A telephone line interface module 84 is connected to the output of the network interface device via cable 24. Connection to the house wiring 86 is provided from the output of the telephone line interface module via cable 25.

The alternate line option module contains a central processor unit 97 which controls all of the elements of the alternate line option via the input/output buss 99 and the address/data buss 98. The controlled elements are the cellular receiver unit 88, cellular transmitter unit 91, a talk battery substitution module 96, a 90vac ring voltage generator 95, a precision dial tone generator 94, red/green status IED 101, remote programming modem 104, real-time dock 106 and telephone line interface module 84.

The cellular receiver 88 and transmitter 91 are connected to the antenna duplexer 93 through cables 89 and 92 respectively. The duplexer 93 is also connected to the captive antenna 100 through cable 105. An audio pathway for receive audio to the telephone line interface module is provided by conductor 87. The transmit audio pathway is via conductor 90.

The central processing unit 97 has an integral microprocessor which also contains RAM for working registers, ROM for program storage and EEprom for non-volatile data storage.

The alternate line option is normally powered from the ac power, supply 102 but it also contains a back-up battery 103 capable of providing about one hour of continuous operation in the event of ac power failure.

System Protocols

All overlay network and pico mode operational protocols of the system are implemented via a common air interface which utilizes a 10 Kbit Manchester encoded data transmission methodology integral to cellular telephony. This implementation allows for less expensive hardware since processing of 10 Kbit data messages is already a requirement for all cellular stations. Consequently, no additional hardware need be added to the handsets to accommodate this protocol.

The system message format is consistent with standard cellular telephone format, but message contents are unique between the overlay network elements. Overlay network elements always utilize channels that are reserved exclusively for them while they are communicating with each other. Therefore, compatibility has been provided between current cellular protocols and the protocols of this new system. The benefit of such an implementation lies in the fact that any of a multitude of existing cellular telephone manufacturers can supply handsets simply by modifying their operating handset software to support the added overlay network protocols.

In the cellular mode, the base station acts as the land station and provides control over all transmissions of both land station and handset. In the pico mode, the unique protocol establishes the handset and pico station in a first to initiate, control relationship. Specifically, on outbound calls directed to the handset, the pico station has dominant control under the protocol. With respect to inbound calls, the handset exercises the dominant control under the protocol.

In the service control unit-pico station relationship, the service control unit is the master and the link between those units consists of the 10 k bit Manchester encoded data stream. It should be recognized that this is a reverse hierarchy of control as compared to existing cellular systems.

In the host-service control unit relationship, the host exerts the dominant control influence and initiates messages based upon the traffic availability. As described in U.S. Pat. No. 5,046,082, the communications connection between these units follows a modem based dial up protocol using a unique DTMF arrangement.

The direct application of this patented technique for remote programming has been improved in the present system through the elimination of data modem requirements in the downloading operations of the system control unit-pico station link. The modem requirement is further eliminated in the pico station-handset link during downloading operations. This is accomplished by transforming the unique DTMF modem access activation command sequence that the service control unit receives from the host into parameter information message formats of the unique enhanced or pico protocol.

The same message formats are then used in remotely programming the handset. Consequently, the handsets are no longer required to contain an inband modem. This elimination of hardware removes a previously existing practical constraint from this system against the use of remote programming on handsets. This, in turn, makes remote programming of handsets cost effective.

With the system as presently configured, it is intended that each member of the household will have a handset assigned for his or her personal use. With the system in its presently described configuration, only a single call can be in process at any one time. However, provision is made for more than one handset to be interconnected to a given call.

Other options are described hereinafter with respect to alternate embodiments. In addition, a distinct ringing capability is described such that family members can readily distinguish incoming personal calls.

Each handset is intended to operate in a standard cellular mode when away from the pico station. That operational mode of the handset utilizes the standard cellular overhead messaging protocol of the cellular system. When the handset is brought back within the range of the pico station, it automatically switches to the pico mode under supervision of the pico station. Then the handset operates on the unique control protocol supported by the pico station.

In view of these features, it is necessary for the system to include means for both set-up and operation of the handset in each of the two modes. Furthermore, a unique transition protocol is required in order to enable automatic control and switching of the handset between the two operational modes.

In order to describe all the protocols necessary to operate the system of the invention, the steps necessary to place the handsets and the pico station in use after purchase by a customer are generally described hereinafter. The first step generally involves Activation of the pico station. The procedure for the handsets then involves an Authorization process which is the procedure followed by the customer and the cellular service provider following purchase of the pico station and handset.

These procedures of Activation and Authorization include both the usual customer activation process tasks necessary for operation of handsets in the cellular mode, and special steps which are necessary to set up the pico station and each handset purchased for operation in the pico mode. In addition, the customer must authorize each purchased handset for use with its associated pico stations. Handsets will register automatically when in communications range of the pico station.

As a precursor to Registration of each handset to a pico station, there is a recurring process referred to as Location Analysis, whereby each handset detects that it is in a cellular coverage area of the cell site that also covers one of its authorized pico stations. This alerts the handset that it is in its home neighborhood and may now be within radio range of the pico station with which it is authorized to function. Only then will the handset attempt to contact its authorizing pico station. This location analysis process occurs automatically each time the handset is placed in use, and constantly during its cooperation with the cellular system if the handset is moved from location to location by the customer. Its use within the system eliminates a substantial amount of crosstalk or interference that inherently exists under other dual mode systems being considered in the industry. In addition, location analysis conserves handset battery capacity and enhances call traffic capacity of the reserved channels.

After successful Registration in the pico mode, the handset operates in various states. A Reacquire function is performed periodically by the handset to maintain the handset's registered status with the pico station. This process is timer activated and is another burst mode communication process designed to limit channel usage for non-conversation purposes, as explained in the FIG. 18 flow process. In an idle state, the handset is available for general use. In addition, the handset is capable of joining a call in progress, capable of a call origination process, and capable of a call termination process, through specific process task flows that are described in detail hereinafter.

As previously explained, when purchased the pico station is not yet activated for use by the consumer. The Activation process is performed "over the air" by one of the service control units. The cellular carrier providing the pico station service selects and reserves a single control channel for use by all service control units and pico stations. This common control channel is known to the pico station. Each pico station is also assigned a unique 22 bit electronic serial number (ESN) by the manufacturer. The pico station ESN is captured at the point of sale by the customer activation system and transmitted to the selected system host station along with the address and telephone number of the location where the pico station is intended for use. The customer activation system also transmits to the host station the MIN and ESN of each handset which is authorized to use this pico station.

In response, the host station examines the pico station location address and selects the most appropriate service control units for contact with the pico station. The host station then issues a command to these selected service control units ordering a Locate task of the target pico station to be executed.

The involved service control units then each periodically issue on the common control channel, an Undeniable Access Message addressed to the targeted pico station as identified by its ESN. This process is repeated until contact with the targeted pico station is achieved.

It should be recognized that the Undeniable Access Message ESN field could additionally be partially or wholly encoded, using various public-private key arrangements. If used, such encoding provides a control access security capability to the cellular service provider which can be used alone or in combination with the security inherent in the described remote programming system access arrangement, thereby yielding a double level of security protection.

In order to receive the Undeniable Access Message when the consumer installs the pico station at the intended location and connects its power supply, the pico station will immediately enter an Initialization task The central processor of the pico station then performs internal housekeeping chores to place the pico station radio and telephone line in an idle state. The central processor of the pico station then uploads the contents of its EEprom to determine the pico station operational status. If the pico station is not yet configured, a Pre-Configuration task is entered. In that event, the central processor instructs the pico station radio to alternately tune to the known A-side, and then the B-side control channel to check for contact from the service control unit.

Upon receipt of an Undeniable Access Message addressed to its pico station ESN, the pico station transmits, at its full power, a Communication Setup Message (ACK) to the service control unit. When the ACK is received, the service control unit measures the received signal strength of this pico station ACK signal and issues an End Session command to the pico station. The service control unit then reports to the host station the results of its Locate task.

The host station, in turn, analyzes the results from all instructed service control units and selects the one reporting the highest ACK signal strength to be the service control unit to serve this pico station location.

This location verification process ensures the cellular service provider that the customer supplied address information is correct, as each Undeniable Access Message is targeted to a specific portion of the overall cellular system coverage. The host station then transmits to the selected service control unit all operating parameters that need to be forwarded to the selected pico station. This data is transmitted in the form of an Activation Command Sequence.

Upon receipt of an Activation Command Sequence, the selected service control unit queues up a pico station Configuration session for the targeted pico station. The service control unit initiates this session by first transmitting an Undeniable Access Message addressed to the targeted pico station. Upon receipt of the corresponding pico station ACK, the service control unit will pass to the pico station the parameter information defined in a Parameter Information Message format described hereinafter.

The pico station again replies with an ACK message upon receipt of each Parameter Information message. A Non-Acknowledge (NAK) message from the pico station results in the service control unit retransmitting the Parameter Information message again. When all messages are successfully transmitted, the control unit issues an End Session command to the pico station. The service control unit then reports the successful activation process status of this pico station to the host station and saves to its memory a data file for this pico station containing the assigned parameters.

The consumer must also Authorize each handset for use with the pico station. This process is instituted to prevent unauthorized usage of the pico station and the associated telephone line. To initiate this process, the handset must be powered on and the "Base Station auth" selection made from the handset menu function. The handset must then be brought into close proximity of the pico station, since the process is performed at extremely low transmit power levels to prevent unintentional access to any other nearby pico station.

Accordingly, the pico station, upon receipt of its configuration, enters a Pre-Authorization status, and awaits depression of its authorization button, or futher contact from the service control unit. The pico station changes the associated status LED from red to green.

The customer then depresses the authorization button on the pico station until the associated status LED flashes green to indicate that the process has been initiated. The handset display will also flash while the authorization session is in progress. The handset must remain in close proximity to the pico station for three to seven seconds of process duration. The pico station utilizes the known common control channel for this Authorization process exchange.

During the authorization process, the pico station captures and verifies the MIN and ESN of the handset against the list of allowable handsets it received from the service control unit. Should a given handset not be on the list, the process related to it is aborted without authorizing the handset. If the handset was expected, the pico station will pass to it the parameter information listed utilizing the Parameter Information Message format described hereinafter.

The handset sends an ACK message response for each Parameter Information Message as it is received. Should the handset NAK a message, the pico station will retransmit that message. Upon completion of all messages, the pico station issues an End Session command to the handset to terminate the process. This returns the status LED of the pico station to a steady green condition, to indicate the end of the process. The handset and pico station then return-to their respective Idle states.

Certain messages are referred to in the process flow descriptions of FIGS. 7–26. These messages are all constructed of words illustrated in FIGS. 27–31, as previously indicated.

Figure 27:
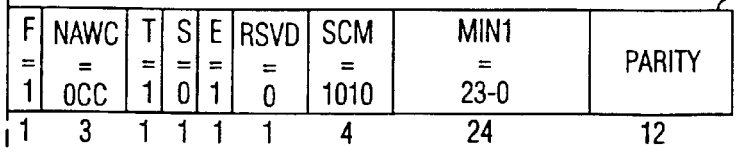
FIG. 27 is a bit assignment chart of handset message formats for reverse control channel communications for components of the system operating in the pico mode.

FIG. 27 depicts the generalized formats for handset special data message words utilized during the pico mode of operation. Items are shown with reference to their actual position in a data message sent from the handset to the pico station over the reverse channel direction of the channel in use.

All words depicted in the figure follow the general format requirements of EIA-553 Standard—Mobile Station—Land Station Compatibility Specification.

A handset data message may consist of one, two or three words sent as a packet on the reverse channel to pass communications to the pico station. The word position assignment for each item of FIG. 27 is always the word position that particular data word will assume in the created data message, as indicated by the word number. Each of the illustrated fields within a depicted word is identified with the standard designation for that field as specified by EIA-553.

In order to facilitate the understanding of the message words illustrated, certain key fields are explained herein.

The Field NAWC=Number of Additional Words Coming and will reflect the total remaining word count in every transmitted message word. The order field, when included in a word, shall always be set to 11110 which indicates a Local order which is not to be confused with a Network order. The field ORDQ=Order Qualifier and is set to 000 in all cases except the Best Server and Parameter Information commands where it is set to 001. The field Local, when included in a word shall contain the five bit Local Order pattern identifying the specific command to be executed.

It should be recognized that all FIG. 27 words are directed only to the pico station, and never to the cellular network. Item 2701 is known as the Abbreviated Address Word and is utilized as a single word command response message; the first word of each two word Access Attempt message; and the first word of each three word Identification command response message.

Access Attempt messages are used for Authorization, Registration, Re-Acquisition, Call Origination and Call Termination events. To facilitate the understanding and identification of the specific messages involved in each communications process, the messages related to FIG. 27 are therefore listed hereinafter. The Authorization Access Attempt message consists of 2701 (word 1)and 2707 (word 2) sent as a two word message (I'll Take It). The initial Registration Access message consists of 2701 (word 1) and 2703 (word 2) sent as a two word message (Here I Am1). The handset Re-Acquisition Access message from the handset consists of 2701 (word 1) and 2704 (word 2) sent as a two word message (Here I Am2). The handset Call Origination Access attempt that occurs prior to collection of the dialed number consists of 2701 (word 1) and 2705 (word 2) sent as a two word message (I Want In1). The handset Call Origination Access demand message that occurs after dialed number collection consists of 2701 (word 1) and 2706 (word 2) sent as the first two words in the message (I Want In2). The handset Call Termination Access Attempt message consists of 2701 (word 1) and 2707 (word 2) sent as a two word message (I'll Take It).

Item 2702 is known as the Parameter Information Acknowledgment word and is always sent as a one word message in response to the pico station during the Authorization process of downloading the handset with the operating parameters needed for pico mode operation. This single word response message utilizes bit positions 26 through 36 to ACK or NAK receipt of a Parameter Information message from the pico station. Bit 26 (X) is set to 0 to indicate ACK and 1 to indicate NAK. Bits 27 and? 28 (AA) are set to 00 to ACK/NAK last order and 01 to ACK/NAK last Parameter word. Bits 29 through 36 (ZZZZZZZZ) are set to the Parameter Information Identity (PID) of the NAK'd data.

Item 2708 is known as the Best Server response and the eight bits, 19 through 26, are encoded as follows: bits 19 & 20 (DD)=Digital Color Code of the Best Server (0 to 3); bit 21=0; bits 22 through 26 (NNNNN)=5-bit offset count of the Best Server Channel Number from the Initial Paging Channel for the serving cellular system. i.e. 00000=334 for B-Side or 333 for A-Side while 10100=354 for B-Side or 313 for A-Side.

Item 2709 is known as the Extended Address word and will always occupy word position three when it is incorporated into a data message from the handset to the pico station. This word is requested from the handset by the pico station to allow capture of the handset electronic serial number for comparison with the list of allowed pico station users to prevent unauthorized system access. The handset includes word 3 in its Full Registration message to the pico station.

FIG. 28 depicts the data message elements utilized by the pico station in the creation of its Overhead (OHD) and Command words sent to the handset. These words are forty bits in length as opposed to the forty-eight bit words used by the handset.

FIG. 28 items are depicted with their message position defined. Item 2801 (OHD word 1), 2802 (OHD word 2) and 2804 (OHD Control Filler Word) follow the EIA-553 Standard exactly. Item 2803 (OHD word 3) has been established to allow the pico station to transmit a unique identifier in the form of a twenty-two bit base serial number to allow the handset to recognize its associated pico mode pico station during those brief periods when the pico station is actually transmitting an overhead message stream.

Item 2805 (Command word 1) follows the EIA-553 Standard exactly, and is utilized by the pico station as a Single Word Command for page of handset and as the first word of multiple word commands issued to the handset.

Item 2806 (Command word 2) is the second word of the two word Best Server Command issued by the pico station to the handset.

Item 2807 (Command word 2) is the second word of the two word access acceptance message issued by the pico station to the handset when access to the pico station is denied.

Item 2808 (Command word 2) is the second word of the two word Access Acceptance message issued by the pico station to the handset when Access is Accepted and the line is Idle. Local field NNN=000 through 101 as the assigned home unit number for this handset Access.

Item 2809 (Command word 2) is the second word of the two word Access Acceptance message issued by the pico station to the handset if the Line Busy condition exists. Local Field NNN=110 if a Handset Busy condition exists.

FIG. 29 depicts additional pico station Command words utilized in communications with the service control unit and with the handset in the pico mode of operation.

Item 2901 (Command word 1) is the single word attention message sent to the service control unit on the common control channel to request service.

Item 2902 (Command word 1) is the first word of multiple word response messages, sent to the service control unit during configuration/update sessions.

Item 2903 (Command word 2) is the second word of the Audit Acknowledge sent to the service control unit during Locate session.

Item 2904 (Command word 3) is the second word of the two word ACK/NAK response from the pico station to the service control unit during configuration/update sessions.

Item 2905 (Command word 2) is the second word of the multiple word Parameter Information Transfer process executed during the handset Authorization function. This Command alerts the handset to the following Parameter Information commands.

Item 2906 (command word 3–N) is the Parameter Information Command word which will contain the Parameter Information Identity field (PID) and the Parameter Value field (PVAL) described in Table 1 below.

TABLE 1

| PID | PARAMETER NAME (PVAL) | BIT/LNGH |
| --- | --- | --- |
| 00000001 | Number of Channels to use | 5 |
| 00000010 | Transmit Power Level | 3 |
| 00000011 | ACCESS threshold RSSI | 8 |
| 00000100 | WARNING threshold RSSI | 8 |
| 00000101 | HANGUP threshold RSSI | 8 |
| 00000110 | RSSI SAMPLING interval | 4 |
| 00000111 | RSSI AVERAGING count | 4 |
| 00001011 | Base phone number NPA | 12 |
| 00001100 | Base phone number NNX | 12 |
| 00001101 | Base phone number LINE | 16 |
| 00001110 | Handset pico station count | 2 |
| 00010001 | Best Server IDENTITY | 9 |
| 00010010 | Call Forward ON command | 16 |
| 00010011 | Call Forward OFF command | 16 |
| 00010100 | Handset REGISTRATION number | 3 |
| 00000000 | END OF SESSION (11111111) | 8 |

Figure 31:
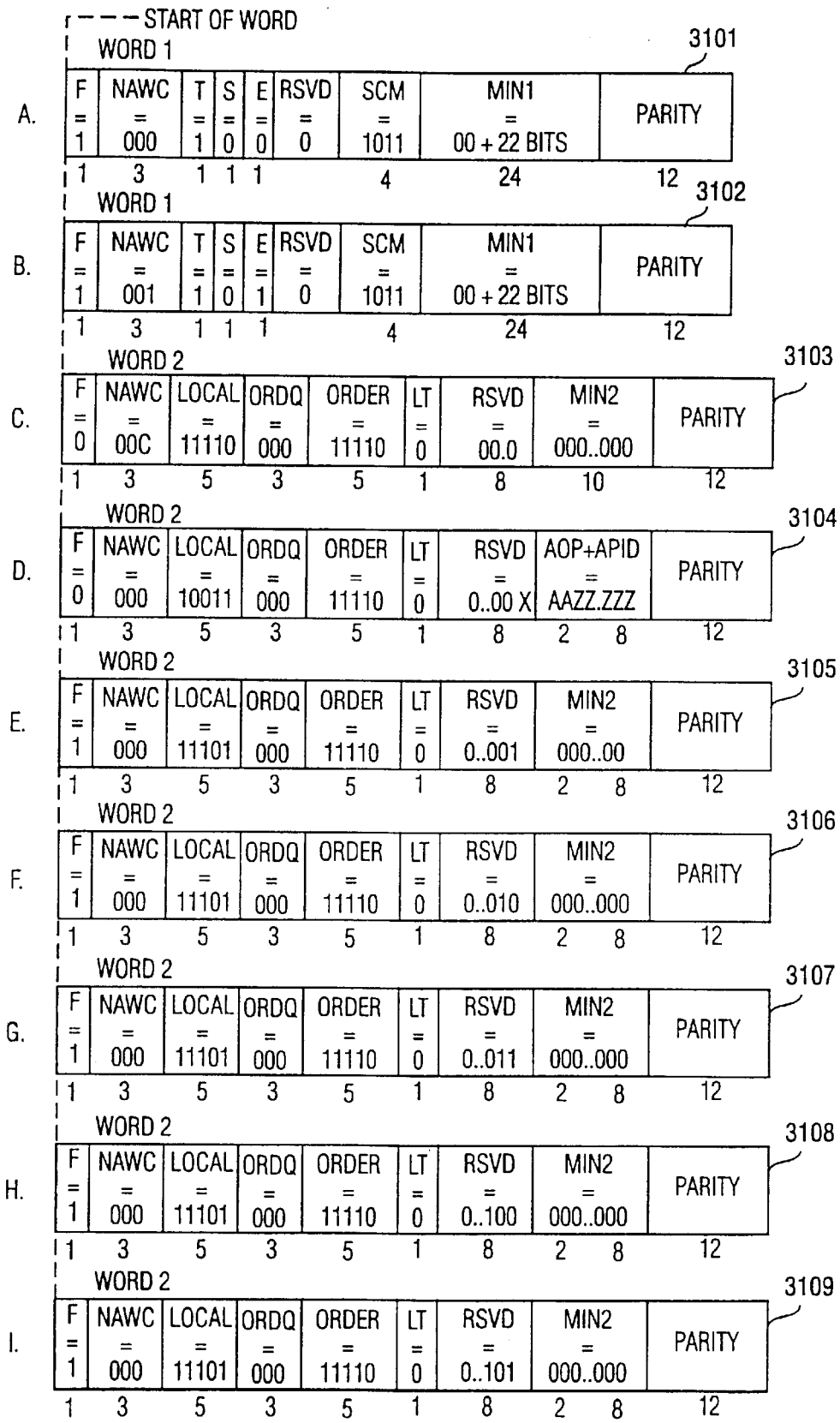
FIG. 31 is a bit assignment chart of service control unit message formats for reverse control channel setup and control command words for communications with the pico station on the overlay network.

FIG. 31 depicts the data message elements utilized by the service control unit in communications with the pico station. These words are forty-eight bits in length.

Item 3101 is known as the Undeniable Access Message and is sent as a single word command, Item 3102 is the first word of Multiple Word Command messages issued by the service control unit to a specific pico station.

Item 3103 is the second word of the Parameter Information Command message.

Item 3104 is the second word of the ACK/NAK Response message sent to the pico station upon receipt of requested data.

Item 3105 is the second word of the two word Shutdown Command which forces the pico station to cease all pico operations and to monitor the common control channel for further instructions.

Item 3106 is the second word of the two word Reset Command which forces a reset to occur in the pico station.

Item 3107 is the second word of the two word Full Audit Command which instructs the pico station to reply with traffic, operational parameters, faults and diagnostic information.

Item 3108 is the second word of the two word Partial Audit Command which instructs the pico station to reply with traffic, faults and diagnostic information.

Item 3109 is the second word of the two word End Of Session Command which releases the pico station from this communication session.

Figure 30:
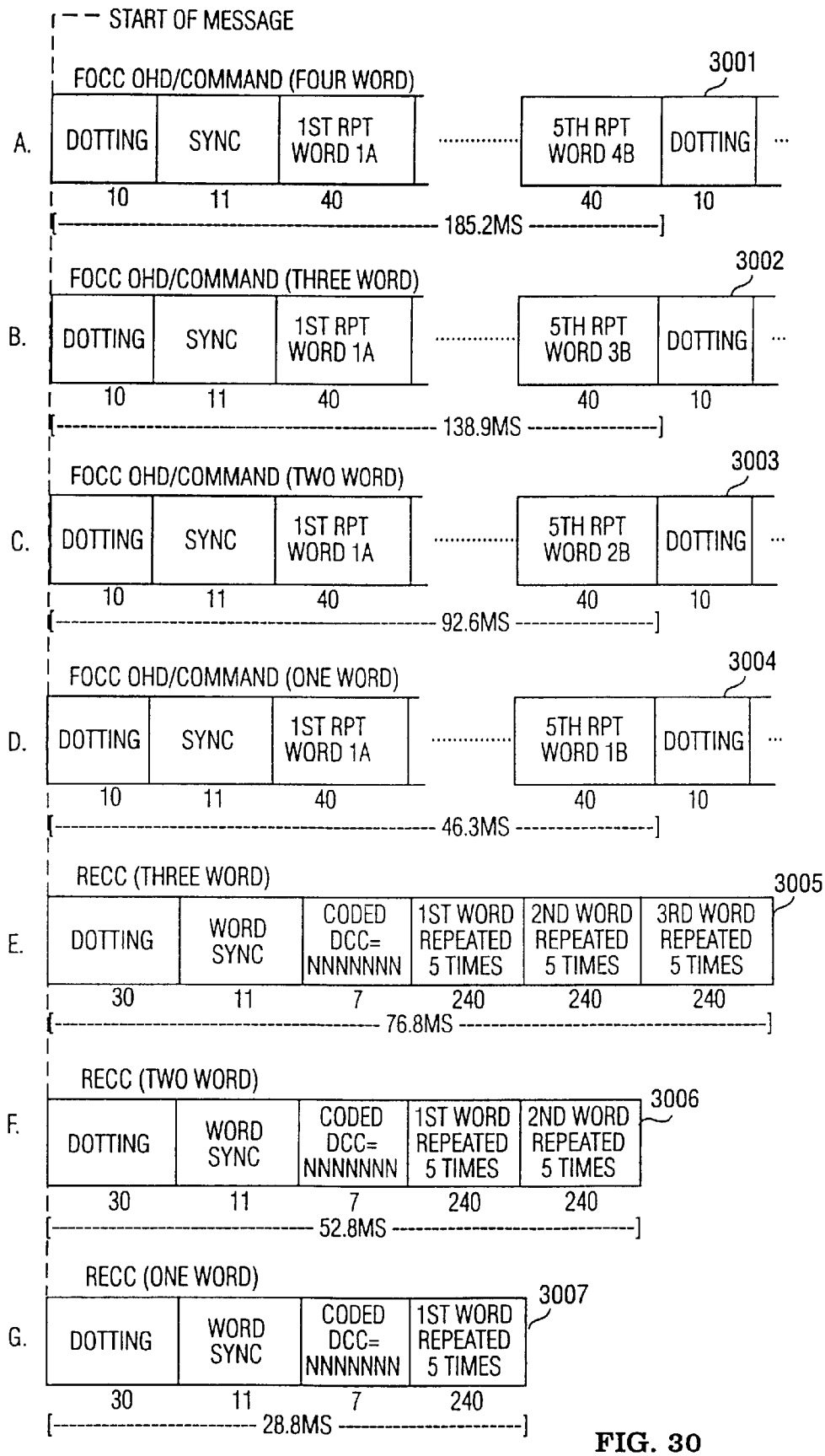
FIG. 30 is a message framing chart for forward and reverse channel communication packets of the system.

FIG. 30 depicts the data message formats and timing for both the Forward channel direction (pico station to handset) and Reverse channel direction (handset to pico station). As shown, the data message formats follow exactly the EIA-553 Standard as to their transmission time durations and their data word repetitions and order.

One difference between the Land Station protocol for cellular as defined in EIA 553, and the base station protocol involves the simultaneous transmission of commands issued to a target handset over both the word A and word B streams within the Forward Command Channel format, which disregards the normal cellular land station stream assignment which is based on the MIN of the target handset. Cellular land stations issue separate commands to two different handsets via the word A and word B streams.

Figure 7:
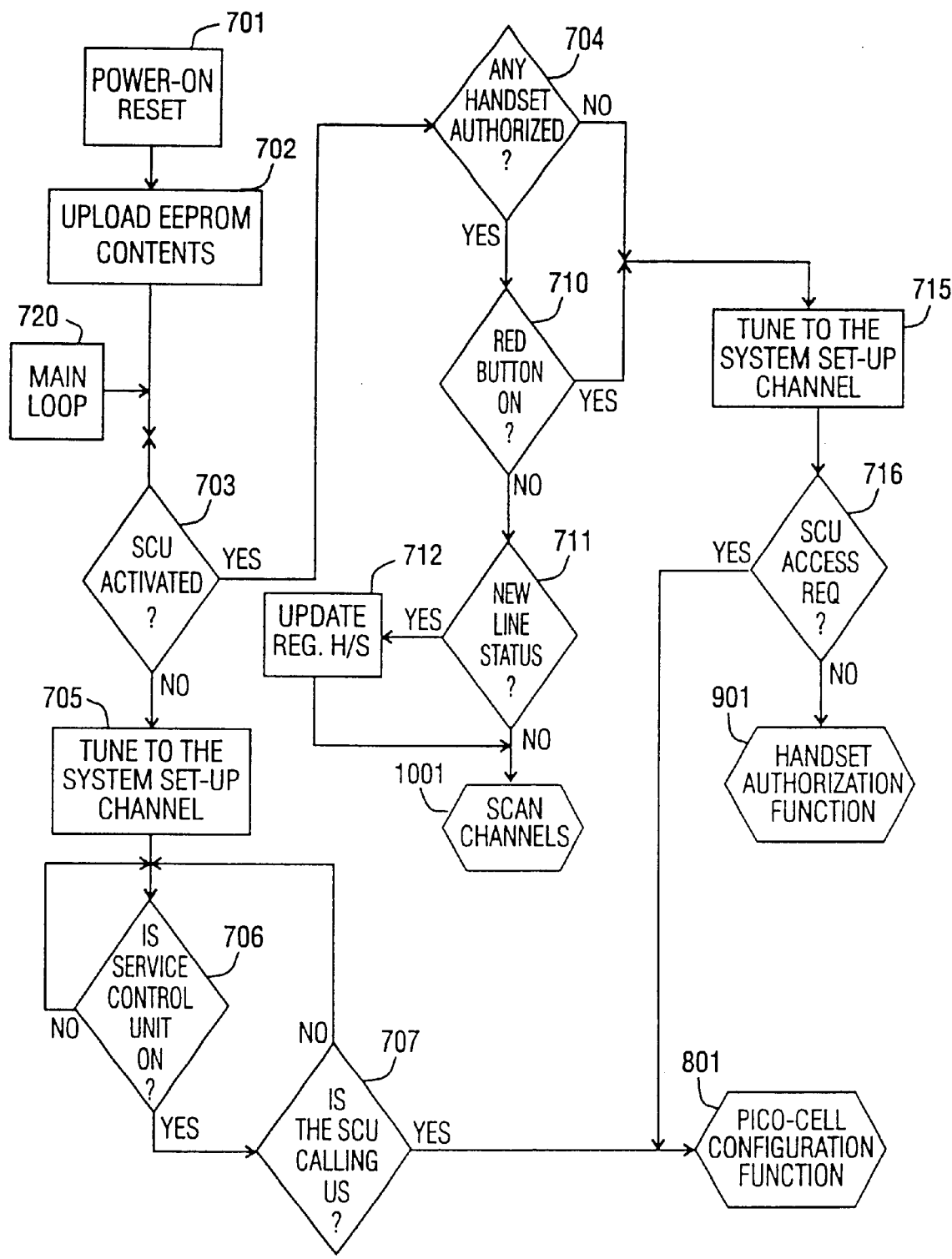
FIG. 7 is a flow diagram of the operation of the pico station in the Set up and Activation function.

Another difference with respect to the mobile station protocol for cellular versus the handset-pico mode protocol includes use of coded Digital Color Code field in the Reverse Control Channel message stream. In the pico mode, this field is set to all 1s during the Access attempt message transmission, and it is set to the target pico station assigned Digital Color Code for all other message transmissions. This is done purposely to prevent the network cellular system from erroneously attempting to process this pico mode access event should signal mixing cause the message to be picked up by the cellular network Pico Station Configuration Process Referring now to the drawings, and particularly to FIGS. 7–13, the process steps of operation related to the pico station will be explained in more detail. FIG. 7 represents the main idle loop of the program. The pico station. Activation function is divided into the Configuration process represented in FIG. 8, and an Authorization process represented in FIG. 9. Call Processing functions are illustrated in FIG. 10–13, respectively.

Obviously, as purchased, the pico station is not yet activated for use by the consumer. The Configuration function is a process to be performed "over the air" by the service control unit after the pico station is located at the premises where it is to be used. As previously explained, a number of service control units and a host station are located in each overlay cell area which serves pico stations, with the host including a server for generation of a list of service control unit locations available to reach a given pico station location.

The base station Activation function involves the overhead events associated with the standard customer activation system employed by the carrier or service provider for the cellular system. In this regard, the customer activation process largely encompasses the process used by standard cellular carrier systems to identify and authorize for service all standard cellular phones as they are activated. In addition, the pico station ESN is captured at the point of sale by the customer activation system. The customer activation system passes this ESN to the service control system host along with the address and telephone number of the location where the pico station is intended for use. The customer activation system also passes to the service control system host the Mobile Identity Number (MIN) and ESN for each handset which is authorized to use this pico station.

The control system host examines the pico station location address and selects the most likely service control units through which contact between the associated control unit and the targeted pico station can be accomplished. The system host then issues a command to each selected control unit ordering the Locate task to be accomplished for the target pico station. Each selected control unit then periodically issues, on the common control channel, an Undeniable Access Message addressed to the targeted pico station ESN. This message will periodically be repeated until control contact with the targeted pico station is accomplished.

Referring now to FIG. 7, when the consumer installs the pico station at the intended location and connects its power supply, the pico station enters an initialization task 701. Upon power-up, the pico station's central processor then issues a power-on reset command and initiates a task 702 which performs certain internal housekeeping chores to place the pico station radio and the telephone line interface of the pico station into their idle state. The pico station central processor then uploads the contents of its EEprom in process task 702 and initiates task 703 to determine the pico station operational status.

If the operational status check in query task 703 determines that the pico station is not yet configured, a pre-configuration task is entered at process task 705 and the status LED is set red. During task 703, if it is determined that operation of the pico station has been configured, then query task 704 is initiated to determine if the handsets associated with the pico station have been authorized.

If a No determination is reached during task 704, or a Yes determination is reached during task 710, the pico station enters task 715 during which it is tuned to the common control channel. Following task 715, a query task 716 determines whether pico station access is required by the service control unit.

Figure 8:
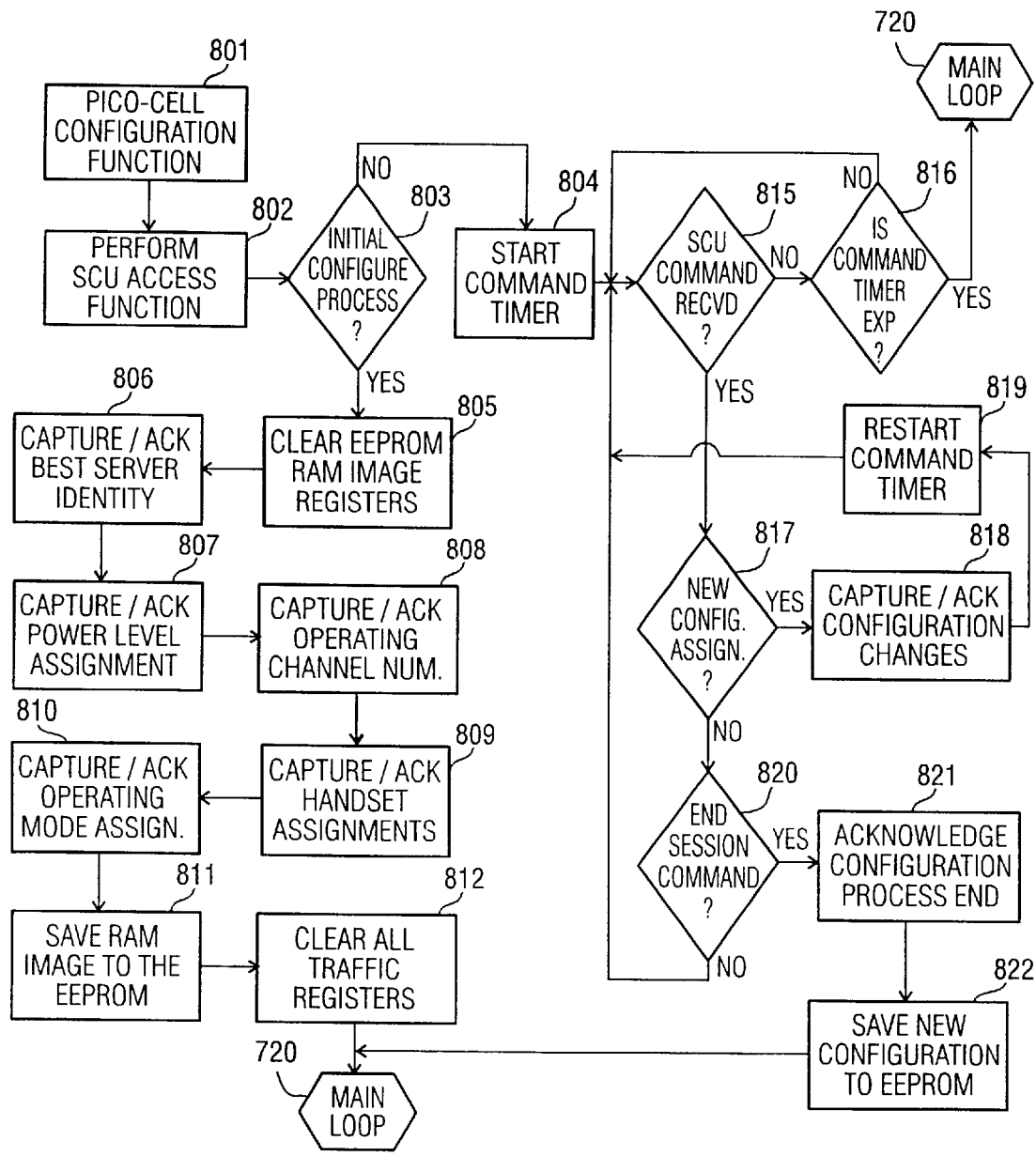
FIG. 8 is a flow diagram of the operation of the pico station in the pico station Configuration function.
Figure 9:
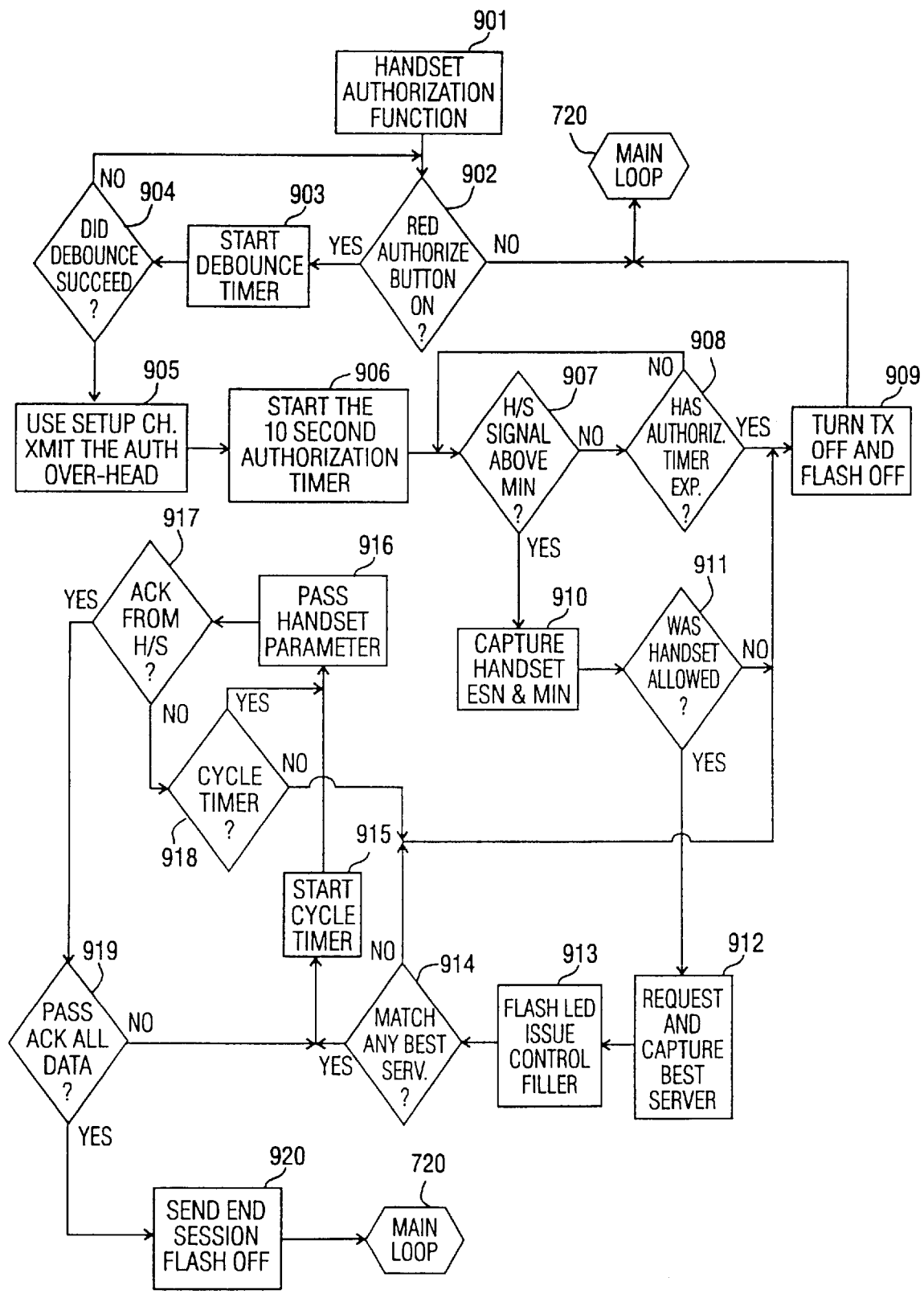
FIG. 9 is a flow diagram of the operation of the pico station in the handset Authorization function.
Figure 10:
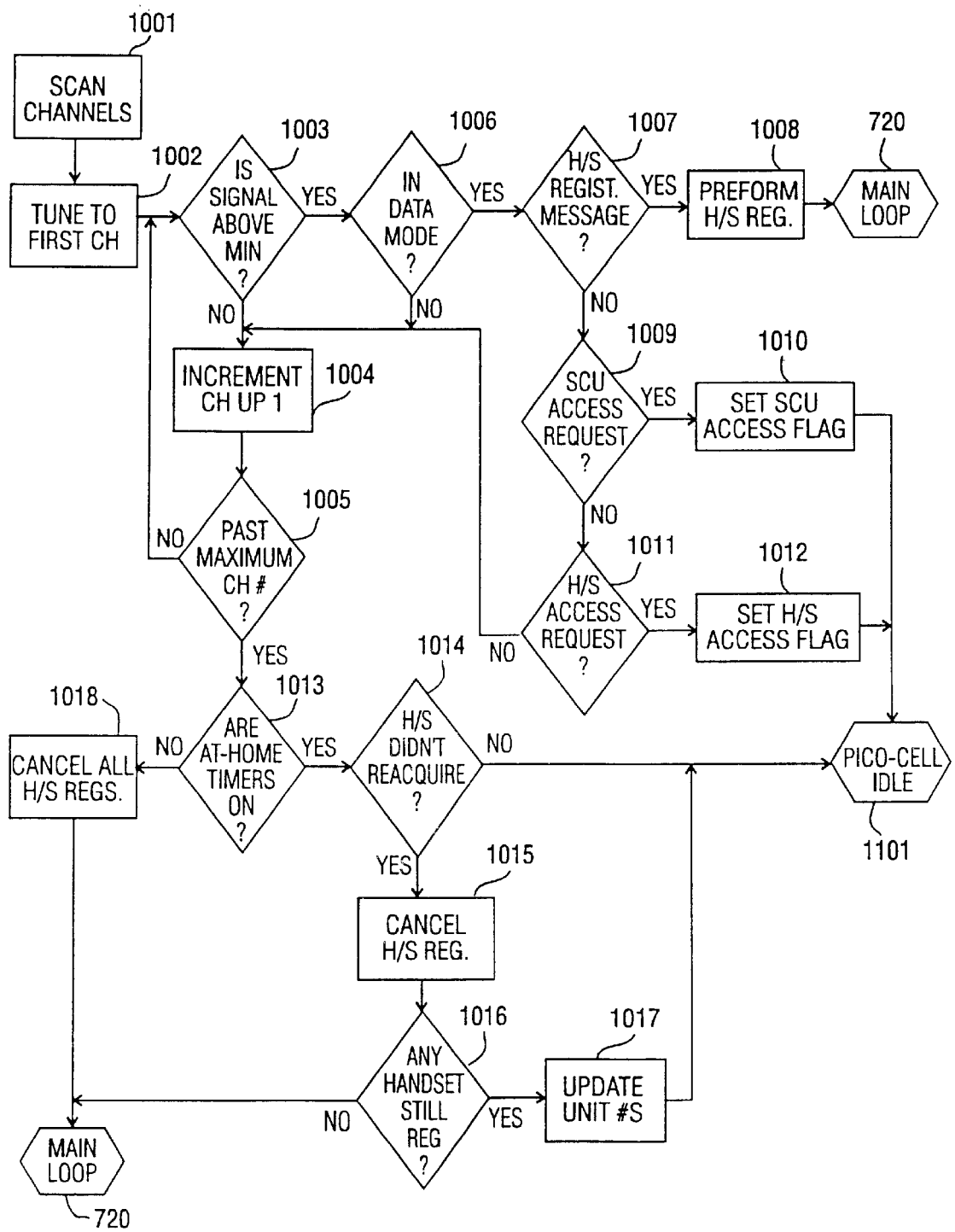
FIG. 10 is a flow diagram of the operation of pico station during the Scan Channel function.
Figure 11:
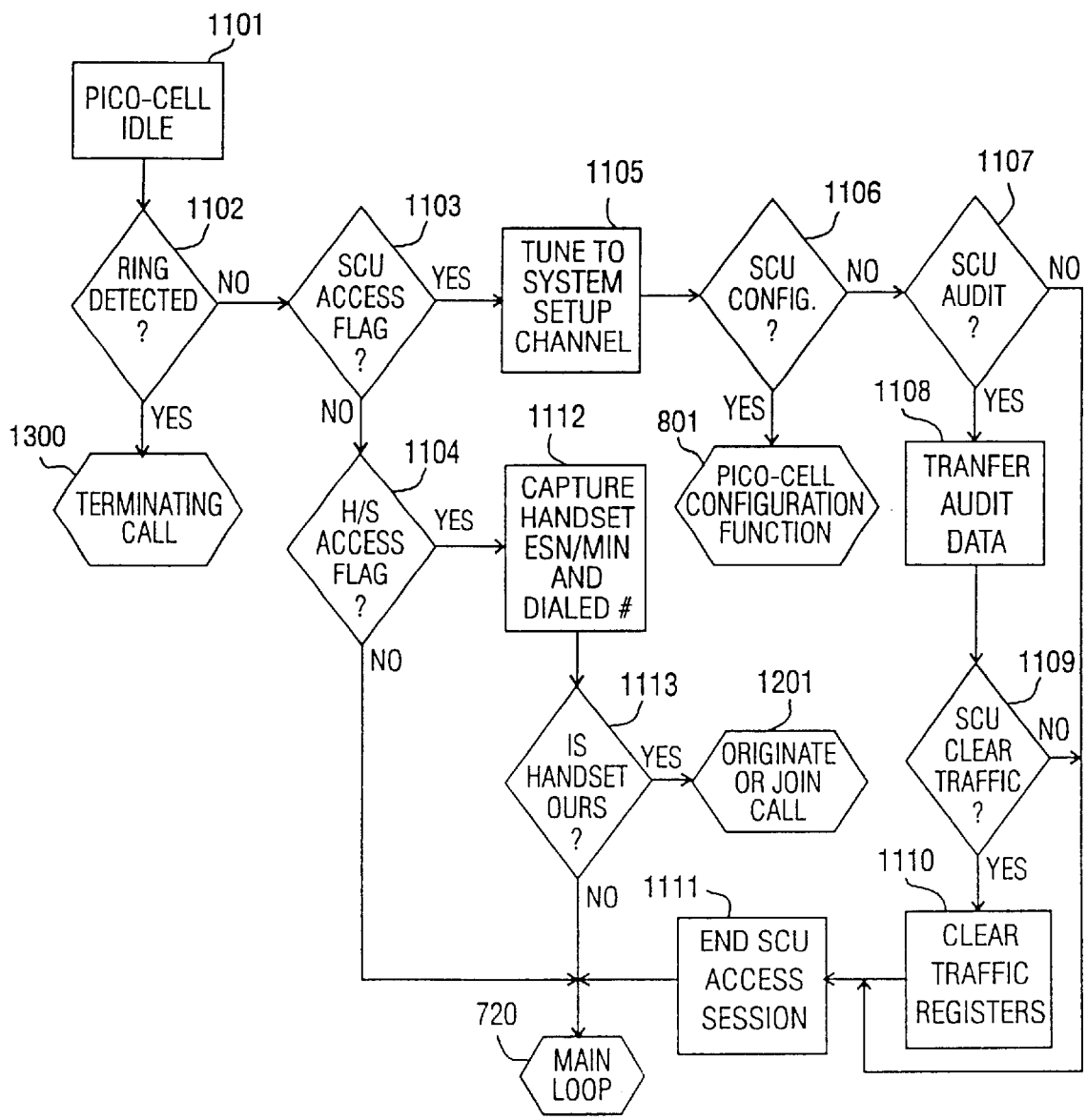
FIG. 11 is a flow diagram of pico station operation during Call and Idle Loop function.

If access is not required, the pico station proceeds to set up for the handset Authorization process of FIG. 9. If access is required, the pico station -accommodates the service control access needs as illustrated in FIG. 8.

If task 704 indicates that the handset was authorized, this means that at least one handset has been successfully downloaded with pico mode operating parameters during an Authorization process. A Yes result from query task 704 initiates query task 710 to determine if the red authorization button on the pico station has been depressed. If the button is not depressed, a query task 711 is entered to determine if the telephone line status has changed. If the telephone line status is new, a task 712 is entered during which each registered handset is updated to this event and the pico station is returned to the idle state through the scan channels routine. If the telephone line status is unchanged as determined by task 711, the pico station proceeds to the Scan Channel process in FIG. 10.

If operation is not enabled, query task 703 initiates process task 705. During task 705, the pico station central processor instructs the radio pico station to alternately tune to the known A-side common control channel and then to the B-side common control channel to monitor whether overhead messages are being received from the control unit.

Query task 706 is then executed to determine if the control unit is present. If a negative response is indicated, a loop return is executed to the start of task 706 and the query task is repeated until the control unit is found. If a positive response is identified, task 707 is entered to determine if an Undeniable Access Message from the control unit is addressed to the selected pico station in view of the subject ESN. If not, a loop back to the beginning of task 706 is executed If an Undeniable Access Message from the control unit is addressed to the target pico station, the pico station proceeds to the Configuration process in FIG. 8. There, the pico station then transmits, at full power, a Communication Set-up Acknowledge Message to the control unit. The control unit measures the received signal strength of this pico station signal and then issues an End Session Command to the -pico station. The pico station then exits the Configuration process and returns to the Main Loop entry gate 720.

Upon issuing the End Session Command to the pico station, the service control unit reports to the host the results of its Locate Command. The host, in turn, analyzes the results from all instructed service control units and selects the one receiving the strongest signal from the pico station to be the primary control for this pico station location. The system host then transmits to the selected service control unit all operating parameters that need to be forwarded to the pico station. This data is encompassed within an Activation Command Sequence.

Upon receipt by the service control unit of the Activation Command Sequence, the following events are initiated. The control unit queues up a pico station Configuration session for the targeted pico station. The control unit initiates this session by first transmitting an Undeniable Access Message addressed to the targeted pico station on the common control channel. The pico station responds with a Communication Setup Acknowledge message as represented in process task 802 of the pico station Configuration process.

Upon receipt of the pico station Communication Setup Acknowledge command, the control unit transmits to the pico station the parameter information using the standard Parameter Information Message format, after which the pico station acknowledges the receipt of the parameter information messages.

The rest of process task flow for the Configuration process is further illustrated in FIG. 8. Process task 801 proceeds to process task 802 to perform the control unit access function during which the Communication Setup Acknowledge is sent to the control unit. A query task 803 20 determines whether this is the initial Configuration process performed by the pico station. If it is not, a start command timer task 804 is initiated. If it is the initial Configuration process, a task 805 is entered to clear the EEprom ram image registers of the pico station. Following clearing of the registers, task 806 captures and acknowledges receipt of the best server identity. A task 807 then captures and acknowledges receipt of the power level assignment. Following task 807, a task 808 captures and acknowledges receipt of the operating channel numbers for the pico station, and a task 809 captures and acknowledges handset assignments. A task 810 then captures and acknowledges operating mode assignments and the End Session command and a task 811. saves the ram image to the EEprom.

Following execution of tasks 805–811, a task 812 clears all traffic registers in the pico station and sets the status LED to green. Upon successful execution of task 812, the pico station exits back to the Main Loop process task indicated in FIG. 7.

Any NAK from the pico station will result in the transmission by the service control unit of a retransmitted Parameter Information Message. If all messages are successful, the control unit will then issue an End Session command to the pico station, and report the activation of this pico station to the system host. The control unit then saves to its hard disk a data file for this pico station keyed to the pico station ESN, containing the assigned parameters for the pico station.

Service control unit access events following initial configuration result in process 804 initiating the Configuration Function Update process which begins with query task 815. Query task 815 determines if a command has been received from the control unit addressed to this pico station. A Yes result will start query task 816 which monitors command timer activity for expiration.

A No result at query task 816 loops back to the start of query task 815 to continue monitoring for control unit commands. Expiration of the command timer forces a Yes result at query task 816 which returns to the Main Loop at entry gate 720.

Receipt of a command will result in a Yes at query task 815 which starts query task 817 to detect new configuration assignments from the control unit. A Yes result to task 817 initiates process task 818 to capture and ACK the changes to pico station configuration.

Process task 818 then starts process task 819 to restart the command timer and then loop back to the start of query task 815 to await further commands.

Should the command not be a configuration change, the No result at query task 817 starts query task 820 which determines if an End Session command has been received.

A No result at query task 820 loops back to the start of query task 815 to await further commands.

When an End Session command is determined at query task 820, the Yes result starts process task 821 to acknowledge the termination of this control unit session.

Process task 821 then starts process task 822 which saves the new configuration data to the EEprom, then returns to the Main Loop at 720.

The pico station, upon receipt of its initial configuration information, can then enter the. Pre-authorization task and await manual depression of the authorization button or further contact from the service control unit. The pico station status LED will show steady green indicating to the customer that handset authorization may now be accomplished.

Handset Authorization Process

The consumer must then authorize each of his handsets for use with his pico station. This process is instituted to prevent unauthorized usage of the pico station and the associated telephone line. The process also establishes the overall coverage area within which the pico station and handsets will communicate. The physical location of the pico station is also confirmed during this process, through the comparison of the cellular Best Server information collected from the handsets during the authorization setup process with the information provided to the pico station by the service control unit during the Configuration process.

Referring now to FIGS. 7, 9, 16 and 19, the Authorization function will be described, including both handset and pico station process tasks.

The handset to be authorized must be powered on and in the cellular idle state indicated at task 1901. Query task 1902 will detect whether the user is pressing the menu key. Query task 1903 then monitors for the Base Station Auth selection, made from the handset menu function, and exits to process task 1905 which will display Base Station Auth and start the Handset Authorization task 1601. The handset must then be brought into close proximity of the pico station, since the process task is performed at extremely low transmit power levels, with each element requiring very strong signal level to prevent unintentional access to any nearby pico stations.

The consumer must then depress the authorization button on the pico station, which is detected by query task 710 in the Main Loop task 720. A Yes result from query task 710 initiates Handset Authorization task 901. The pico station monitors the button On state in query task 902 and starts the button debounce timer via task 903. Query task 904 monitors to see that the button is still On at the debounce time-out. If the button is Off, a query task 904 No result causes a loop back to query task 902, whereas the button ON test No result will cause task 901 to return to Main Loop 720. Debounce time is set to 500 ms to ensure the switch has positive closure before execution of further process tasks.

If the query task 904 outcome is Yes, the pico station performs process task 905 which tunes the pico station transmitter to the known setup/control channel and commences sending the authorization overhead signal stream 3002 via the forward control channel. This overhead stream consists of pico station words 2801, 2802 and 2803. The pico station then starts a ten second authorization timer in process task 906.

Figure 16:
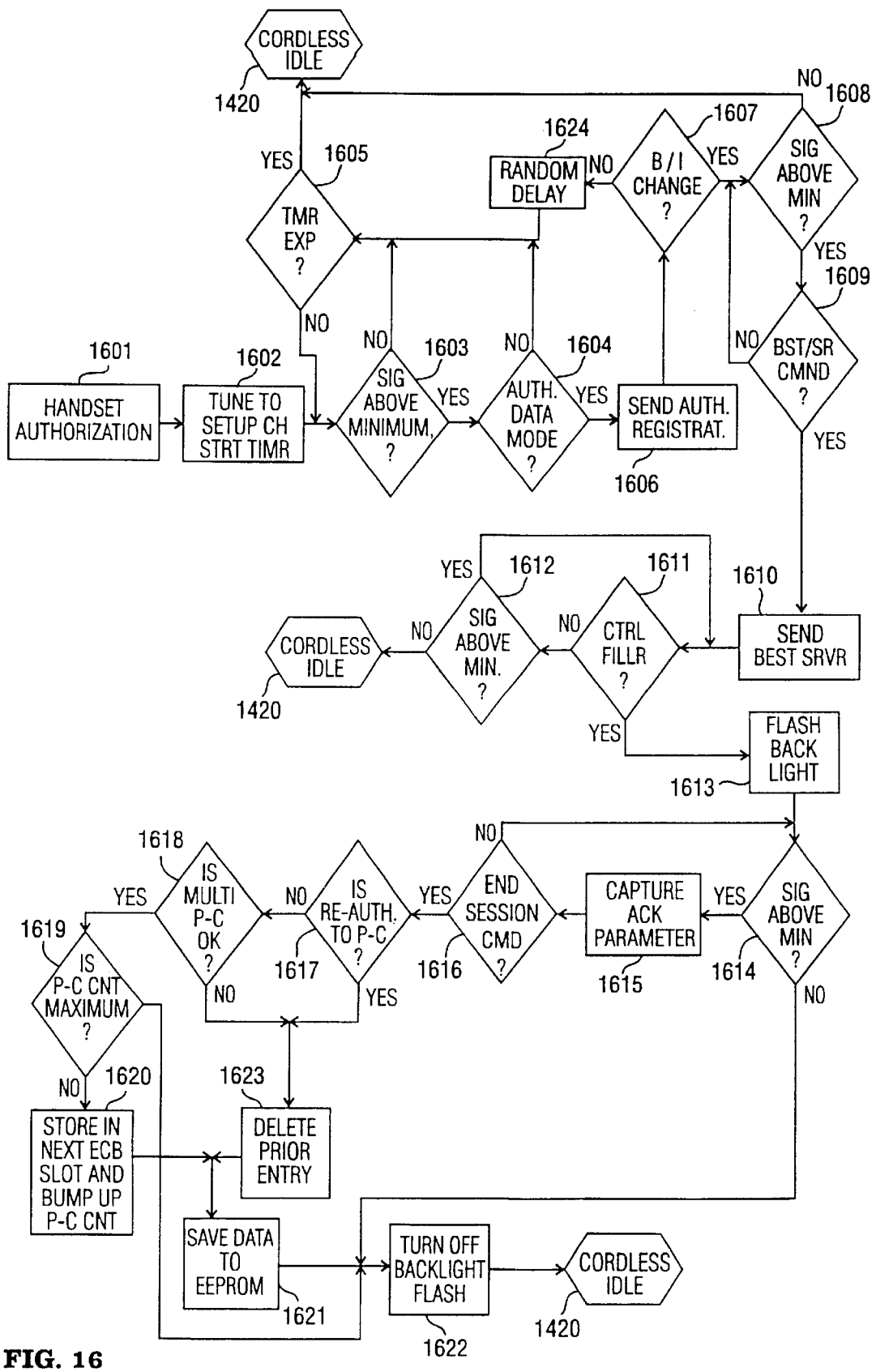
FIG. 16 is a flow diagram of handset operation during handset Authorization function.
Figure 17:
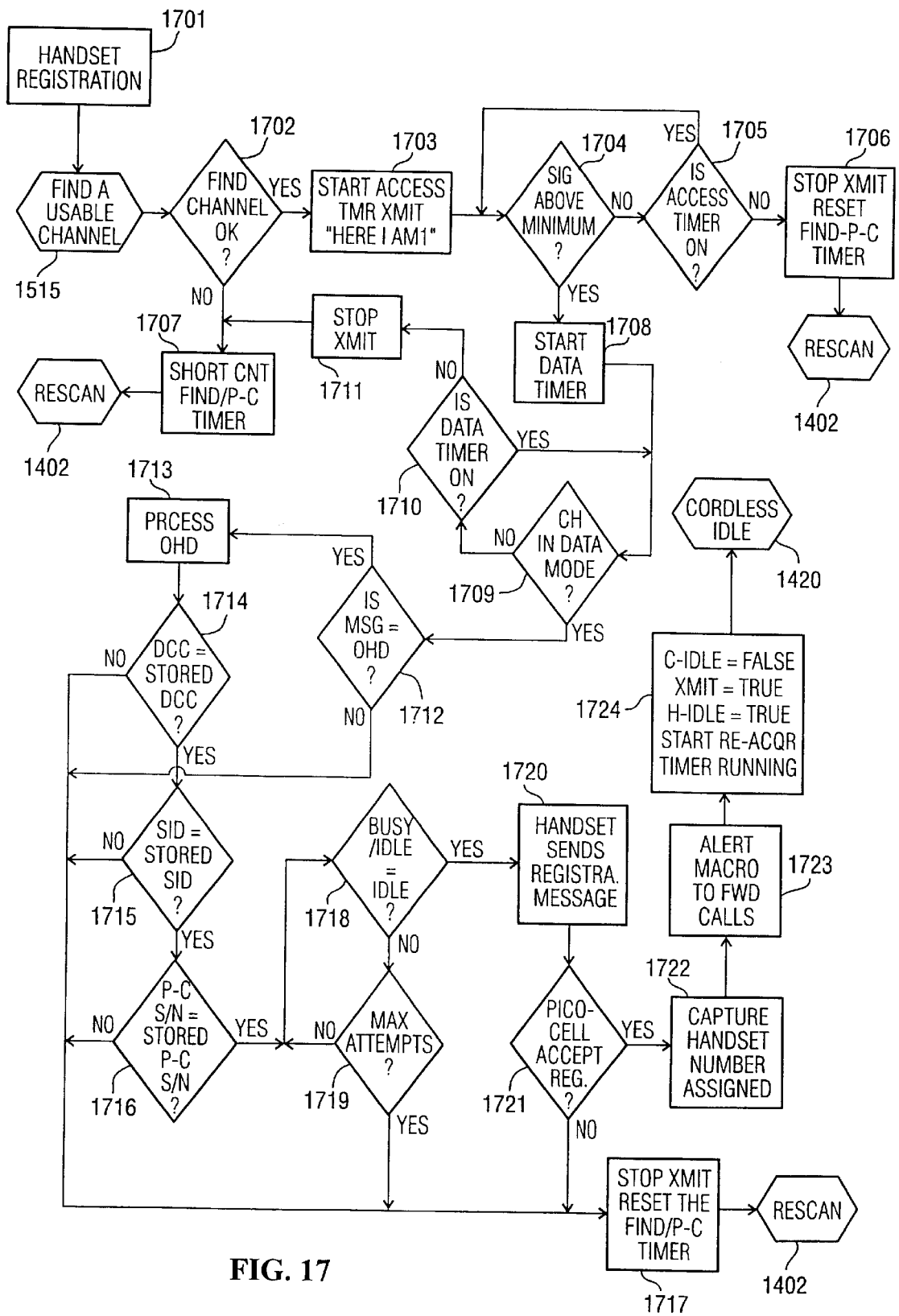
FIG. 17 is a flow diagram of handset operation during handset Registration function.

Referring now to FIG. 16, the execution of Handset Authorization task 1601, causes entry into process task 1602, wherein the handset is tuned to the common/control channel, and a ten second authorization timer is started. Query task 1603 monitors for signal strength in the forward control channel of −60 dbm or more. If a pico station signal is not present, query task 1605 monitors for time-out of the ten second authorization timer. If the result of task 1605 is Yes, task 1601 exits to cordless idle at gate 1420. Otherwise, a query task 1605 No result causes a return to query task 1603 to monitor signal strength again.

Once query task 1603 determines sufficient signal strength, query task 1604 monitors for the presence of the pico station authorization overhead stream. A query task 1604 Yes result initiates query task 1605 to test again for timer expiration.

A query task 1604 Yes result initiates process task 1606 which will allow the handset to commence sending its three word authorization stream 3005 consisting of words 2701, 2707 and 2709. Word 2707 local field will contain the I'LL TAKE IT call answer message. This transmission conforms to EIA-553 section 2.6.3.5 protocol for handset reverse control channel messages.

If the pico station query task 907 does not receive a signal from the handset at a level of −60 dbm or greater, it will not respond to the transmission. In conjunction with that process, handset query task 1607 monitors the pico station Busy/Idle bit in the forward control channel overhead stream. The handset will cease the transmission upon sending of 104 bits without detecting the forward control channel Busy/Idle bit transition from the pico station. A handset query task 1607 No result passes task 1601 to process task 1624, which will delay the task for a random period >10 ms <200 ms. Query task 1605 is then initiated which will lead the handset to resend its authorization stream. The handset is programmed to transmit at its power level 7 (approx. 2 mw output) for these transmissions.

The pico station query task 907 monitors the signal level of the handset and if it is not above the minimum then query task 908 monitors for expiration of the 10 second authorization timer. If the timer has not expired, the pico station returns to query task 907 and retests the handset signal level.

Should query task 908 sense that the timer has expired, the pico station performs process task 909 which turns off the transmitter and LED flash state (if On) and then exits back to the Main Loop at 720. The handset will detect loss of signal from the pico station by query task 1603, and expiration of its authorization timer, as detected by query task 1605, which will cause the handset to return to its Cellular Idle task through the Cordless Idle entry gate at 1420.

When query task 907 measures adequate signal strength from the handset, the pico station performs process task 910 during which the pico station captures the handset MIN and ESN data. Query task 911 monitors the captured ESN and MIN against the list of allowed handsets given to the pico station by the service control unit during activation. If the handset was not expected by the pico station, a query task 911 No result initiates process task 909 to terminate the authorization process. A query task 911 Yes result initiates process task 912, which requests and captures the cellular Best Server Information from the handset.

A handset query task 1607 Yes result initiates query task 1608, whereby signal strength of the pico station is monitored for a −6 dbm or greater level. If the pico station fails to accept the handset ESN and MN, query task 1608 will detect the loss of signal and its No result forces the termination of task 1601 via the cordless idle exit at 1420. A query task 1608 Yes result initiates query task 1609, which monitors for the Best Server command from the pico station. Failure to receive this command will cause task 1601 to loop back to query task 1608 to again monitor signal strength When query task 1609 detects the Best Server command, it initiates process task 1610 which causes the handset to send the cellular Best Server information to the pico station.

Task 1610 then initiates query task 1611, which seeks to identify the control filler overhead from the pico station to indicate that a successful link has been established for the Authorization process to continue. A No result at query task 1611 initiates query task 1612 which monitors for sufficient signal level. A Yes result at task 1612 loops back to query task 1611. A No result at 1612 exits through the cordless idle gate 1420.

A pico station process task 912 resulting in capture of the Best Server data, passes task 901 to process task 913, which will send a control filler word stream 2804 on the forward control channel and cause the pico station LED to start flashing. Query task 914 then compares the captured Best Server data against the data list of allowable cellular Best Servers downloaded to the pico station by the service control unit during the Configuration process.

A query task 914 No result initiates process task 909 which will terminate the process if the pico station data fails to match the cellular Best Server data. This condition indicates the pico station location has been changed since it was configured by the service control unit.

Receipt of the control filler word results in a Yes at Query 1611 which initiates process task 1613. The handset will then commence flashing its back-lighted display in response to process task 1613, and upon query task 1611 detection of this initial control filler word stream, to indicate the successful start of Authorization. The handset will then enter its parameter transfer loop. The handset light will continue to flash during the session, as long as the pico station signal remains above the −60 dbm level, or until the pico station issues an End Session command at session completion.

A query task 914 Yes result passes control to the pico station parameter transfer loop. This loop is used to transmit to the handset the Parameter Information message 2902, utilizing the Parameter Information message format described in 3001.

The pico station parameter transfer loop begins with process task 915, which starts the cycle timer. Task 901 then initiates process task 916 which formats and transmits the first Parameter Information message, followed by a Control Filler word stream, on the forward control channel. Query task 917 then monitors for an ACK signal from the handset. Should query task 917 result in a No result, query task 918 is initiated to monitor whether the cycle timer is still running. A query task 918 Yes result, initiates process task 916, thereby retransmitting the last message. If query task 918 determines that the cycle timer has elapsed, the resulting No state initiates process task 909 to end the current process.

A query task 917 Yes result initiates query task 919 which monitors for completion of the Parameter Information list. A query task 919 No result initiates process task 915 to pass each remaining parameter. A query task 919 Yes result initiates process task 920 which transmits the End Session command on the forward control channel, resulting in termination of the LED flash, and the process then exits through 720 to the Main Loop.

The handset parameter transfer loop consists of query task 1614, which monitors the pico station signal strength, process task 1615 which captures the Parameter Information message and issues an ACK or NAK reply on the Reverse Control Channel, and query task 1616 which monitors for the End Session command from the pico station. Task 1601 can exit this loop as a result of signal loss detection during query task 1614, which then initiates process task 1622. Process task 1622 turns off the backlight flash and returns the handset to Cellular Idle via the Cordless Idle entry at gate 1420.

When query task 1616 detects the End Session command, task 1601 control initiates query task 1617, which compares this pico station serial number to the numbers of all previously authorized pico stations. A Yes result from query task 1617 initiates process task 1623, which will delete the previously stored information in this pico station slot. Process task 1623 then passes control to process task 1621, which will store the parameter information collected during this authorization interval into the handset EEprom.

A query task 1617 No result initiates query task 1618, which monitors for multiple pico station authorizations for this handset. Each handset is capable of storing information about and communicating with up to three different pico stations. If multiple pico stations are not authorized, a query task 1618 No result initiates process task 1623. A yes response to query task 1618 initiates query task 1619 to determine if the authorized count of pico stations has been previously reached. A query task 1619 Yes result initiates process task 1622 to abort the save process task. A No result from query task 1619 initiates process task 1620, which increments the count of stored pico station data files and initiates process task 1621, to save the file in the EEprom and then return to Cellular Idle via the Cordless Idle entry gate at 1420.

Pico Station Main Loop

Referring back to FIG. 7, the pico station exits the Authorization function through the Main Loop gate entry gate at 720. Query task 703 identifies the occurrence of the service control unit activation event and initiates query task 704, which detects the occurrence of the handset Authorization event. A query task 704 Yes result initiates query task 710, which monitors the state of the authorization button. A query task 710 No result initiates query task 711, which monitors the condition of the telephone line connected to the pico station. Should query task 711 determine that the line status has changed, it initiates process task 712, which will then issue update commands to all registered handsets. A query task 711 No result passes control to the Scan Channels task at gate 1001.

The pico station will spend most of its time in the Idle loop, utilizing the telephone line interface to monitor line status and activity, and utilizing the pico station radio to scan all of its assigned channels for handset or service control unit access attempts.

The pico station will exit the pico station Idle loop to transmit:

a. in response to an access attempt from one of its registered handsets;

b. an Update signal to a registered handset of changes in the telephone line status;

c. when signaling a registered handset of an incoming call;

d. when a handset is an active participant in a telephone call;

e. when the Authorization button on the pico station is depressed; and f. in response to an Undeniable Access Message from the service control unit.

At all other times, the pico station is in a scanning receive mode with its pico station transmitter turned off.

In order to transmit, the pico station must monitor the selected channel for availability. i.e., freedom from transmission of other units. This is accomplished by measurement of Received Signal Strength Indication (RSSI), providing a numerical value that represents the amount of RF energy present at the pico station location on the channel being examined. The pico station has been preset by the service control unit to a Busy Channel RSSI tolerance value above which a channel is to be considered to be in use by monitoring units and therefore is not to be used by the pico station for any transmission.

Handset Registration Process

Both the pico station and the handset operate in a restricted RF coverage environment through control of transmit power and establishment of minimum signals levels for accessing one another.

To consider a channel active for handset access attempts, the pico station has also been preset by the service control unit at an Access Minimum RSSI level below which access attempts shall not be responded to by the pico station. Another purpose of this Access Minimum RSSI in addition to controlling the coverage area of the pico station, is to allow the pico station to identify channels having unacceptable signal levels, and rapidly move to channels where its handsets may be trying to gain access at an acceptable signal level.

The Registration process is initiated by the handset during its Rescan task when the handset location analysis process detects that it is in the coverage area of the Best Server cell site that also covers the pico station. The handset will then periodically attempt to access the pico station by selecting an idle channel from the plurality of channels it was given during the Authorization process task as long as the handset remains within the Best Server coverage area. The duration of this Registration Attempt is sufficiently long to allow the pico station to scan through all the channels and still have time to detect the handset Registration Attempt and respond to the handset.

Referring now to FIGS. 10, 14,15, and 17, the Handset Registration process will be described.

The pico station enters the Scan Channels task 1001 and executes process task 1002 which tunes the pico station receiver to the first of the plurality of channels assigned for pico station use. Control is then passed to query task 1003 which monitors the channel for received signal strength above the Access Threshold level assigned to the pico station by the service control unit during configuration.

If insufficient signal level is present, a query task 1003 No result initiates process task 1004 which increments the channel number and tunes the receiver to the new channel. Process task 1004 then initiates query task 1005 which compares the current channel number with the maximum allowed channel number. If the channel number does not yet exceed the maximum number, the query task 1005 No result loops back to query task 1003 to test signal strength on the newly selected channel. If the maximum channel number is exceeded, query task 1005 initiates query task 1013 which monitors the at-home timers for activity.

If no at-home timer is running, a query task 1013 No result initiates process task 1018, which cancels all Handset Registrations with the pico station. Task 1010 then exits back to the Main Loop at entry 720.

The handset performs a pico Idle task in accordance with EIA-553 Rescan standards. This task is entered at 1420 and initiates query task 1418 which monitors to see if the handset is in the Home Idle mode. A query task 1418 No result initiates query task 1401, which monitors for a pico station data fill which was acquired through the Authorization process described above. A query task 1401 Yes result initiates the Handset Registration process at 1701.

The handset enters Handset Registration at 1701 and proceeds to utility task 1515 which tunes the handset to the first of the plurality of channels assigned for pico station use in process task 1516. Query task 1517 is then initiated, which monitors the received signal strength on that channel to determine if its less than the hang-up threshold level provided to the handset during the pico station authorization process described above. This is the RSSI level used by the handset to determine a busy channel. If query task 1517 determines that the signal is not below the minimum, the No result initiates process task 1519 which increments the channel number and tunes the handset to this new channel. Process task 1519 then initiates query task 1520.

Query task 1520 monitors the channel number selected and compares it with the maximum channel number allowed. If the channel number does not exceed the maximum, the query task 1520 No result initiates query task 1517 to test the signal level on the newly selected channel. A query task 1520 Yes result initiates process task 1521 to return a failure to task 1701. Query task 1702 detects the failure and initiates process task 1707 which starts the find base station timer with a short count value to ensure rapid return to this process task. Control then passes back to the Rescan task at the entry gate 1402.

Once query task 1517 detects an acceptable channel, it initiates process 1518 to return O. Query task 1702 is satisfied, which initiates process task 1703, which then starts the access timer and causes the handset to commence transmitting the Here I Am1 message words 2701 and 2702 using the 3006 format. Process task 1703 then initiates query task 1704.

Query task 1704 monitors the forward control channel for signal from the pico station above the Access Threshold level. If such a signal is not present, the query task 1704 No result initiates query task 1705 which monitors the access timer running condition. A query task 1705 Yes result initiates query task 1704 to monitor again for signal from the pico station. When query task 1705 detects access timer time-out, the No result initiates process task 1706.

Process task 1706 stops the transmissions from the handset and restarts the find base station timer at its normal value. Task 1706 then returns to the Rescan task via entry at gate 1402.

The pico station query task 1003 will answer Yes when the handset signal is sufficient and then task 1001 control initiates query task 1006 to monitor the received signal for presence of the 10 k bit Manchester encoded data. If query task 1006 fails to detect data, the No result initiates process task 1004 to tune to the next channel. The Yes result from 1006 initiates query task 1007, which analyzes the contents of the received data stream to identify a Handset Authorization Registration message.

A query task 1007 Yes result initiates process task 1008 which performs the Registration process ;with the handset, and then exits back to the Main Loop via entry 720. A query task 1007 No result initiates query task 1009.

Query task 1009 monitors the received data message for a service control unit Access request. A query task 1009 Yes initiates process task 1010 which sets the service control unit Access Flag and starts the Base Station Idle task at 1101. A query task 1009 No result initiates query task 1011 which monitors the received data message for a handset Access request. A Yes result from query task 1011 initiates process task 1012 which sets the handset access flag and starts the Base Station Idle task at 1101.

A query task 1011 No result loops back to process task 1004 to increment to the next channel and continue with the scan.

Base station process task 1008 starts an at home timer at the successful completion of the Registration process. This timer is a register holding the value of the time of the event plus 300 seconds. Query task 1013 upon detecting this non-zero timer register, passes its Yes result to query task 1014.

Query task 1014 monitors the current time value against the stored S value in each non-zero at home timer register. If the current time equals or exceeds the stored value, a query task 1014 Yes result initiates process task 1015 which cancels the registration of the associated handset(s) for failure to reacquire the pico station within the allowable time window.

Control then initiates query task 1016 which monitors to determine if any handsets remain registered. A query task 1016 No result returns to the Main Loop at entry 720. A query task 1016 Yes result initiates process task 1017 which performs an Update Process task for the remaining registered handset(s) to inform them of their status with the pico station. Process task 1017 then starts the Base Station Idle task at 1101.

Base station Idle task 1101 proceeds to query task 1102 which monitors for ring voltage on the house line. A No result at query task 1102 initiates query task 1103 which determines if the service control unit is requesting access for update or audit functions.

A Yes result at 1103 initiates process task 1105 which tunes the base station to the common control channel and ACKs the service control unit access. Process 1105 initiates query task 1106 which analyzes the SCU command for a configuration update. A Yes result at query task 1106 passes control to the base station configuration task at 801. A No result to query 1106 initiates query task 1107 which determines if the service control unit command is for an audit purpose.

A No result to query 1107 exits through process task 1111 which terminates the service control unit access and returns to the main loop at 720.

If this was an audit session, a Yes result at query task 1107 initiates process 1108. Process 1108 transfers the requested audit (full or partial) data to the service control unit and initiates query task 1109.

Query task 1109 monitors for a clear traffic register command from the service control unit and a Yes result initiates process task 1110 to reset all traffic registers to zero.

Process task 1110 and the No result to query task 1109 both initiate process task 1111 to terminate the service control unit access session and return to the main loop at 720.

Referring again to FIG. 17, Base Station Process task 1008 causes the pico station to transmit its three word Registration Overhead message stream (words 2801, 2802 and 2803) on the forward control channel using format 3002. The handset query task 1704 will detect the presence of signal on the channel and initiate process task 1708 which starts the data acquisition timer. Query task 1709 then monitors the channel for the presence of 10 k bit Manchester encoded data. A query task 1709 No result initiates query task 1710 which monitors for data acquisition timer running condition. A query task 1710 Yes result loops back to query task 1709 to monitor for data again. A query task 1710 No output initiates process task 1711 which causes the handset to stop transmitting its Here I Am1 message. and start the find base station timer with a short count value to return to this process task quickly.

A query task 1709 Yes result initiates query task 1712 which monitors for the pico station Registration Overhead format message. A query task 1712 No result initiates process task 1717 which terminates the registration attempt, restarts the find base station timer at its normal value, and returns to the Rescan task at entry gate 1402. A query task 1712 Yes result starts the Process Base Overhead task at 1713.

The Process Base Overhead task then initiates query task 1714, which compares the received Digital Color Code in the Registration Overhead message against the stored Digital Color Code for this pico station. If they do not match, the query task 1714 No result initiates process task 1717.

A query task 1714 Yes result initiates query task 1715 which monitors the received System Identity against the stored SID for this pico station. A query task 1715 No result initiates process task 1717. A query task 1715 Yes result initiates query task 1716, which compares the received pico station serial number with the stored serial number for this pico station. A query task 1716 No result initiates process task 1717. A query task 1716 Yes result initiates query task 1718 which monitors the Busy/Idle control bit in the pico station overhead stream for an idle condition. A query task 1718 No result also initiates query task 1719 which monitors the number of consecutive Busy conditions encountered against the maximum allowed count.

If the maximum count is not exceeded, a query task 1719 No result initiates query task 1718 to again test the Busy/Idle bit condition. Should the maximum be exceeded, the query task 1719 Yes result initiates process task 1717 to terminate the registration attempt.

A query task 1718 Yes result initiates process task 1720 which causes the handset to send its 3 word Registration message to the pico station. This message consists of words 2701,2702 and 2709 sent in the 3005 format. Process task 1720 initiates query task 1721 which monitors for an Acceptance reply from the pico station. The acceptance reply message from the pico station consists of a two word combination of 2805 and either 2808 or 2809, sent in the 3003 format.

Failure to receive acceptance causes a query task 1721 No result to initiate process task 1717 to terminate the registration attempt. A query task 1721 Yes result initiates process task 1722, which captures the Home Handset Unit Number assignment from the pico station. Process task 1722 then initiates process task 1723.

Process task 1723 performs the automatic Call Forward notification function with the cellular switch. This function activates Call Forwarding for any incoming calls directed to this handset MIN. These calls will be forwarded to the pico station telephone number by the cellular switch. Process task 1723 then initiates process task 1724.

Process task 1724 sets the home flag (H-Idle=True), clears the Cellular Idle flag. (C-Idle=False), sets the transmit enable flag (XMIT=True) and starts the Reacquire timer. Task 1701 then loops back to the Rescan task at Cordless Idle entry gate 1420.

Should the handset fail to locate the pico station, the return to the Rescan task is through entry gate at 1402. Control is passed to query task 1403 which determines the appropriate system from which to seek cellular service. The System Identity assignments are specific to either the non-wireline (A-Side is always Odd) or wireline (A-Side is always Even) service provider.

Query task 1403 monitors the handset's stored SID for even value and the Yes result initiates process task 1404. A query task 1403 No result initiates process task 1405.

Process task 1404 selects the B-Side setup/control channels while process task 1405 selects the A-Side setup/control channels. Both processes initiate task 1406, which scans the selected channels seeking cellular service in accordance with EIA-553 standards. Control then initiates query task 1407 which monitors the result of this search for cellular service availability.

If no service is available, the query task 1407 No result initiates Busy scan entry at gate 1500 which initiates query task 1501. Query task 1501 monitors for a pico station found state, and a No result initiates process task 1502 which starts the find pico station timer. Process task 1502 loops back to Rescan task at gate 1402 to again look for cellular service.

If query task 1407 answers Yes, query task 1408 is initiated to monitor for Home Idle flag=True. This test is part of the Second Line function which enables a registered handset to use the cellular network to complete a call origination when the house line is occupied.

A query task 1408 Yes result indicates that this rescan event is a second line attempt and process task 1409 is initiated to display Premium on the handset.

Process task 1409 starts query task 1423 which examines the overhead global message for a local identity. A Yes result at query task 1423 initiates process task 1424 which replaces the Premium display with the Local display on the screen.

Process task 1424 and the No result at query task 1423 both initiate query task 1410 which monitors the dialed digit buffer for a call to 911. A Yes result at query 1410 exits to the cellular call task at the output number entry 1917.

If query task 1410 determines that this second line attempt was not a call to 911, the No result initiates the dial number entry process at 2000.

A query task 1408 No result initiates query task 1411 which compares the SID of the available cellular system with the stored cellular SID for this handset. If they match, a query task 1411 Yes result initiates query task 1412 which determines if this is the first cycle through this loop, by checking whether the condition of the Cellular Idle Flag= True.

A query task 1412 No result initiates process task 1413 which issues the Call Forward Off command to the cellular switch to transfer calls to this handset MIN back to this handset. Process task 1413 then initiates process task 1414 which sets the Cellular Idle Flag=True to ensure that only one cycle occurs through this loop access. Process task 1414 starts the find base station timer and initiates query task 1415. A query task 1412 Yes result or a query task 1411 No result also initiates query task 1415.

Query task 1415 monitors the Best Server identity established during the search for cellular service and compares it with the stored Best Server identities that represent the Best Server for each of the pico stations that this handset is authorized to use.

The Best Server term conveys the identity of the cell site that is providing the strongest signal to the handset from the cellular system. Each cell site is uniquely identifiable by the setup/control channel number it utilizes and the Digital Color Code assigned to its message stream.

Since cellular cell sites provide coverage to a limited area, the handset can restrict its search for one of its pico stations to those instances that the handset is physically within the coverage of the Best Server cell site that is nearest to the pico station location.

It should be recognized that this technique greatly reduces the number of unnecessary transmissions from the handset, and vastly improves the availability of pico station channels for conversations.

Should query task 1415 identify a match of Best Servers, its Yes result initiates query task 1416 which monitors the find base station timer for activity. If the find base station timer is running, a query task 1416 Yes result initiates process task 1417.

Process task 1417 places the word Premium on the handset display to indicate to the user that service is being provided by the cellular system for which an air time charge for usage exists. Process task 1417 then starts query task 1425 which monitors the contents of the overhead data stream issuing from this cell site. Each cell site within the cellular system has a new message appended to its normal overhead stream. This is a local control message in the Global Action Message Format as defined in EIA-553. The 16 bit local field of this message is encoded with the zone identity of this cell site.

Each handset has a table of zone identities that was loaded during the authorization process. Query task 1425 compares the received zone identity to this table and a match will result in a Yes output at query 1425. The Yes result initiates process task 1426 which places the word Local on the display instead of Premium.

Process task 1426 and the No result from query task 1425 both return to the cellular Idle task at 1901.

It should be recognized that the ability to display, on the handset, multiple location sensitive service availability messages greatly enhances the customer's informed decision-making capabilities as to what, if any, costs may incur when placing or receiving calls at a given location.

Query task 1416, upon detecting that the find base station timer has elapsed, will react to the result No to start the Handset Registration task at 1701.

Handset Idle Mode

The home handset unit number is dynamically assigned by the pico station and will change as handsets enter and leave the service area of the pico station.

Upon accepting the registration of a handset, the pico station starts an at-home timer for this unit. The registered handset must then reacquire the pico station before this timer elapses or the pico station will cancel its registration.

Pico station activity in telephone calls, when uninvolved handsets are inhibited from transmitting, will suspend both the pico station's at-home and handset reacquisition timers. Handset response to pico station OHD messages will cause the pico stations to reset their respective at-home timers to a value equal to the time of the event plus 300 seconds.

Each handset also starts its internal reacquisition timer upon acceptance of registration by the pico station. The interval of this timer is set to be 270 seconds, which is 30 seconds less than the pico station's at-home timer.

When the handset's reacquisition timer lapses, the handset will attempt to reacquire the pico station by locating an idle channel and transmitting a Here I Am2 Access Attempt Registration message.

The pico station will respond to this message by repeating the registration sequence described previously.

Each failure of the handset's to reacquire the pico station will increment a counter. If this reacquire failure counter reaches maximum count, the handset is forced to switch to the cellular network and attempt to acquire service there. Each successful reacquisition of the pico station by the handset resets its reacquire failure counter, and restarts its reacquisition timer.

Figure 14:
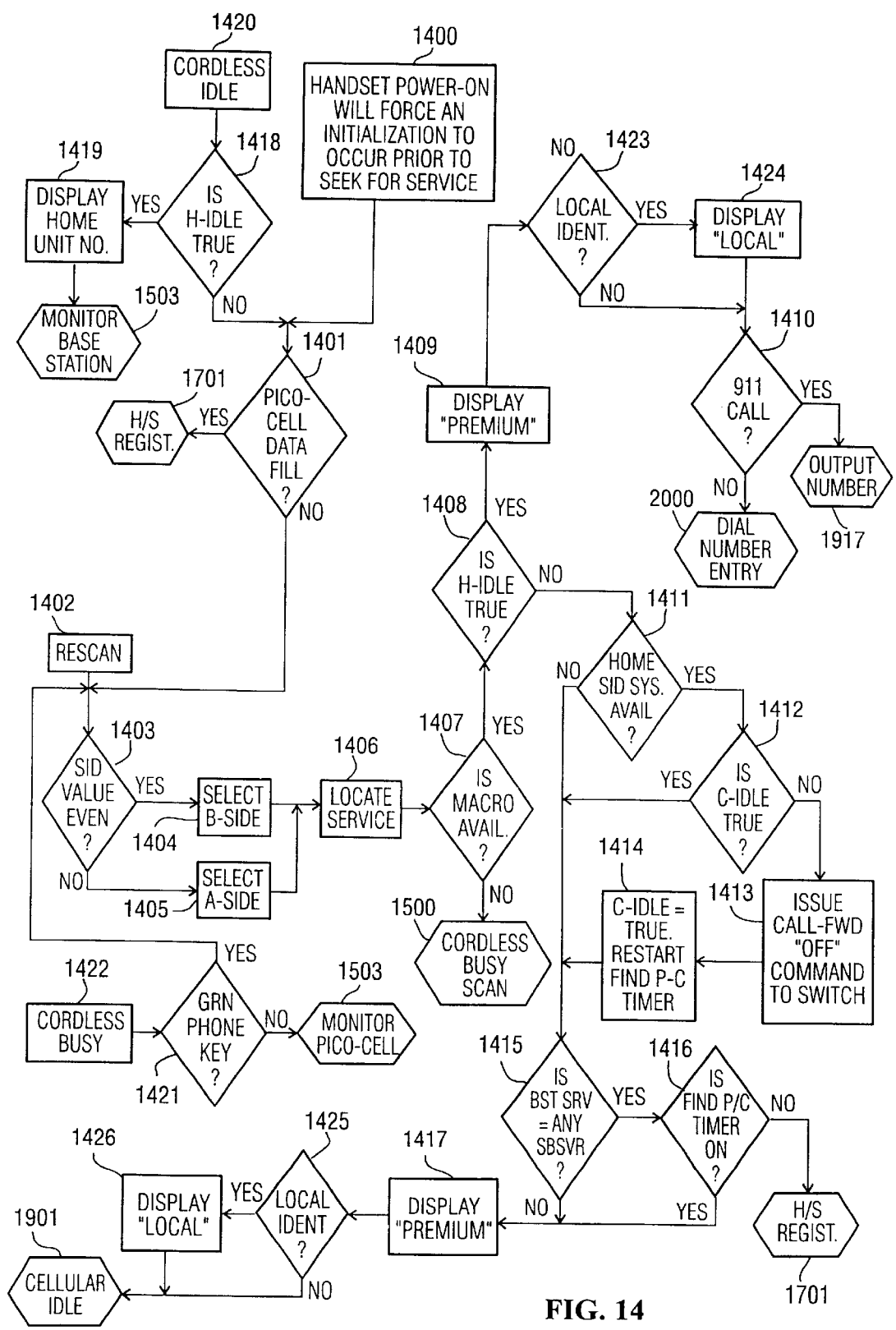
FIG. 14 is a flow diagram of handset operation during Initialization and service determination function.
Figure 15:
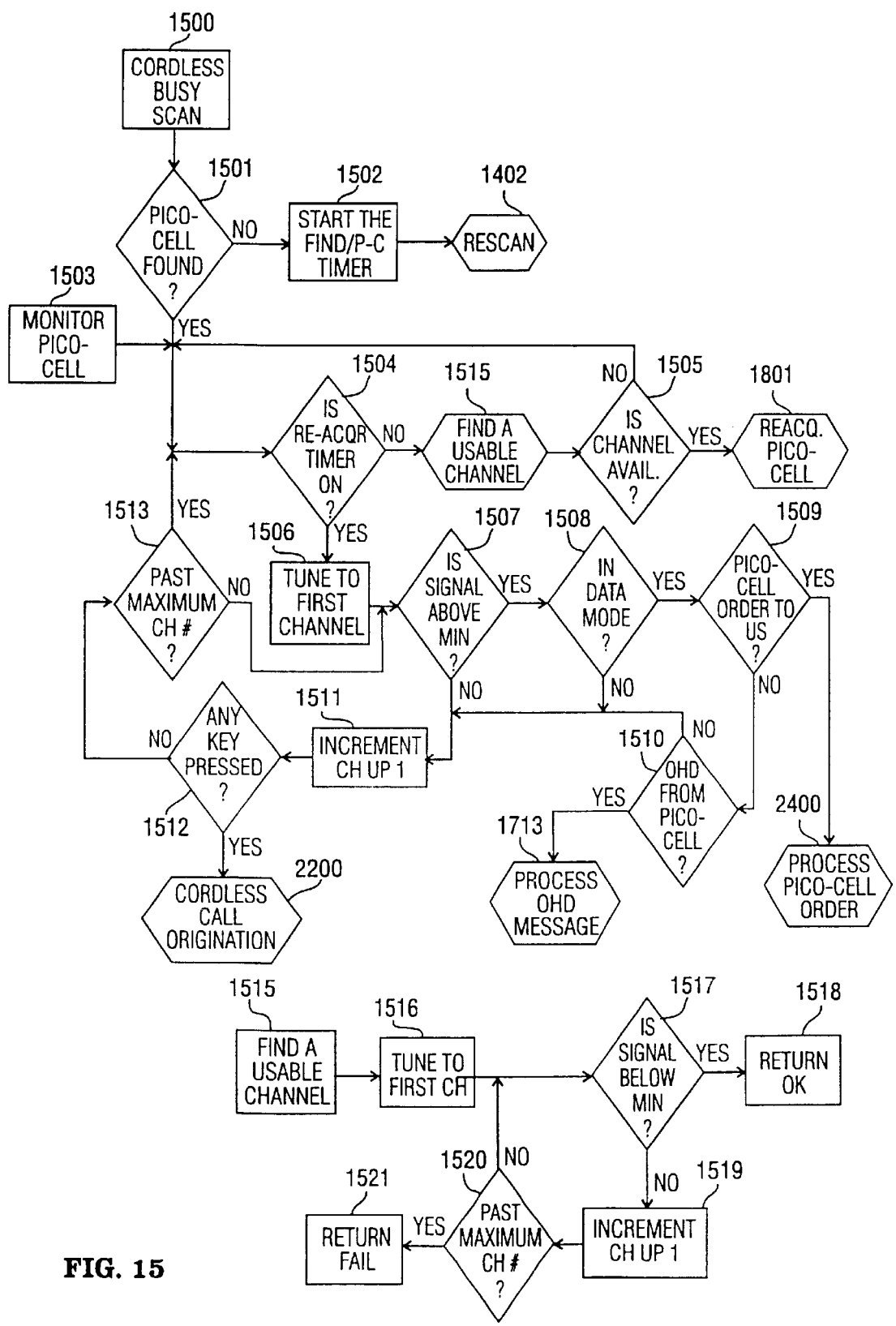
FIG. 15 is a flow diagram of handset operation during monitor pico station and find channel function.
Figure 18:
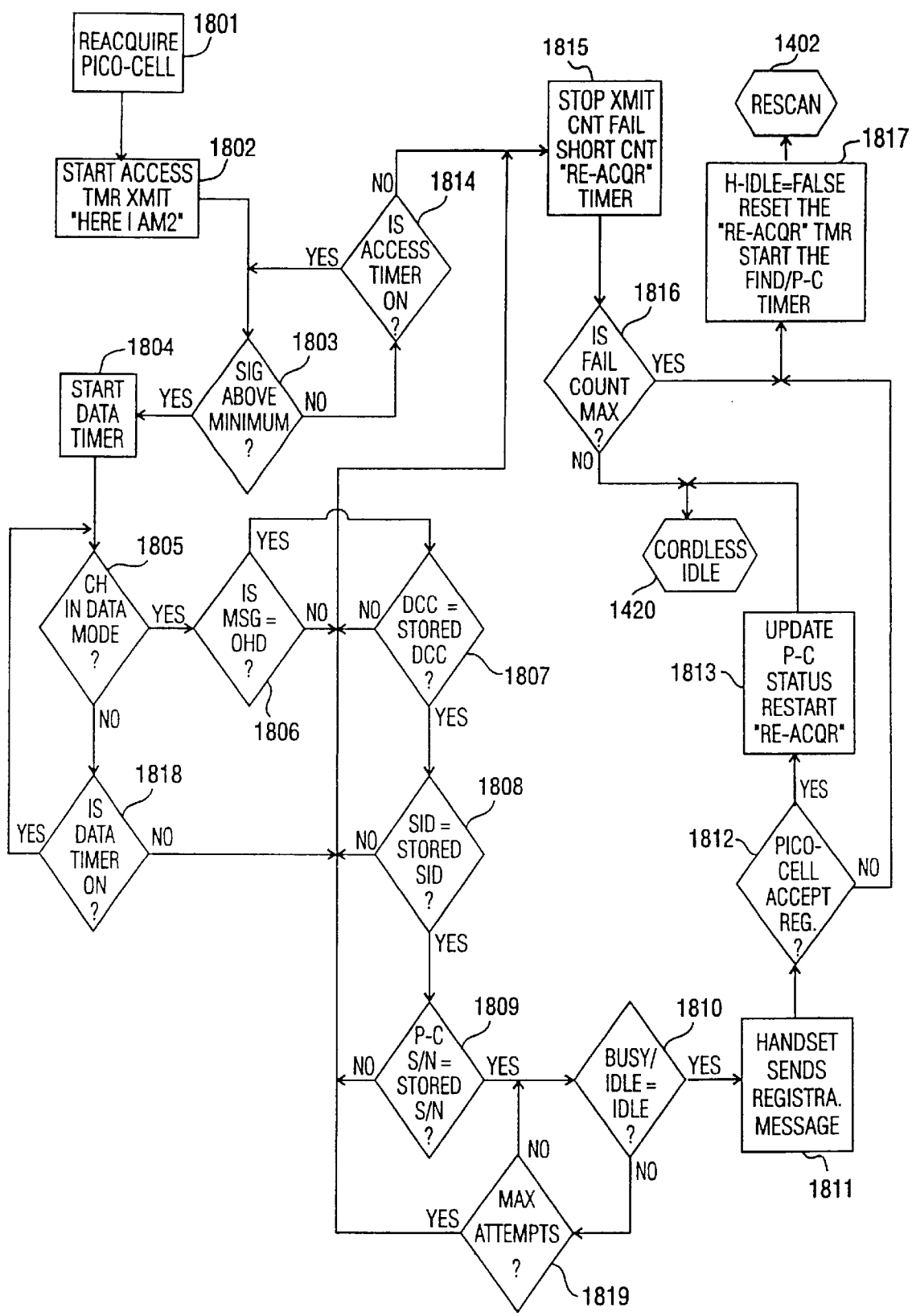
FIG. 18 is a flow diagram of handset operation during handset Reacquire pico station function.

This process is more fully described by referring to FIGS. 14,15 and 18.

The flow from the Handset Registration task to the Rescan task at the Cordless Idle entry 1420 proceeds to query task 1418 which monitors the Home Idle flag=True. A Yes result from query task 1418 initiates process task 1419, which places the assigned home unit number on the handset display to indicate to the user that service is being provided by the pico station. Process task 1419 initiates a Monitor Base Station task at entry gate 1503.

The Monitor Base Station task initiates query task 1504 to monitor the reacquire timer for activity. If this timer has not elapsed, a query task 1504 Yes result initiates the Monitor Base Station loop at process task 1506. Process task 1506 then tunes the handset to the initial pico station channel and initiates query task 1507.

Query task 1507 monitors the channel for the presence of signal above the access threshold. If high signal is not present, a query task 1507 No result initiates process task 1511 which increments the selected channel up by one and initiates query task 1512.

Query task 1512 monitors the handset keypad for any activity by the user. If a key is pressed, query task 1512 starts the Cordless Call Origination task at entry gate 2200. If no keypad activity is detected, the query task 1512 No result initiates query task 1513, which compares the selected channel number with the maximum channel number allowed. If the channel selected is greater than the maximum, a query task 1513 Yes result initiates query task 1504 to again test the condition of the reacquire timer. Until then, the query task 1513 No result returns to query task 1507 to monitor the selected channel for the presence of signal front the pico station.

When query task 1507 detects the presence of signal, its Yes result initiates query task 1508 which monitors for the presence of 10 K bit Manchester encoded data. If the signal present is not data, a query task 1508 No result initiates process task 1511 to step to the next channel. If data is present, a query task 1508 Yes result initiates query task 1509.

Query task 1509 examines the data stream for pico station orders directed to this handset, and a Yes response will initiate the Process Base Order task, as defined by EIA-553 standards, at entry gate 2400. A query task 1509 No result initiates query task 1510 which examines the data stream for overhead from the pico station. A Yes response from query task 1510 starts the Process Base overhead task at entry gate 1713.

If the data stream is not the authorized pico station, a query task 1510 No result initiates process task 1511 to check the next channel.

The handset will make a complete pass through all allowed pico station channels on the scan before returning to query task 1504 to test the reacquire timer activity.

The handset will spend most of its pico mode idle time in this scan loop monitoring for pico station activity that may involve this handset.

When the reacquire timer expires, a query task 1504 No result initiates utility task 1515 to find a usable channel as described previously. The utility task Yes result returns to query 1505 which tests for channel found. A No result loops back to query task 1504 which restarts the process.

A query task 1505 Yes result starts the Reacquire Pico Station task at 1801 when an idle channel is located.

The Reacquire Base Station task 1801 commences with process task 1802 which starts the access timer to limit the duration of the attempt. Process task 1802 then causes the handset to begin sending the Here I Am2 Registration message stream consisting of words 2701 and 2704 in the 3006 format on the reverse control channel direction of the selected channel. Process task 1802 initiates query task 1803 which monitors the forward control channel direction on the selected channel for the presence of signal from the pico station above the Access Threshold Level. If the pico station is not responding, a query task 1803 No result initiates query task 1814 which monitors the access timer for activity. Should the access timer expire, a query task 1814 No result initiates process task 1815.

Process task 1815 stops the transmission on the reverse control channel and increments the fail counter. Process task 1815 then loads the Reacquire timer with a small value to ensure rapid return to this task.

Control passes then to query task 1816 which monitors the fail counter for a value equal to the maximum number of failures allowed (three). If the Reacquire pico station task failures reach the maximum count, query task 1816 exits to process task 1817.

Process task 1817 dears the home idle flag, zeroes the reacquire timer and starts the find base station timer. This action effectively cancels the handset from the home condition. Process task 1817 then exits back to the Rescan task at the rescan entry gate 1402.

If the fail counter is not yet at a maximum count, a query task 1816 No result returns control to the Cordless Idle entry of the Rescan task at 1420.

Until query task 1814 detects access timer time-out, its Yes result initiates query task 1803 to continue looking for pico station signal. When 1803 detects the presence of sufficient signal, its Yes result initiates process task 1804.

Process task 1804 starts the data presence timer and initiates query task 1805, which monitors for presence of 10 K bit Manchester encoded data. If data is not present, a query task 1805 No result initiates query task 1818 which monitors the data presence timer for activity. If the timer has expired, a query task 1818 No result initiates process task 1815.

While the timer is running, a query task 1818 Yes result initiates query task 1805 to test again for the presence of data. When data is detected by query task 1805, its Yes result initiates query task 1806 to test the data stream for Overhead. If the data message is not Overhead, a query task 1806 No result initiates process task 1815.

A query task 1806 Yes result initiates query task 1807 which compares the received Digital Color Code in the overhead stream with the stored Digital Color Code for this pico station. If the Digital Color Code does not match, a query task 1807 No result initiates process task 1815. If the Digital Color Codes match, query task 1807 Yes result initiates query task 1808.

Query task 1808 compares the received system identity with the stored SID for this pico station. If they don't match, the query task 1808 No result initiates process task 1815. A query task 1808 Yes result initiates query task 1809 which compares the received pico station serial number with the stored serial number for this pico station. The No result from query task 1809 initiates process task 1815. A Yes response from query task 1809 initiates query task 1810.

Query task 1810 monitors the Busy/Idle bit in the forward control channel overhead for Idle. If the Busy/Idle bit is Busy, query task 1810 No initiates query task 1819 which counts the failure and compares the count to the maximum number of failures allowed. If the maximum has been reached, a query task 1819 Yes result initiates process task 1815. The No result from query task 1819 initiates query task 1810 to test the Busy/Idle condition again.

A query task 1810 Yes result initiates process task 1811 which causes the handset to send the three word Registration message to the pico station. This stream consists of words 2701, 2703 and 2709 sent in the 3005 format on the reverse control channel. Process task 1811 initiates query task 1812.

Query task 1812 monitors the pico station response for acceptance of this registration. The pico station response consists of a two word message using word 2805 with either 2808 or 2809 in the 3003 format.

If the pico station fails to accept this handset, a query task 1812 No result initiates process task 1817 to exit home service. A query task 1812 Yes result initiates process task 1813 which performs the internal housekeeping needed to update the handset of the pico stations status. This process task also dears the fail counters and restarts the reacquire timer. Process task 1813 then exits back to the rescan task at the Cordless Idle entry 1420.

Cellular Idle

Figure 19:
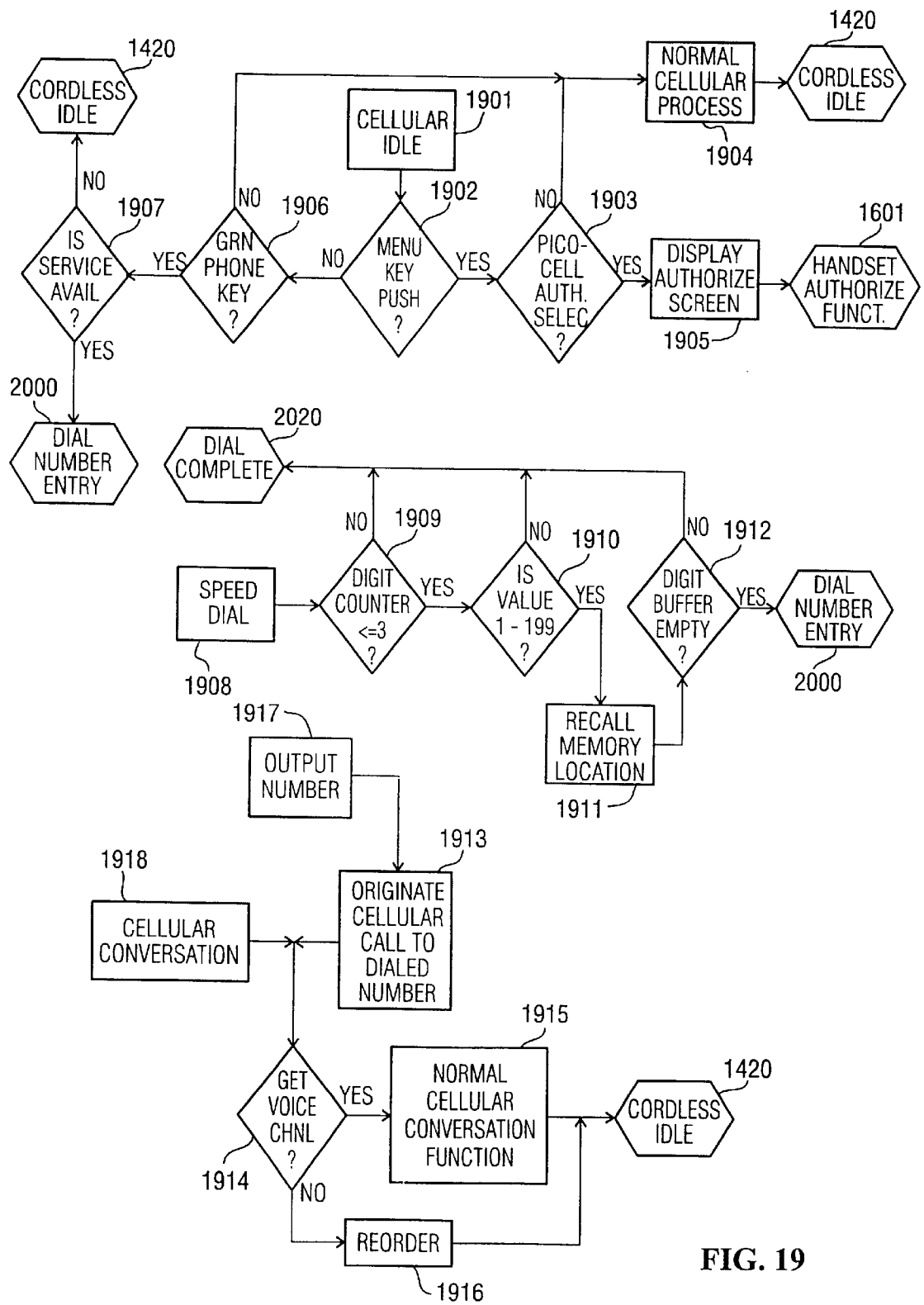
FIG. 19 is a flow diagram of handset operation during handset cellular idle, speed dial, and cellular conversation functions.

While the handset is away from the coverage of the pico cell, it becomes an active cellular handset. Referring to FIG. 19, operation of the handset in the cellular idle mode process at 1901 proceeds to query task 1902 which monitors for menu key activity discussed previously.

If the menu key is not pressed, the No result at query task 1902 initiates query task 1906 which tests for phone key activity. A No results to query task 1906 initiates process task 1904 which performs normal cellular idle functions as defined in EIA-553. Process 1904 exits to the rescan task at cordless idle entry gate 1402.

If query task 1906 detects the phone key On, the Yes result initiates query task 1907 which tests for service availability. If service is unavailable, the No result at query task 1907 exits to the rescan task at the cordless idle gate 1420.

If query task 1907 detects service, the yes result initiates the dial number entry task at 2000.

Handset Joining A Call In Progress

The pico station is constantly monitoring the status and condition of the telephone line to which it is connected. Should a call origination occur from one of the household extensions also connected to this telephone line, the following events occur:

a. The pico station will issue an Update message to each of its registered handsets. This Update message Local field will show the line status as In Use (word 2809);

b. Each handset will display Line In Use in place of Home # to inform the user that someone is using the house line.

The pico station will allow any of its registered handsets to join into this call in progress. Referring to FIGS. 10, 11, 12, 13, 19, 22, and 23, events are described for a handset to join the call.

When the handset user presses the off-hook (green) key in the pico mode, the event is detected by query task 1512 in the Monitor Base Station task which starts the Cordless Call Origination task at entry gate 2200.

The Cordless Call Origination task initiates query task 2201 which monitors for the green key On state. If the answer is No, query task 2201 exits to process task 2202 which handles all other first keystrokes, then returns to the cordless idle task 1420. A query 2201 Yes result initiates query 2203 to determine if the green key occurs in response to a ring event. A query 2203 Yes result initiates the answer call task entry gate 2120. A query task 2203 No result starts the Acquire pico station task at 2210.

The Acquire pico station task 2210 initiates the utility task at 1515 to locate a usable channel. When query task 1515 is completed, it returns to query task 2211.

A task 2211 No result initiates the Reorder task at 1916, which will generate reorder tone to the user to signify the failure to accept a call origination. Task 2211 Yes result initiates process task 2212 which starts the access timer and causes the handset to commence transmitting the I Want In1 Access Request message on the reverse control channel direction of the selected channel. This message consists of words 2701 and 2706 sent in the 3006 format. Process task 2212 then initiates a Contact pico station task at entry gate 2301.

The pico station will detect the handset Access request message in query task 1011 and its Yes result initiates process task 1012, which sets the handset access flag prior to starting the Base Station Idle task at 1101.

Contact Base Station task 2301 initiates query task 2302 to monitor the forward control channel direction of the selected channel for the presence of signal from the pico station above the access threshold level. If high signal is not present, a query task 2302 No result initiates query task 2312 which monitors for activity on the access timer.

The Base Station Idle task proceeds to query task 1102 which monitors for ring voltage on the line. A No result from query task 1102 initiates query task 1103, which monitors for Service Control Unit Access Flag=True. The No result from query task 1103 initiates query task 1104 which monitors for the Handset Access Flag=True. A No response from query task 1104 returns to the Main Loop at entry 720. A Yes response from query task 1104 initiates process task 1112.

Process task 1112 captures the handset ESN/MIN and dialed number if ready. Control then initiates query task 1113 which compares the captured ESN/MIN with the pico station authorized -handset data. If query task 1113 answers No, control passes back to the Main Loop at entry 720. A Yes response from query task 1113 initiates Originate or Join Call task at entry gate 1201.

Originate or Join Call task 1201 initiates process task 1202 which performs an Update for all registered handsets, informing of a Handset In Use status, and initiates process task 1203. Process task 1203 issues the appropriate response message to the handset (Acceptance words 2805 and 2808 if line is idle; or Voice Channel Assignment if line is in use). The pico station awaits the handset response in process task 1203.

If the Access timer is running, a query task 2312 Yes result returns to query task 2302 to again check for signal from the pico station. If the query task 2312 response is No, process task 2313 is initiated, which stops the transmission of the Access message from the handset, counts the failure to contact the pico station and places a reduced count value in the reacquire timer. Process task 2313, then initiates query task 2314.

Query task 2314 monitors the dialed digit buffer contents for the presence of a 911 emergency call, as entry into this process was the result of failure to contact the pico station.

If the result is Yes, query task 2314 immediately exits the Acquire pico station task and enters the Rescan task at entry gate 1402 to attempt to locate service from the cellular network to complete this emergency call.

If 911 was not the dialed number, a query task 2314 No result initiates query task 2315 to compare the fail count with the maximum number of failures allowed. If the count is maximum, a query task 2315 Yes result initiates process task 2316, which cancels the handset home condition. This is accomplished by process task 2316 clearing the home idle flag, resetting the reacquire timer to zero and starting the find base station timer. Process task 2316 then returns to the Rescan task at the Rescan entry gate 1402.

If query task 2315 does not detect a maximum fail count, its No result returns to the Rescan task at the Cordless Idle entry gate 1420.

When query task 2302 detects signal from the pico station, its Yes result initiates process task 2303 which starts the data presence timer and initiates query task 2304.

Query task 2304 monitors for the presence of 10K bit Manchester encoded data in the forward control channel direction on the selected channel. If data is not present, a query task 2304 No result initiates query task 2317 which monitors for activity of the data presence timer. A query task 2317 Yes result initiates query task 2304 to test again for data presence. If query task 2317 provides a No result, process task 2313 is initiated to terminate the access attempt.

When data task 2304 detects data presence, query task 2305 is initiated to compare the received Digital Color Code with the stored Digital Color Code for this pico station to detect a match. If the result is No, process task 2313 is initiated to terminate the access attempt. If query task 2305 result is Yes, query task 2306 is initiated.

Query task 2306 examines the pico station response message for a Voice Channel Assignment Order as defined by EIA-553. If query task 2306 results in a No, query task 2318 is initiated, which examines the pico station response message for acceptance in the form of words 2805 and 2808.

A No response from query task 2318 initiates query task 2319, which examines the contents of the dialed digit buffer for the presence of 911. A Yes response from query task 2319 initiates the Rescan task at the Rescan entry 1402 to attempt to locate cellular service to handle the emergency call. If the query task 2319 result is No, the reorder task at 1916 is initiated to inform the user of the inability to handle the call.

A query task 2318 Yes result, or a query task 2306 Yes result initiates process task 2307, which causes the handset to send its two word response message to the pico station as acknowledgment. Query task 2308 is then initiated which monitors for the receipt of a Voice Channel Assignment from the pico station. A query task 2308 No result initiates query task 2321.

Figure 12:
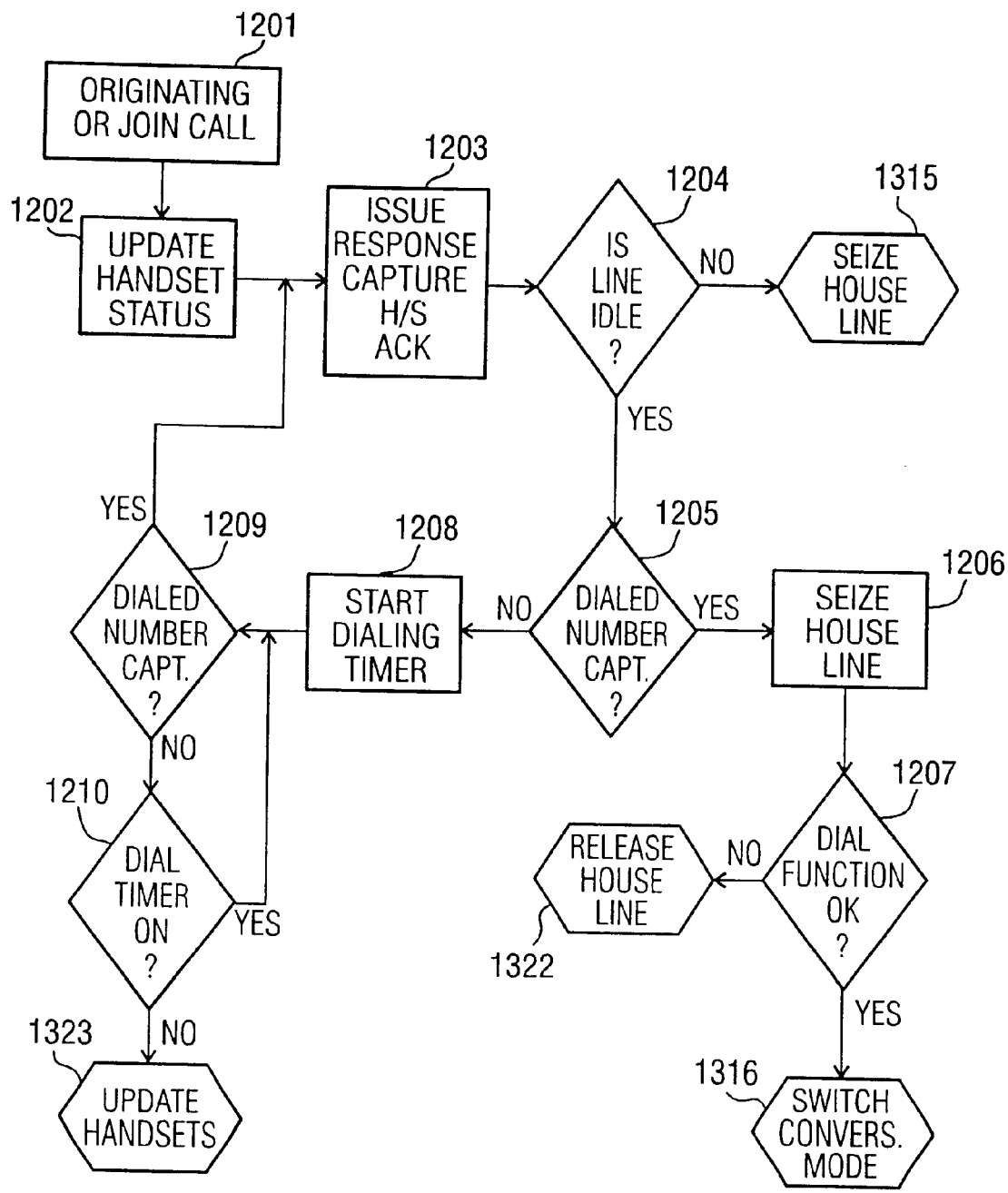
FIG. 12 is a flow diagram of pico station operation during Call Origination and Call Joining function.

Referring now to FIG. 12, the pico station process task 1203 captures the handset response and initiates query task 1204, which tests the status of the line for Idle. A No result at query 1204 occurs when a Join Call function is performed. This causes task 1201 to exit to seize the house line at 1315. A Yes response from query task 1204 initiates query task 1205 which checks to see if the dialed number has been received from the handset. A No response at query task 1205 initiates process task 1208 which starts the dialing entry timer and initiates query task 1209. Query task 1209 monitors for dialed number capture from the handset. A No result from query task 1209 starts query task 1210 which monitors the dialing entry timer for activity.

A query task 1210 No result forces task 1201 to exit through the update handset entry gate 1323. A Yes result from query task 1210 loops back to query task 1209. A Yes result at query 1209 loops back to process task 1203 to issue an ACK. A Yes result from query task 1205 starts process task 1206 to seize the house line. Process task 1206 initiates query task 1207 which monitors the dial out process for success. If the query 1207 result is No, task 1201 exits through the Release Line entry gate at 1322.

Successful dial out will result in a Yes result from query task 1207 which causes task 1201 to initiate the switch to conversation mode process at entry gate 1316.

Query task 2321 monitors the purpose of the access attempt as a capture pico station event with a dialed number ready to pass. A Yes response to query task 2321 initiates process task 2323 which keeps the handset in transmitting state and passes the dialed number to the pico station for processing. Control then passes back to the Origination task at Conversation entry 2204.

If the query task 2321 result is No, process task 2322 is initiated which turns off the handset transmitter and returns to the Origination task at Dial Number Entry 2000 to capture the dialed number from the user.

A query task 2308 Yes result initiates process task 2309 which tunes the handset to the assigned Voice Channel assigned (same physical channel). Query task 2310 is then initiated which monitors the pico station line status received for In-Use. If the result is No, that initiates query task 2321. If the line is in use, a query task 2310 Yes result initiates query task 2311.

Query task 2311 monitors the contents of the dialed digit buffer for a call to 911. A Yes result initiates the Rescan task at the Rescan entry 1402.

A query task 2311 result No initiates process task 2320 which keeps the handset transmitter on and returns to the Origination task at Conversation entry 2204.

Origination task conversation entry at 2204 proceeds to query task 2205 which monitors the Transmit Enable Flag=True. A No response to query task 2205 initiates process task 2208 which places the Handset In Use message on the display and returns control to the Rescan task at the cordless busy entry 1422. A Yes results initiates query task 2206.

Query task 2206 determines if the pico station assigned a voice channel for this conversation. A No response to query task 2206 initiates query task 2209 which determines if an emergency call is being placed by the user. A Yes response from query task 2209 loops back to the Rescan task at the Rescan entry 1402. A No response from query task 2209 exits to the Reorder task at entry 1916 to inform the user of the failure to handle this call.

A query task 2206 Yes result initiates process task 2207, which performs the normal conversation function as described in EIA-553. Call completion will pass control from process task 2207 back to the Rescan task at the Cordless Idle entry 1420.

Once the conversation is established, pico station process task 1316 initiates the hook-flash monitor loop at query task 1317 which monitors call progress. A query task 1317 Yes result initiates query task 1318, which monitors for a hook-flash from the handset. If query task 1318 response is No, that initiates query task 1319.

If the query task 1318 response is Yes, that initiates process task 1320 which will transmit the hook-flash from the handset to the telephone central office, and then initiate query task 1319.

Query task 1319 monitors the received signal level from the handset and compares it to the Disconnect Warning Level. A Yes response from query task 1319 initiates process task 1321 which issues a Warning Order to the handset. Process task 1321 and a No response from query task 1319 each will initiate query task 1317, to continue monitoring the call for a disconnect event.

When query task 1317 detects a Call Disconnect event, it initiates process task 1322. Process task 1322 then releases the line and initiates process task 1323 which performs an update to all registered handsets informing them of the existing line status and removing the Handset In Use message from their displays. Process task 1323 then returns control to the Main Loop at entry 720.

During this call connection, other household extensions can join or leave the call at will. The pico station will maintain this telephone line to handset connection until one of the following Disconnect events occurs:

a. The pico station fails to detect Supervisory Audio Tone from the handset for 5 seconds;

b. The user presses the On-Hook button which causes the handset to turn off Supervisory Audio tone and transmit a 1800 ms burst of signaling tone;

c. The -far-end element disconnects from the call and dial tone returns to the telephone line;

d. The average measured RSSI of the handset falls below the Dis-Connect RSSI level.

Each registered handset may receive a new unit number assignment from the pico station if the cause of call termination was either a. or d. above as both conditions indicate to the pico station that the active handset is no longer in the service area of the pico station.

Base Station-Handset Call Origination Process

While the pico station is in Idle mode, with the telephone line connected but not in use, any one of the registered handsets can originate a telephone call.

Conventional cellular handset dialing procedures differ dramatically from normal PSTN dialing procedures. A benefit of the present invention derives from restoring the normal PSTN dialing procedure to the handset of the system in both the pico and cellular modes of operation.

This has been accomplished by having the handset generate internal precision dial tone; removing dial tone on entry of first dialed digit; analyzing the number entry against the North American Numbering Plan; and automatically releasing the number to the network upon detection of a complete entry. Cellular customers acclimate rapidly to this system as it does not force them to learn new procedures.

Figure 20A:
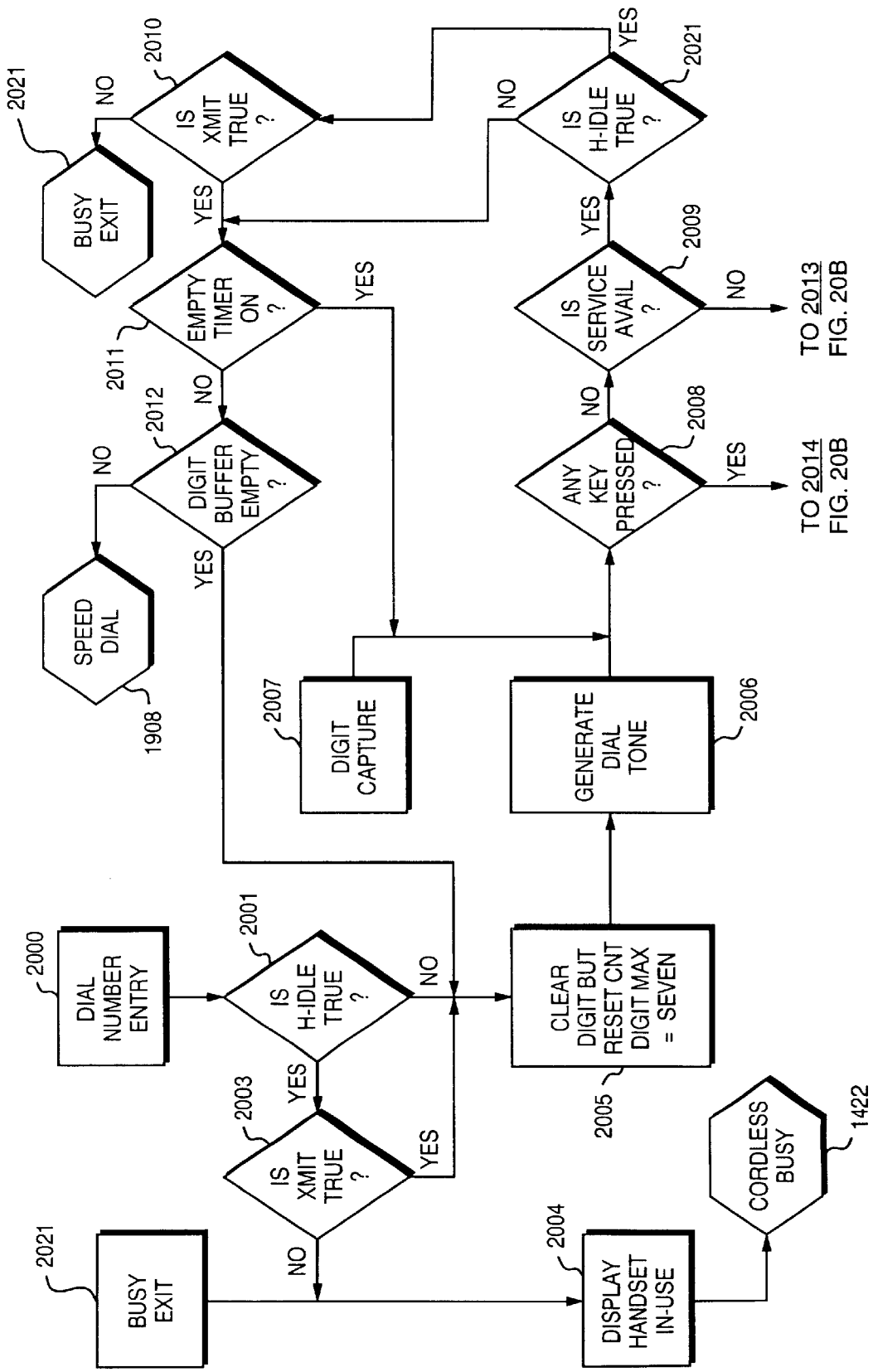
FIG. 20 is a flow diagram of handset operation during dial number entry function.
Figure 20B:
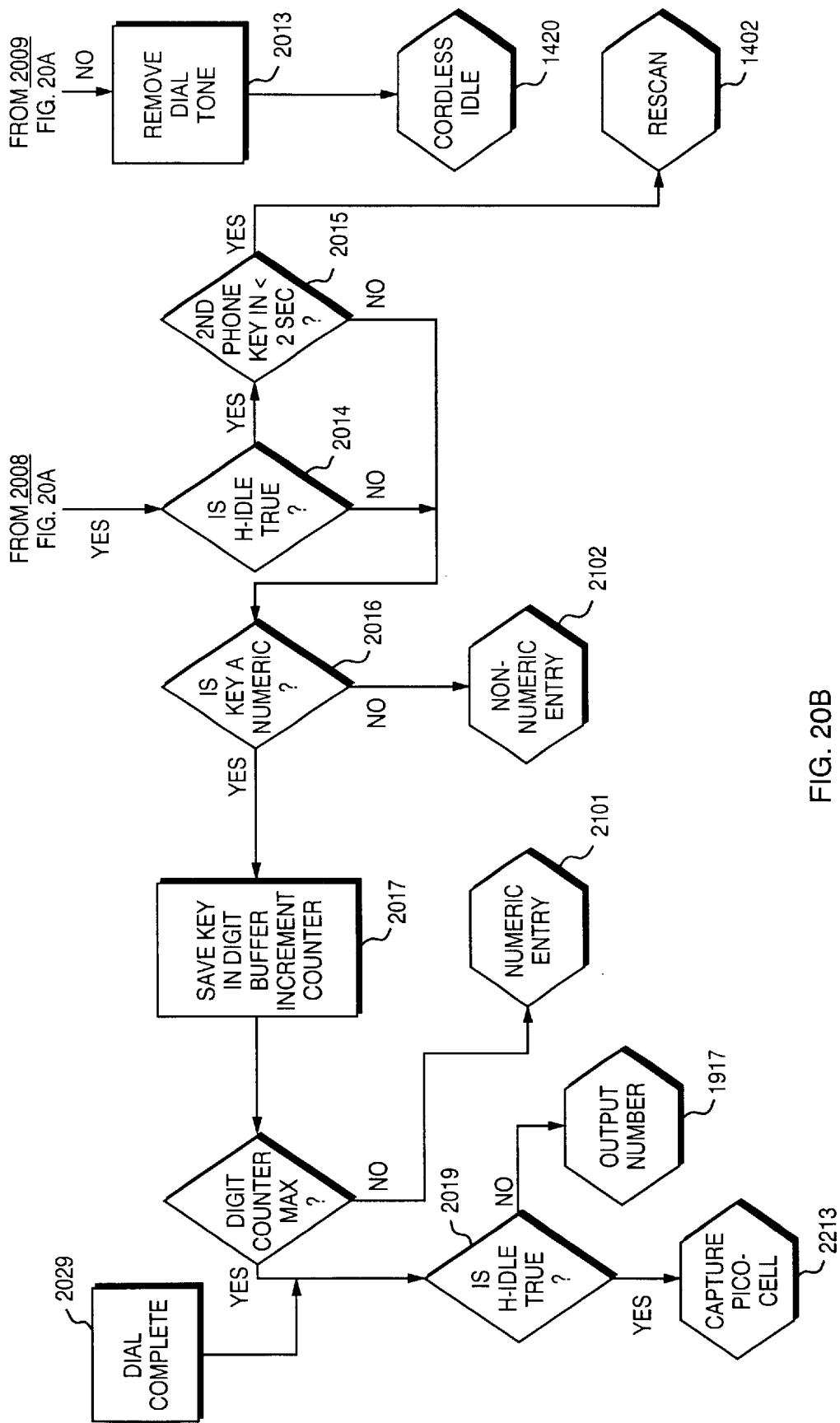
Figure 21:
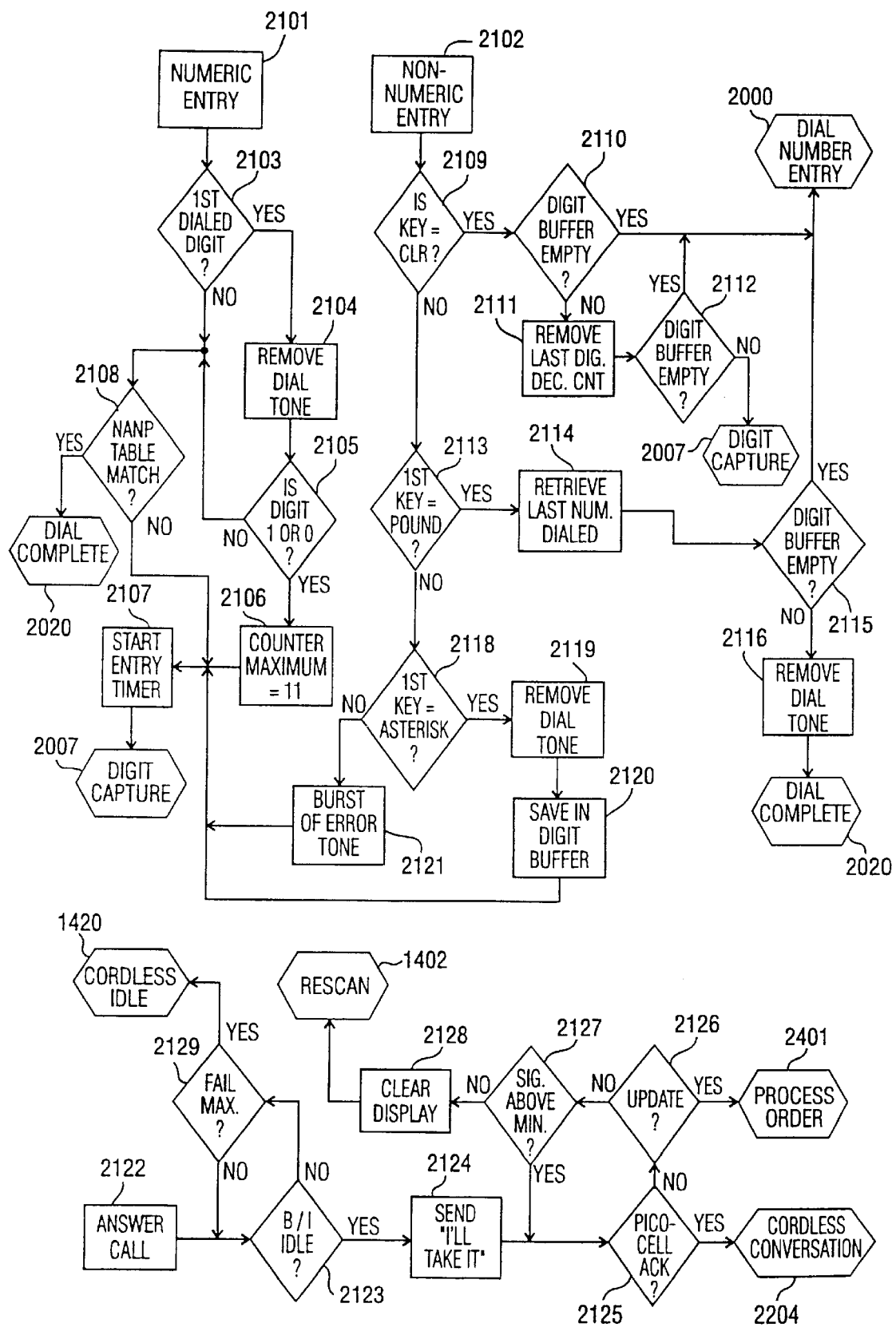
FIG. 21 is a flow diagram of handset operation during numeric entry and non-numeric entry function.

Referring to FIGS. 19,20,21, the handset Call Origination process will be described.

When the handset user presses the Off-Hook (green) key, events will follow the process flow path previously described for handset joining a call in progress up to Dial Number Entry at 2000.

Dial Number Entry task at 2000 initiates query task 2001 to determine if this is a pico mode or cellular connection by monitoring the Home. Idle Flag=True condition. A No result from query task 2001 initiates process task 2005. A Yes result from query task 2001 starts query task 2003 which monitors for Transmit Flag=True. The No result from task 2003 initiates process task 2004 which places the Handset In Use message on the display and returns to the Rescan task at the Cordless Busy entry 1422.

Cordless Busy Entry 1422 initiates query task 1421 as part of the second line option process. Query task 1421 monitors for the green off-hook key press and a Yes result will loop back to the rescan task at query 1403 as previously described. A No result at query task 1421 starts the monitor base station at entry 1503.

If the transmission flag was true, a Yes result at query task 2003 initiates process task 2005 to dear the digit collection buffer, reset the digit counter to zero and to set the maximum expected digit count at seven. Control then passes from 2005 to process task 2006.

Process task 2006 turns on the internal precision dial tone generator to indicate to the user that a call may be placed. Process task 2006 then initiates query task 2008 at the Digit Capture entry gate 2007. Query task 2008 monitors for any key being depressed.

A query task 2008 No result initiates query task 2009 which monitors for service available, by examining the signal being transmitted by the pico station on the selected channel and comparing its level to the disconnect level if H-Idle is true, or checking for macro cellular service if C-Idle is true. If query task 2009 fails to identify presence of service, its No result initiates process task 2013, which removes the dial tone and exits back to the Cordless Idle task at entry gate 1420.

With service available, a query task 2009 Yes result initiates query task 2021 which tests the Home Idle=True Conditions. A No result from query 2021 initiates query task 2011. A Yes result from query 2021 starts query task 2010 which monitors the Transmit=True flag. If the query 2010 result is No, the Dial Number Entry task exits through the busy exit gate at 2021. A Yes result from query task 2010 also starts query task 2011 which checks the entry timer activity.

A query task 2011 No result indicates that the user has failed to make an expected entry. This starts query task 2012 which monitors for digit buffer empty state. If some number of digits have been collected, a query task 2012 No result initiates the Speed Dial task at entry gate 1908.

An empty buffer allows query task 2012 Yes to pass control back to the digit collection loop at the process task 2005 which restarts the process. A query task 201Yes result initiates task 2008.

When task 2008 detects a key press, the Yes result initiates query task 2014 which tests the Home Idle=True Condition. A No result from 2014 initiates query task 2016. A Yes result from query task 2014 starts query task 2015, which checks whether a second Off-Hook (green) key was pressed within two seconds of the initial Off-Hook that started the call. That procedure is used by the handset to bypass the pico station pico mode. This is the second line function which allows the user to force his call origination to the cellular system. One reason for making this choice would be a Line Busy condition on the house line with an important call to make. Yes response from query task 2015, causing exit from the Origination task and entry of the Rescan task at gate entry 1402.

A No response from query task 2015 initiates query task 2016 which examines the key pressed to see if the key was numeric. A No response from query task 2016 initiates the Non-Numeric Entry task at entry gate 2102. The Non-Numeric Entry task at 2102 proceeds to query task 2109 which monitors for a Clear key press. If the task 2109 response is Yes, that initiates query task 2110 which checks the digit buffer for empty condition. If the buffer is empty, a query task 2110 Yes result initiates the Dial Number entry task at the beginning entry 2000. This action leaves the dial tone on.

If the dial digit buffer is not empty, a query task 2110 No response initiates process task 2111 which deletes the last digit entry from the digit buffer and reduces the digit counter by one. Control is then passed to query task 2112 to check the digit buffer for empty condition after this removal. A No response from task 2112 initiates the digit collection loop at the Digit Capture entry 2007. Should task 2112 find the digit buffer empty, its Yes result will restart the Dial Number Entry task at 2000, which will then restore the dial tone to the user.

If query task 2109 response is No, that initiates query task 2113 which monitors the first key pressed for the (#) key. That key acts as the handset Redial Last Number key. A Yes response from query task 2113 initiates process task 2114 which retrieves the Last Number Called and places it into the digit buffer. Process task 2114 initiates query task 2115 which monitors the digit buffer for empty.

If the query task 2115 response is Yes, that causes a loop back to the start of the Dial Number entry task at 2000. If the query task 2114 response is No, that initiates process task 2116 which removes the dial tone and initiates the Dial Complete task at entry gate 2020.

If the first entry was not a (#) key, a No response at query 2113 initiates query task 2118 which monitors the first key pressed for the (*) key. A Yes response from 2118 initiates process task 2119 which removes dial tone and initiates the process task 2120. Process task 2120 saves the (*) in the digit buffer and initiates process task 2107 which starts the Interdigit timer running. Process task 2107 returns control to the digit collection loop at the digit capture entry gate 2007.

If the first entry was not an (*), a No response from query task 2118 initiates process task 2121 which generates a burst of Error Tone to the user and then initiates process task 2107 to start the interdigit timer, Referring back to FIG. 20, if the key pressed was numeric, a query task 2016 Yes result initiates process task 2017, which saves the digit in the digit buffer, and increments the digit counter by one. Control then passes from task 2017 to query task 2018 which compares the digit counter output against the maximum digit count. A Yes response from query task 2018 initiates query task 2019 which will direct the originate task to the appropriate service by monitoring the Home Idle=True condition. A No result from query task 2019 passes control to the output number task at entry gate 1917 and the call will be handled on the cellular network. A Yes result at query task 2019 initiates the Capture Base Station task at 2213.

If all expected digits have not yet been entered, a No response from query task 2018 initiates the Numeric Entry task at 2101 of FIG. 21. The Numeric Entry task proceeds to query task 2103 which monitors for the first dialed digit. A Yes response from query task 2103 initiates process task 2104 which removes the dial tone signal and then initiates query task 2105, which monitors this first digit for either a 1 or a 0 indicating a toll call is being placed. A task 2105 Yes response initiates process task 2106 which resets the digit count maximum value to 11. A No result at query 2103 and a No result from task 2105 each initiate query task 2108.

Query task 2108 compares the accumulated digits in the digit buffer with the North American Dialing Plan to detect a dial complete status. A Yes response from query task 2108 initiates the Dial Complete task at 2020. A task 2108 No response initiates process task 2107 which restarts the interdigit timer.

This unique dialing plan for the handset which utilizes a digit counter process task, interdigit timer process task and comparison to the NANP standards coupled with internal precision dial tone generation enables the user to rapidly enter the desired dialed number. This, in turn, brings to cellular and other special handset usage the advantages of dial tone and the ease of familiar dialing protocol, without send and end button function.

Speed dialing is also internally supported by the handset through interdigit time-out with a non-empty digit buffer by control passing to the Speed Dial entry at gate 1908 from query task 2012 in Digit Capture task 2007. Control proceeds to query task 1909 which monitors the digit counter for a value less than or equal to three which allows for up to 200 speed dial storage registers. A No response from query task 1909 initiates the Dial Complete task entry at 2020. A Yes response from query task 1909 initiates query task 1910.

Query task 1910 monitors whether the value in the digit buffer falls between 1 and 199 speed dial register values. A No response from query task 1910 initiates Dial Complete task entry at 2020, while a Yes response initiates process task 1911 to recall the contents stored at the selected memory location, and places them into the digit buffer. Process task 1911 then initiates query task 1912.

Query task 1912 monitors the digit buffer for empty condition. A Yes response to task 1912 will cause return to the start of Dial Number Entry task 2000. A No response from query task 1912 initiates the Dial Complete task entry at gate 2020, to place the call.

Dial Complete task at 2020 proceeds to query task 2019 to determine routing as described previously.

The cellular origination process of Output Number at entry gate 1917 initiates process task 1913 which originates a call to the cellular network with the accumulated number as the destination address. Process task 1913 then initiates query task 1914 at the cellular conversation entry point 1918.

Query task 1914 monitors for receipt for a voice channel assignment from the cellular switch. Should the call fail to complete, a No result from query task 1914 initiates process task 1916 which generates a reorder tone to alert the user that the call did not go through. Control then passes from process task 1916 back to the Rescan task at the idle entry gate 1420.

If the query task 1914 result is Yes, control passes to the normal cellular conversation function at task 1915. Upon call completion, process task 1915 returns control to the Rescan task at the Cordless Idle entry gate 1420.

Figure 22:
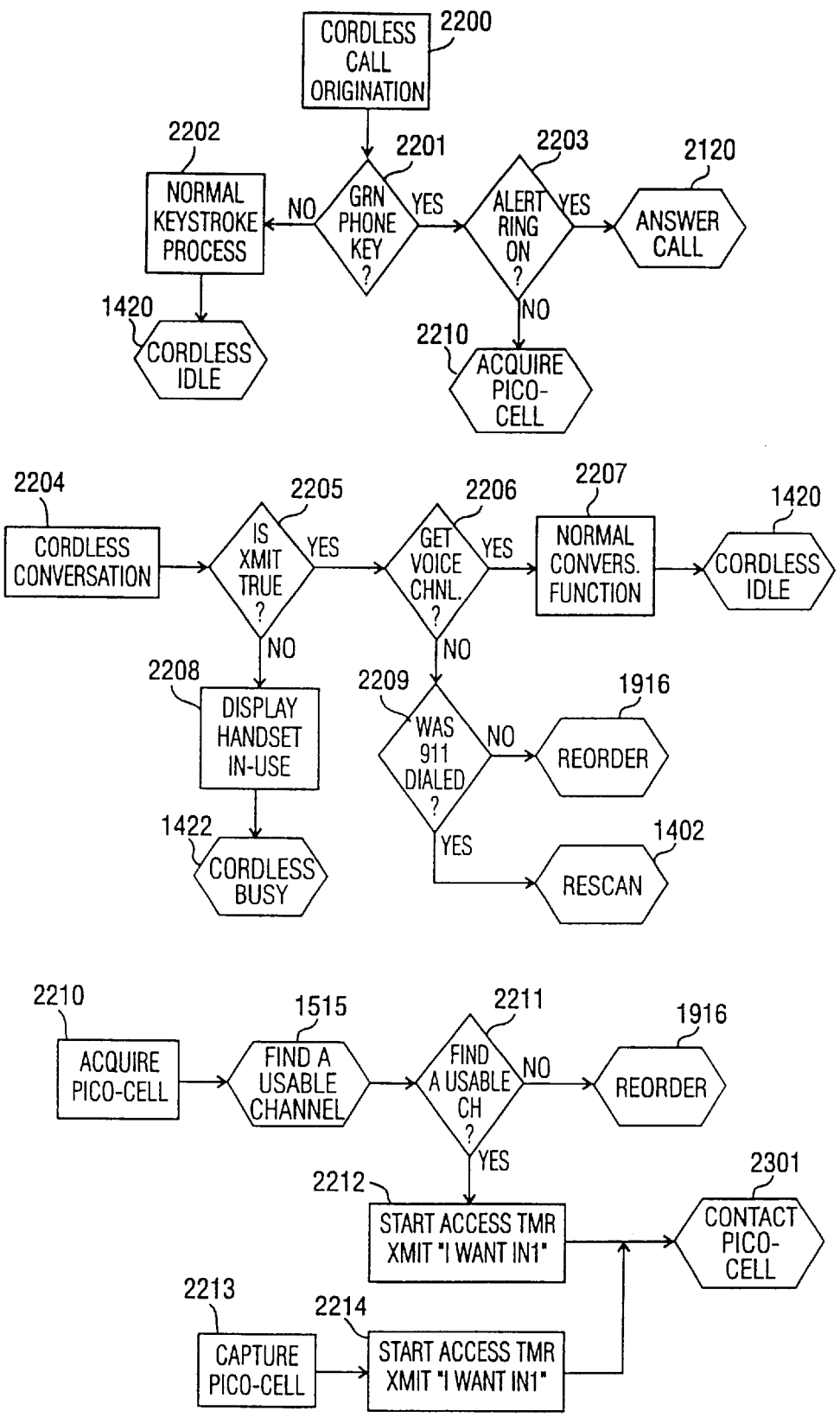
FIG. 22 is a flow diagram of handset operation during other portions of call selection and delivery function.
Figure 23:
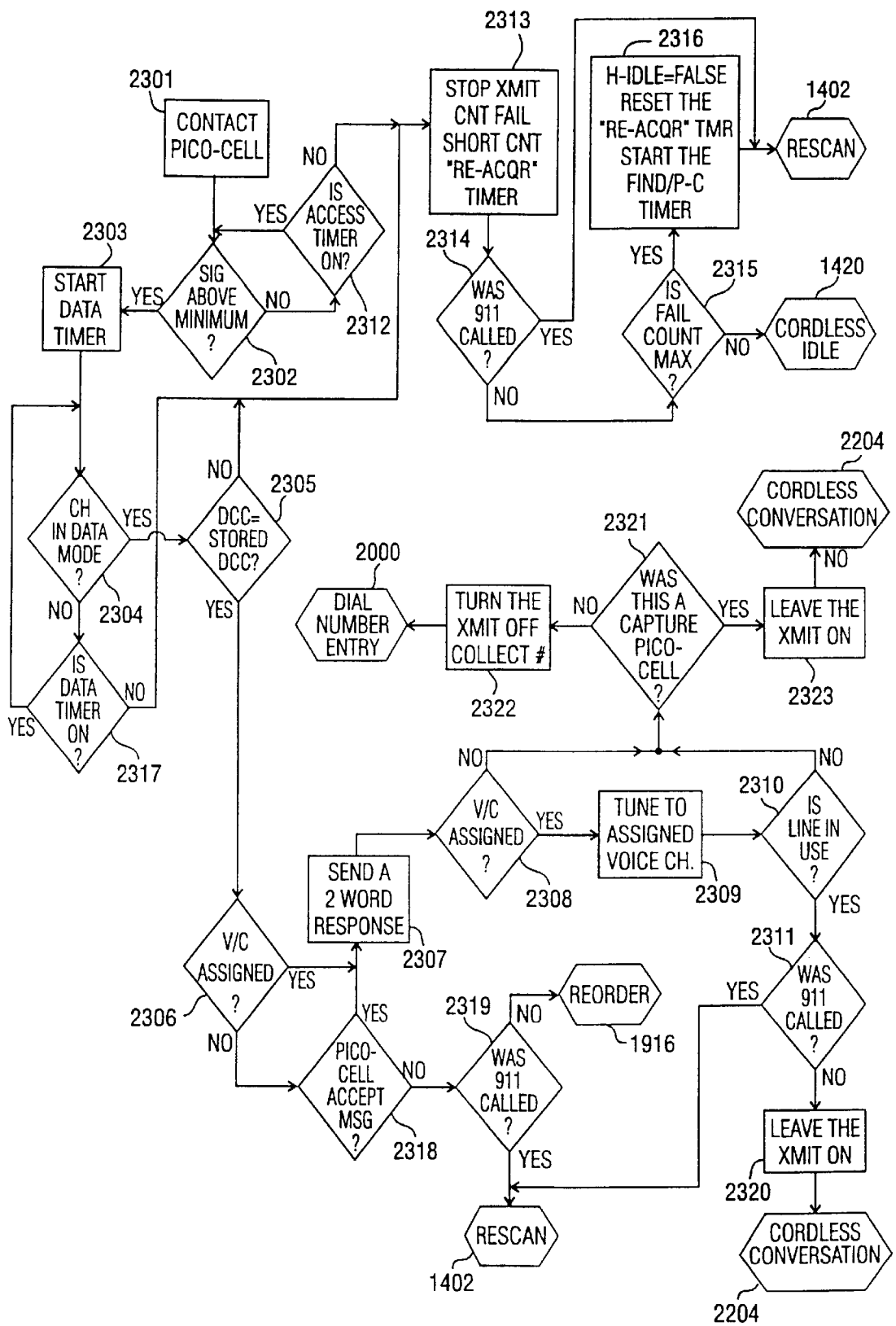
FIG. 23 is a flow diagram of handset operation during contact pico station function.

The Capture pico station entry at 2213 of FIG. 22 initiates process task 2214 which turns on the handset transmitter and begins sending the I Want In2 Access Demand message to the pico station on the selected channel. Control then passes from process task 2214 to the contact pico station task 2301 discussed above.

Referring again to FIG. 12, the pico station detects the Access Demand message and captures the dialed number from the handset. As previously described, process task 1203 issues the Voice Channel response and captures the handset acknowledgment. Process task 1203 initiates query task 1204, which monitors the house line Idle state.

A Yes response from query task 1204 initiates query task 1205 which monitors for dialed number capture. A Yes response from task 1205 initiates process task 1206. Process task 1206 seizes the house line and initiates query task 1207 which detects dial tone and outdials the number captured from the handset into the network. Failure to complete the dialing process task initiates process task 1322 to terminate the call.

Successful completion of query task 1207 initiates the Switch to Conversation process task at 1316 which will switch to the conversation mode as described in EIA-553 standards. Control passes to the hook flash monitor loop as previously described.

During this call connection process, other household extensions can join or leave the call at will. The pico station will maintain this telephone line to handset connection until one of the disconnect events occurs.

Each of the registered handsets may receive a new unit number assignment from the pico station if the call termination occurred since the active handset was no longer present in the service area of the pico station.

Base Station Handset Call Termination Process

While in the pico station Idle task, the telephone line interface will alert the pico station to an incoming call by detecting the presence of ring voltage on the line. The pico station then immediately initiates the Call Termination process.

Referring to FIGS. 9, 11, 13, and 24 the Call Termination process will be described.

As described previously, the pico station Scan Channels task will start the Base Station Idle task at entry 901 after processing active at-home timers. The pico station is not involved in call activities unless a handset is Home.

The Base Station Idle task proceeds from entry 1101 to query task 1102 which monitors for ring voltage on the house line. A Yes response from query task 1102 initiates the Terminating Call process at 1300.

Control passes to process task 1301 which starts the ring return timer with an interval of five seconds. The North American Telephone System utilizes a ring cycle of two seconds On and four seconds Off.

Process task 1301 initiates process task 1302 which locates an Idle pico station channel and issues a Page Order to each authorized handset. This activity includes the collection of responses from the handsets to the Page Order. This process task follows the EIA-553 standard for message configurations.

The handset Monitor Base Station task will detect the pico station Page Order during query task 1509, and will start the Process Base Order task at 2401. The Process Base Order task entry at 2401 initiates query task 2402 which compares the type of order with Page Order. A Yes response from query task 2402 initiates query task 2403.

Query task 2403 monitors the pico station Busy/Idle bit for Idle. A No response from query task 2403 initiates query task 2405, which counts the failures and compares the fail count to the maximum fail count allowed. A Yes response from task 2405 causes exit of the Process Base Order task and initiates the Rescan task at Cordless Idle entry 1420.

A No response from query task 2405 initiates query task 2403 to again test the Busy/Idle bit state. A Yes response from query task 2403 initiates process task 2404 which issues an Acknowledge signal to the pico station. Process task 2404 then initiates the Rescan task at Cordless Idle entry 1420.

Base station process task 1302 then initiates query task 1303 which monitors for any responses from the paged handsets. A No answer from query task 1303 loops back to Base Station Idle task at 1101 which then initiates the process task again. A Yes response from query task 1303 initiates process task 1304.

Process task 1304 will issue an Alert On Order to each of the handsets that ACK'D the Page Order.

The handset will capture the order in the Monitor Base Station task at query task 1509 and restart the Process Base Order task at entry 2400. Again, control initiates query task 2402 which monitors for a Page Order. The No response from query task 2402 initiates query task 2406 which monitors for the Alert Orders. A Yes response from query task 2406 initiates query task 2407, which monitors for Alert On Order. A Yes response from query task 2407 initiates process task 2408 which activates the internal ringer in the handset to alert the user of the incoming call. Process task 2408 then initiates the Rescan task at cordless idle entry 1420.

The pico station process task 1304 then initiates query task 1305, which monitors for answer from a household extension. A Yes response from query task 1305 initiates process task 1311 which issues a Release Order to each handset that was alerted.

Process task 1311 then issues an Update Order to inform the handsets of the Line In Use status. Control then returns to Base Station Idle task at entry 1101.

A No response from query task 1305 initiates query task 1306 which monitors for answer from a handset. The No result from query task 1306 initiates query task 1307 whereby the line Ring condition is again tested. A Yes response to query task 1307 initiates process task 1308 which restarts the Ring Return timer for another five second interval. Process task 1308 and a No result from query task 1307, each initiate query task 1309.

Query task 1309 monitors for Acknowledge receipt from all handsets. A No response to query task 1309 initiates process task 1312 which issues a Page Order to each of the non-responding handsets. Process task 1312 initiates process task 1313 which issues an Alert On Order to each of the responding handsets. Process task 1313 and the Yes result from query task 1309 each initiate query task 1310.

Query task 1310 monitors the ring return timer for activity. If the timer has expired, the system determines that the caller has hung-up. Consequently, a Yes response to query task 1310 initiates task 1311 to terminate the call. A No response from query task 1310 loops back to query task 1305 to test for answer from the house extensions again.

Figure 24:
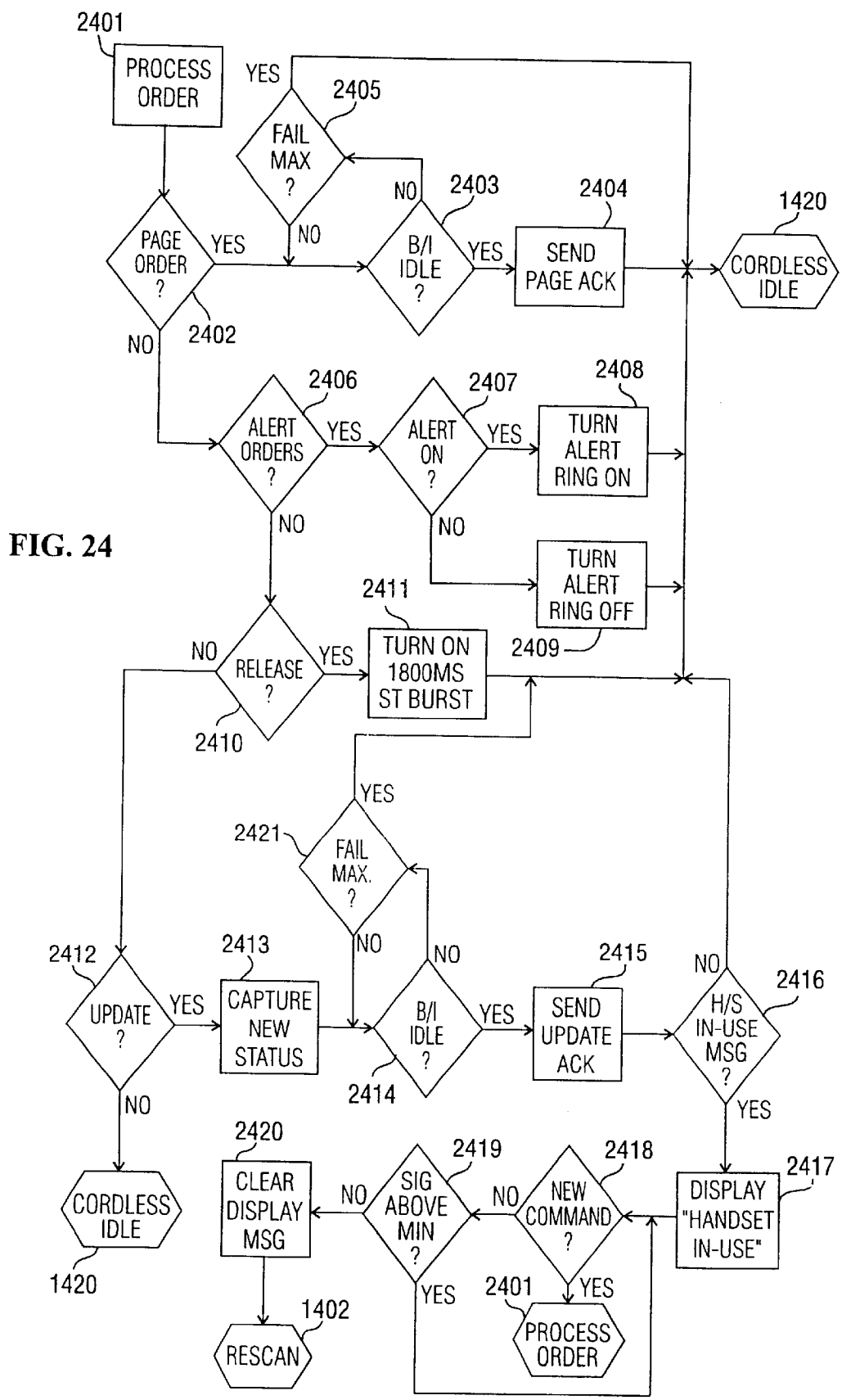
FIG. 24 is a flow diagram of handset operation during handset process base order function.

Referring now to FIG. 24, the Process Base Order query task 2406 No result initiates query task 2410, which monitors for a Release Order from the pico station. A Yes response to query task 2410 initiates process task 2411 which turns off the alert ringer, returns the disconnect response and initiates the Rescan task at Cordless Idle entry 1420.

A No response from query task 2410 initiates query task 2412 which monitors for Update Order from the pico station. A Yes response from query task 2412 initiates process task 2413 which captures the new status and initiates query task 2414. A No result from query task 2412 loops back to the Rescan task at the Cordless Idle entry 1420.

Query task 2414 monitors the Busy/Idle state of the pico station for Idle. A No response from query task 2414 initiates query task 2421 which counts the failure and compares the accumulated count against the maximum failure count allowed. A Yes result from query task 2421 loops back to the Rescan task at Cordless Idle entry 1420. A No response from query task 2421 loops back to query task 2414 to again test the Busy/Idle state.

A Yes result at query task 2414 initiates process task 2415 which acknowledges the update and initiates query task 2416. Query task 2416 monitors the Update Order for a Handset In Use status. A No response to query task 2416 loops back to the Rescan task at Cordless Idle entry 1490.

When the user wishes to answer an incoming call the Off-Hook key is pressed. This action is detected by the Monitor pico station function of query task 1512 and the No result starts the Call Origination, task at entry 2200.

As previously explained, origination task entry 2200 initiates query task 2201 which monitors for the Off-Hook (green) key pressed condition. A Yes response to query task 2201 initiates query task 2203 which monitors for Alert Ringer On state. A Yes response from query task 2203 starts the Answer Call task at entry 2122.

Referring now to FIG. 21, the Answer Call task entry 2122 initiates query task 2123 which monitors the Busy/Idle state of the pico station. A No response from query task 2123 initiates query task 2129 which counts the failure and compares the accumulated count to the maximum allowed failure count. A Yes result from query task 2129 returns to the Rescan task at Cordless Idle entry 1420. A No response from query task 2129 initiates query task 2123 to again test the Busy/Idle state.

A Yes response from query task 2123 initiates process task 2124 which sends the I'll Take It message to the pico station. Process task 2124 initiates query task 2125 which monitors for an acknowledge from the pico station.

Figure 13:
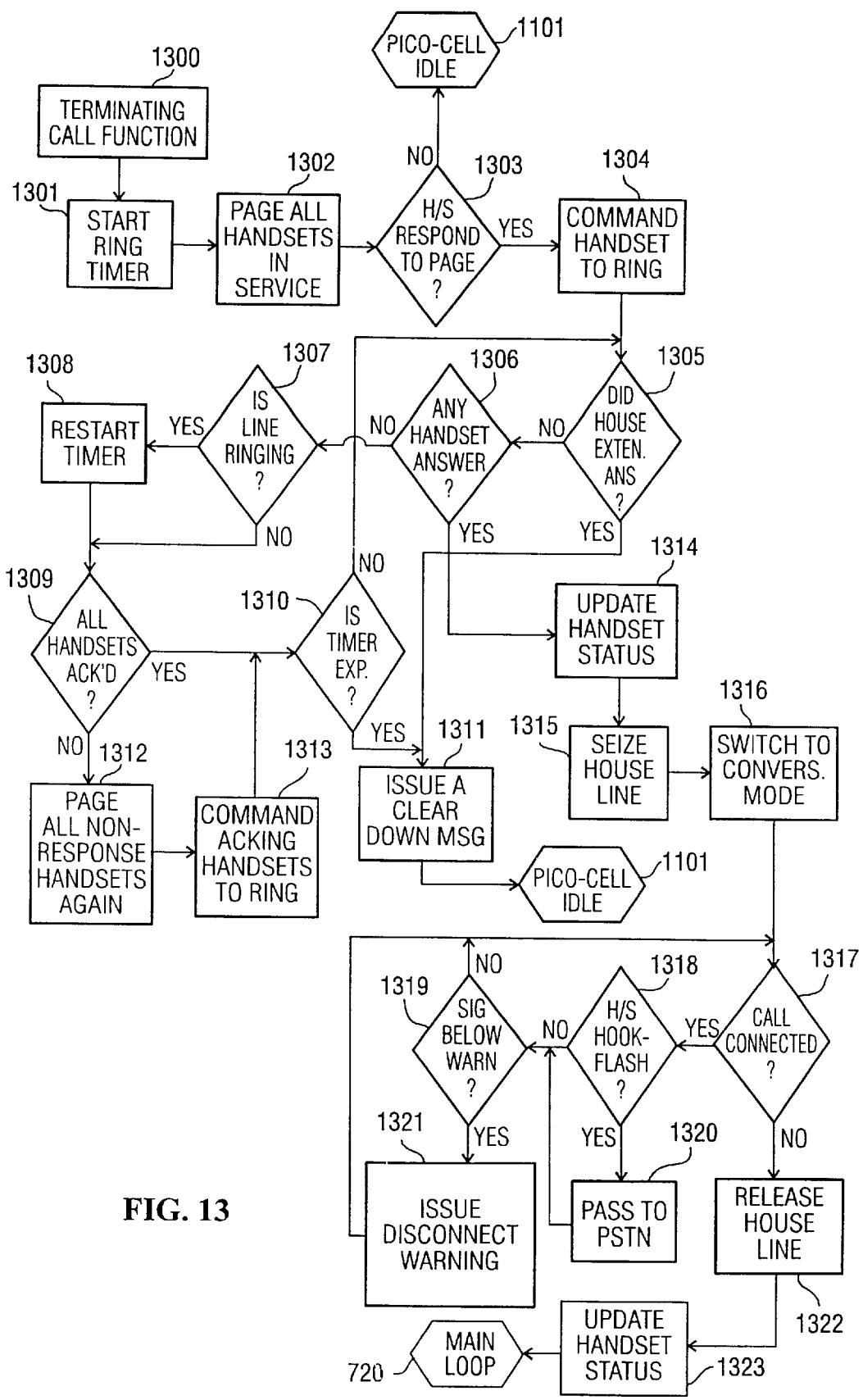
FIG. 13 is a flow diagram of pico station operation during Call Termination function.

Referring now to FIG. 13, the pico station detects the answer from the handset in query task 1306 which initiates process task 1314. Process task 1314 issues an Alert Off Order to all other handsets, acknowledges the I'll Take It message from the answering handset and issues an Update Order to all other handsets showing Handset In Use status. Process task 1314 then initiates process task 1315 which seizes the line to answer the call and initiates process task 1316 to commence the conversation via a process which has been described previously.

Referring back to FIG. 24, the Alert Off Order is captured by the handsets in query task 2407 which then initiates process task 2409 to turn off the alert ringer. Process task 2409 initiates the Rescan task at Cordless Idle entry 1420.

The answering handset remains in a tight loop at query task 2125 of FIG. 21, awaiting pico station ACK. A No result from query task 2125 initiates query task 2126 which monitors for an Update Order directed to this handset. Should another handset contend for answer and succeed, a yes response from query task 2126 will initiate the Process Base Order task at entry 2401.

A No response from query task 2126 initiates query task 2127 which monitors the pico station signal strength for greater than the disconnect level. A Yes response from query task 2127 closes the loop and initiates query task 2125 awaiting the pico station ACK. A loss of pico station signal will force a No response from query task 2127 and initiate process task 2128, which clears the display and cancels the alert ringer. Process task 2128 loops back to the Rescan task at the Rescan entry 1402.

Receipt of the pico station ACK at query task 2125 initiates the Origination task at the Cordless Conversation entry 2204 previously described.

Each non-answering handset receives an Update Order. Referring now to FIG. 24, the Process Base Order query task 2416 detects the status as Handset In Use and the Yes result from query task 2416 initiates process task 2417.

Process task 2417 places the Handset In Use message on the display and initiates query task 2418 which monitors for a new command from the pico station. The No result from query task 2418 initiates query task 2419 which monitors whether the pico station signal strength is above the disconnect level. A Yes response from query task 2419 loops back to query task 2418 to test for a pico station order. All handsets will stay on this channel for the duration of the active handset's involvement in the call.

Should a handset from query task 2419 lose signal from the pico station the No result initiates process task 2420 which clears the display and returns control to the Rescan task at entry 1402.

Receipt of a new order from the pico station will force a Yes response from query task 2418 which initiates the Process Base Order task at entry 2401.

This sequence completes the call process flows for the handset and pico station.

Alternate Line Option Module

The alternate line option module consists of a modified cellular telephone housed in an exterior mountable enclosure powered from an ac source with internal battery backup. The modifications to this cellular telephone unit include the addition of a switchable PSTN telephone line interface, additions to permit Remote Programming System compatibility, and other custom operating software.

The purpose of the alternate line option is to provide flexible access provisions for call traffic allocation. This function can be limited to the Inter-exchange carrier (IXC) or can extend to the local exchange carrier (LEC) as well. The function is referred to as competitive access provision herein.

The alternate line option is an independent device in that it can be deployed with or without a pico station or dual mode handsets. The alternate line option acts as an rf link to the customer site, which provides alternative access to the PSTN by means of the local cellular carrier.

The alternate line option module operates under the control of the local cellular carrier. It monitors the calls originated from the house and selectively routes calls to the cellular system for completion. The alternate line option also monitors the macro cellular network and is capable of routing calls placed to the alternate line option's MIN onto the house wiring for completion. The selection process, line substitution function and mode of operation are downloaded to the alternate line option from the cellular carrier via the remote programming capability previously described. The use of the remote programming line ensures positive control of the alternate line option module by the cellular carrier.

In the embodiment illustrated, the PSTN central office line to the house terminates at the input of a standard network interface device (NID) provided by the local exchange carrier. The output of the interface module connects to the house wiring. The house wiring connects all of the customer's telephone equipment (extensions, FAX machines, computer modems, cordless telephones, etc.) to the central office line. The alternate line option module is installed by connecting its input to the output of the NID. The house wiring is then connected to the output of the alternate line module. This places the alternate line option in series with the house wiring.

This method of interconnection allows the alternate line option module to become a central office substitute during those periods when the alternate line option is actively providing the competitive access to the household from the cellular carrier.

Figure 25:
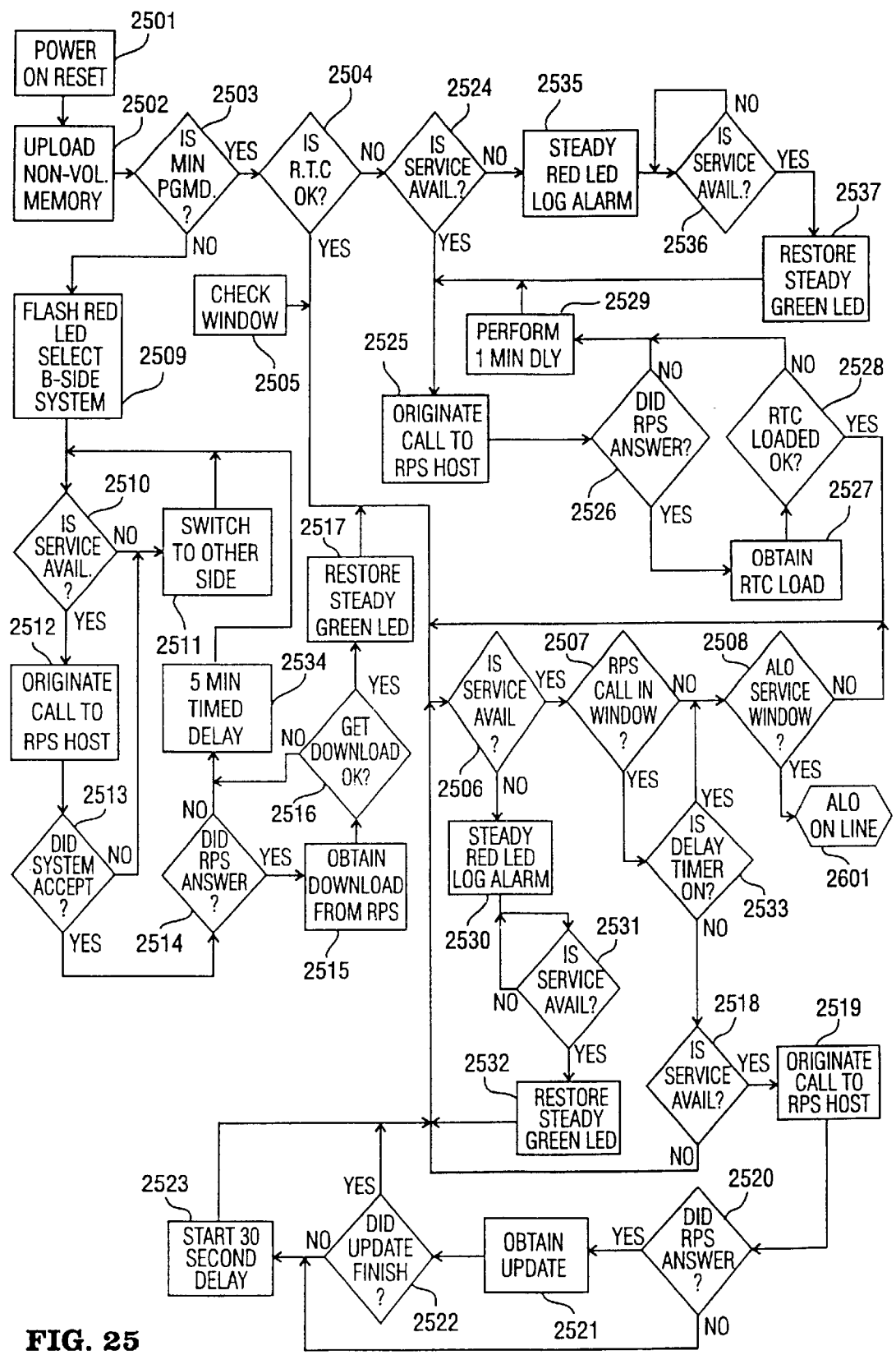
FIG. 25 is a flow diagram of operation of the alternate line option module during Initialization, Configuration, and Service Determination function.

Referring now to FIG. 25, the initialization functions and remote programming operation of the alternate line option module will be described.

Upon application of power, task 2501 is started which will perform internal housekeeping chores to place the telephone line interface and the cellular radio unit into their idle modes The alternate line option module is designed to ensure that its line interface and radio unit fail (fault or loss of power) in an On-Hook state and transmitter off condition, respectively.

Task 2501 passes control to process task 2502 which will upload the contents of the non-volatile memory to determine operational status. Process task 2502 then initiates query task 2503 which tests for a programmed MIN.

If the MIN is not yet programmed, the alternate line option module will attempt to place a cellular call to the host at a factory programmed 1-800 number until contact with the host is established.

This attempt will be made on the strongest cellular carrier access channel serving the alternate line option module initially (A-side or B-side). If the call is not accepted by the carrier for completion, the alternate line option module will switch sides and attempt the call again. If the host is busy and cannot process the alternate line option call, the alternate line option module will retry at five minute intervals until connection is established.

A No result from query task 2503 initiates to process task 2509 which will start the status led flashing red as an indication that the alternate line option is inoperative. Process task 2509 then selects the B-Side system and initiates control to query task 2510 which monitors available cellular service.

A Yes result from query task 2510 initiates process task 2512 which originates a call to the 1-800 number assigned to the host. Query task 2513 is then initiated to determine if the call was accepted by the selected system. The cellular carrier deploying the alternate line option module will program his switch to accept calls to the remote programming number without requiring the calling unit to have a valid MIN. If the query task 2513 result is No, or with a No result from query task 2510, process task 2511 is initiated which forces the alternate line option module to switch to the other cellular system.

Process task 2511 then loops back to query task 2510 to test for available service again. A Yes result from query task 2513 starts query task 2514 which determines if the host accepted the call from the alternate line option module.

If the host failed to answer, a query task 2514 No initiates process task 2534 which enters a five minute delay before looping back to query task 2510 to attempt again to contact the host.

A Yes result from query task 2514 initiates process task 2515 which obtains a download from the host that contains the alternate line option's MIN, SID, current date/time setting for the Real-Time clock, host Check-in date/time window and Mode of Operation Parameters.

The Mode of Operation Parameters for the alternate line option module include the local exchange alternative (LEC bypass) directives and inter-exchange alternative (IXC bypass) directives. These parameters are stored in the central processing non-volatile memory.

Process task 2515 then connects to query task 2516 which monitors for a completed host download. If the download process failed, the query task 2516 No result will initiate process task 2534, to perform a delay and try again.

A Yes result at query task 2516 starts process task 2517 which restores the status LED to a steady green condition to indicate the alternate line option module is now programmed and operational. The status LED is provided as a service tool to aid in malfunction diagnostics should the need arise.

Process task 2517 exits to the primary service loop of the alternate line option, the Check Window entry at 2505.

At any power on reset event which follows the remote programming system download, a Yes result from query task 2503 will initiate query task 2504 which tests whether the internal real time clock is functioning normally. A Yes result at query task 2504 exits to the primary service loop entry Check Window at 2505.

A No result from query task 2504 initiates an immediate process to contact remote programming system for the correct Time of Day. This is accomplished by starting query task 2524 which tests for cellular service availability. If service is available, the Yes result from query task 2524 starts process task 2525 which originates a call to the host. Process task 2525 initiates query task 2526 which monitors the answer from the host. A No result from query task 2526 initiates process task 2529 which creates a one minute delay and then loops back to process task 2525 to try again.

An answer from the host provides a Yes result from query task 2526, which starts process task 2527. Process task 2527 obtains a real time clock update from the remote programming system. Control then passes to query task 2528 to determine load success. A No result at query task 2528 loops back to process task 2529. A Yes result to query task 2528 exits to the primary service loop at 2505, the Check Window entry.

Should query task 2524 determine that no service was available, its No result initiates process task 2535 which will light the status LED a steady red, and log the alarm condition into the non-volatile memory to allow reporting the event to remote programming system. Process task 2535 then starts query task 2536 which will continue to monitor for cellular service availability.

Query task 2536 remains in a tight loop if service is not available by having its No result loop back to the start of query task 2536. A Yes result from query task 2536 initiates process task 2537 which restores the status led to a steady green and loops back to process task 2525 to attempt to contact the host.

The Check Window task entry at 2505, as previously described in several process steps, initiates query task 2506 which follows standard cellular protocol, to determine if cellular service is available at the alternate line option location which matches the SID of the cellular carrier downloaded from the host.

A No result from query task 2506 connects to process task 2530 which lights the status led a steady red to indicate the alarm condition and logs the event into the non-volatile memory to report it later to the host. Process task 2530 initiates query task 2531 which remains in a tight loop monitoring for service availability. A query task 2531 No result loops back to the start of query task 2531. Once service is available, the Yes result from query task 2531 starts process task 2532 which restores the status LED to a steady green state and returns to the Check Window task entry at 2505.

With service available, a Yes output to query task 2506 initiates query task 2507. The alternate line option module maintains a real-time clock and calendar to determine when its operating window is enabled and when it should contact the host for possible update to its operating parameters. Query task 2507 tests the current date/time against the stored remote programming call in window. If the call-in window is open, the Yes result to query task 2507 starts query task 2533.

Query task 2533 determines the delay timer activity, and a No result to query task 2533 initiates query task 2518 which monitors for service availability. A No result from query task 2518 loops back to the Check Window entry at 2505.

A Yes result to query task 2518 starts process task 2519 which originates a call to the host. Process task 2519 initiates query task 2520 which tests for an answer from the host. Should query task 2520 fail to determine Remote programming system answer, a No exit will start process task 2523 which starts the delay timer with a 30 second time-out value. Process task 2523 then loops back to the Check Window entry at 2505.

If the answer from the host produces a Yes result at query task 2520, it starts process task 2521 to obtain an update from the host. Process task 2521 initiates query task 2522 to determine successful completion of the update.

A No result from query task 2522 initiates the delay timer process task at 2523 while a Yes result loops back to the Check Window entry at 2505.

If the host call in window is dosed, the query task 2507 No result initiates query task 2508. A Yes result to query task. 2533 also initiates query task 2508. Query task 2508 compares the current date/time against the value downloaded from the remote programming system to determine if the alternate line option module service window is open. The existence of this service window allows the cellular carrier to exercise traffic management during periods when the cellular system may have limited capacity to handle household call traffic. 10.

If query task 2508 determines the service window to be closed, the No result loops back to the Check Window entry at 2505. If the service window is open, the Yes result to query task 2508 starts the alternate line option On Line task at entry gate 2601.

Therefore, when the service window is closed or the alternate line option is not receiving service from the cellular system, the alternate line option module will ignore all line activity in the household.

Figure 26:
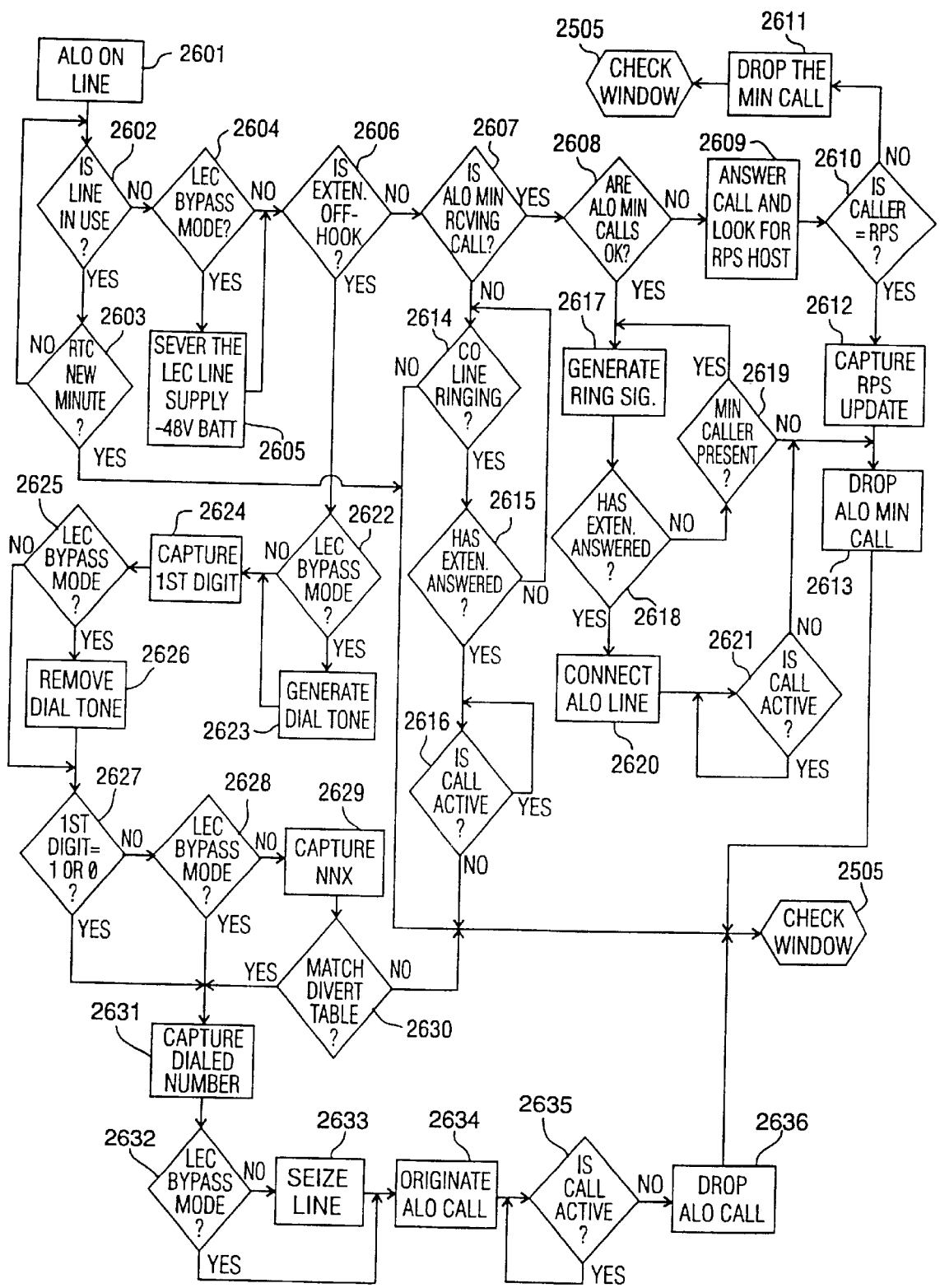
FIG. 26 is a flow diagram of operation of the alternate line option module during call processing function.

Referring now to FIG. 26, the alternate line option service functions will be described in more detail. When the operating window is enabled, and the alternate line option radio unit is receiving service from the cellular system. The alternate line option On Line task is entered at 2601 which initiates query task 2602 to monitor the line current to determine Off-Hook indication. A Yes result to query task 2602 initiates query task 2603 which tests the real time clock for the start of a new minute.

To ensure coverage of all time sensitive events, query task 2603 will exit the alternate line option On Line task and return to the Check Window entry at 2505 on the start of each new minute if the alternate line option On Line task should discover the line to be in use at the start of its service window. A No result at query task 2603 loops back to the start of query task 2602 to continue monitoring the line status.

When the line is Idle, the No result to query task 2602 initiates query task 2604 which monitors the alternate line option configuration data to determine local exchange company bypass mode activity. A Yes result to query task 2604 starts process task 2605 which activates the line transfer mechanism.

Process task 2605 acts to disconnect the house wiring from the central office and substitutes the alternate line option module functions for all central office functions. Process task 2605 and the No result from query task 2604 both start query task 2606.

Query task 2606 monitors the house line to determine if an extension is Off-Hook. A Yes result to query task 2606 starts query task 2622 which monitors for the LEC bypass mode. A Yes result to query task 2622 initiates process task 2623 to generate precision dial tone to the house line.

Process task 2623 and the No result to query task 2622 start process task 2624 which captures the first dialed digit and passes control to query task 2625.

Query 2625 determines LEC bypass mode activity and a Yes result initiates process task 2626 to remove the dial tone signal. Process task 2626 and the No result from query task 2625 initiate query task 2627 which determines if this first digit is either a one or zero. Either case results in an access review.

Should query task 2627 produce a No result, query task 2628 is started which monitors for LEC bypass mode activity. If the alternate line option is in the IXC bypass mode, a No result from query task 2628 initiates process task 2629 which captures the dialed exchange code (first three digits). Process Task 2629 then initiates query task 2630 which determines if this exchange code (NNX) is a member of the list of exchanges to be diverted to the cellular carrier for completion. A No result at query task 2630 returns to the Check Window entry gate 2505.

A Yes result at query task 2630 and the Yes result at query task 2628 start process task 2631 which captures the complete dialed number. Process task 2631 then initiates query task 2632 which tests for LEC bypass mode. A No result to query task 2632 starts process task 2633 which seizes the line away from the central office and effectively drops the call to the PSTN. The house connection is now to the alternate line option module output interface which keeps the line supplied with –48 vdc talk battery. Process task 2633 and a Yes result to query task 2632 initiate process task 2634 which originates a cellular call to the collected dialed number.

Process task 2634 connects the house line audio circuit so the caller can hear the line supervision provided in response to this call origination. Process task 2634 then starts query task 2635 which monitors the call event for activity. Control remains at query task 2635 until a call disconnect event, by looping the query task 2635 Yes result back to the start of query task 2635. Occurrence of a disconnect event produces a No result to query task 2635 which initiates process task 2636.

Process task 2636 drops the alternate line option originated call and releases the house line if it was seized. The alternate line option On Line task then returns to the Check Window entry gate 2505. A call diverted by the alternate line option module will be completed before the alternate line option window can dose.

Should query task 2606 result in a No result with respect to extension activity, query task 2607 is started which monitors for the receipt of an inbound call directed to the alternate line option MIN from the cellular carrier. A Yes result to query task 2607 initiates query task 2608 which determines if alternate line option MIN calls are IXC bypass events which should pass to the house line.

If the query task 2608 result is No, process task 2609 is started which answers the alternate line option MIN call and responds to the host Access protocol Process task 2609 initiates query, task 2610 which determines if the remote programming system is the caller. A No result at query task 2610 initiates process task 2611 which drops the alternate line option MIN call and returns control to the check window entry gate 2505.

Should query task 2610 result in Yes, process task 2612 is initiated which captures the remote programming system Update session and initiates process task 2613 which disconnects the alternate line option MIN call and returns to the Check Window entry gate 2505.

If IXC bypass is in effect, query task 2608 will result in Yes and initiate process task 2617 which seizes the house line and generates ring voltage to alert the extensions of an incoming call. Process task 2617 then initiates query task 2618 which monitors to determine if an answer from an extension has occurred.

A No result from query task 2618 initiates query task 2619 which monitors for the continuing presence of the cellular caller. A No result from query task 2619 exits through process task 2613 described above. A Yes result to query task 2619 loops back to the Ring generation process task 2617.

An answer from an extension will force a Yes result to query task 2618 which initiates process task 2620. Process task 2620 connects the house line audio to the cellular radio to enable. conversation Process task 2620 then starts query task 2621 which monitors the call activity. Query task 2621 will remain in a tight loop until a disconnect event occurs. A Yes result to query task 2621 loops back to the input to query task 2621.

When a disconnect event occurs, a No result to query task 2621 initiates process task 2613 described previously.

If the alternate line option MIN was not receiving a call, the No result to query task 2607 initiates query task 2614 which monitors the central office line for Ring Voltage. A No result to query task 2614 returns control to the Check Window entry gate 2505.

A Yes result to query task 2614 starts query task 2615 which monitors the house line for answer from an extension. A query task 2615 No result loops back to the start of query task 2614 to continue monitoring for line Ring.

A Yes result to query task 2615 initiates query task 2616 which monitors the answered call for a disconnect event. If the call is active, the Yes result to query task 2616 loops back to the start of query task 2616 in a tight loop. When the call is completed, a query task 2616 No result returns control to the Check Window entry gate 2505.

During an alternate line option module diverted call when the alternate line option is not operating in the LEC bypass mode, Call Activity query tasks 2635 and 2621 use the alternate option input line interface to monitor the central office line for presence of ring voltage. Should a call be presented for the house, the alternate line option will issue a call-waiting tone to the house side of the output line interface.

The house line extension user can elect to answer this call by performing a hook-flash. Alternate line option detection of a hook-flash response to an alternate line option call-waiting notification will cause the alternate line option to toggle its output line interface back to the central office line to answer the incoming call.

The cellular call is left up and the called party is effectively placed on hold pending another hook-flash by the house line. Should the caller forget to return to the cellular call on hold, and simply hang up the extension, the alternate line option will seize the output line interface and generate ring voltage into the house wiring.

When this ring is answered, the alternate line option module will reconnect the cellular call to the house wiring. Should the cellular called party terminate while on hold, the alternate line option module will ignore any further hook-flash from the house wiring.

Alternate line option module detection of an unsolicited hook-flash during an alternate line option completed call in progress will be passed to the cellular system following cellular protocol.

When the alternate line option module operating mode is engaged full-time LEC replacement, the alternate line option line interface is always seized (connected to the house wiring) and never releases. All traffic in or out then will be handled by the alternate line option module and the cellular system.

Customer use of the described system is extremely simple and provides numerous advantages. In purchasing service, the customer has an option of supporting each of the six handsets on up to three pico stations. Thus, a wide variety of pico station placements is possible, i.e. home and office, for the individualized handsets needed within a family.

The activation steps by the customer are simple, including only a need to plug in the pico station, place each handset in close proximity, select the handset activation command and depress,the activation button on the base station.

Following registration, handset use effectively parallels that of a standard wire line phone in that dial tone is introduced as soon as the handset is turned on and placed off hook. Thereafter, standard wireless dailing protocol is used.

The special handsets, one for each family member, include select number and selective ring capabilities, which when used in conjunction with the call forwarding function of the system, enable each family member to identify and answer personal calls directed to their individual numbers when at home.

The display features of the handset always let the customer know what class of service is being used and even permit the customers, when entering the home area, to know how many family phones are registered.

Additional features regulate power use of the handsets to conserve battery power whenever possible, and provide a system with minimal neighborhood interference and eavesdropping exposure.

An additional feature is the availability of the cellular system as a private second line for call origination when the pico station is serving another handset within the home area. Obviously, the customer also directly benefits from a variety of service plans at billing rates that meet particular needs.

From a system point of view, the preferred embodiment of the present invention provides a multiple mode personal wireless communications system which integrates into and coexists within a radiotelephone network such as a cellular network. This system provides both standard and unique additional services to a select group of customers equipped with special handsets, without impacting other customers supported by the network or cellular system. System coexistence is established through use of a reversed control protocol hierarchy on a minimal number of reserved cellular channels which are shared by all of the select group of customers in a unique enhanced cordless mode of operation. System integration has been provided through the strict adherence to established protocol standards and the elimination of the need for frequency plan coordination efforts. In addition, the present invention provides for the unique application of a standard overhead message with programmable contents into the cellular system.

This allows the cellular service provider the means to effectively market its services in the form of zones of coverage which most appeal to customers. These zones can be as small as a single cell site or as large as the entire system. Therefore, a customer may now purchase a service package that provides for Local use pricing in zones of interest and Premium use pricing elsewhere. Existing cellular customer equipment will ignore the additional overhead message and continue to obtain cellular service.

The special handsets of the present invention automatically switch between and operate under existing standard protocols in either analog or digital mode with the standard cellular network. The special handsets utilize a unique protocol in an enhanced cordless mode when within range of their independent, locally interconnected pico cells. In keeping with the object of providing for a ubiquitous telecommunications system, the present invention provides these special handsets with the ability to utilize the cellular network as a private second line for call origination while the handset is within the coverage of the associated pico cell.

The unique location analysis method of the present invention, as practiced by these handsets, inhibits their attempts to communicate with their associated pico cells until they are in the appropriate neighborhood. This conserves battery power and greatly reduces unnecessary transmissions on the reserved channels. Controlling such transmissions enhances the availability of these channels to carry call traffic Additionally, the incorporation of internal precision dial tone into these special handsets and the use of dialed number analysis in accordance with the North American Numbering Plan has created a very user friendly and easy to use telephone for the customer. The special handset message display screens of the present invention also add to the user friendliness of the system as demonstrated by the customer's constant awareness of which system portion is providing service and at what relative cost, i.e., Home-Local-Premium.

In addition, the present invention couples a distinctive ring class feature to the call forward class feature to enable the customer to rapidly identify incoming calls at the pico cell location as belonging to a particular one of the supported special handsets. This is accomplished by having all telephones connected to the house wiring ring with the cadence of the desired handset's ring signal. The present invention also provides an economic benefit to the service provider due to the ability of the special handset to be remotely programmed via the unique protocol. This capability allows the special handset to be distributed through sales channels not currently available to the service provider which will further reduce the ultimate cost to the customer. In addition, the present invention provides these special handsets with the capability to recognize and operate with up to three separate pico cells providing the customer with the flexibility of establishing multiple home system environments. The service provider benefits by having additional locations where call traffic is off-loaded from the cellular network. This traffic off-loading will allow current cellular networks to deploy the present invention with mineral impact on the existing customer base.

The present invention provides network transparent pico cells that are activated and controlled via a framework of overlay cells that operate independently of the cellular network. As previously explained, this overlay framework uses a unique control protocol on said reserved channels with a use hierarchy that is reversed from cellular.

The unique method of control eliminates the need for the pico cells to contact, communicate with or become part of the overall cellular network, which allows them to operate transparently to the existing customer base supported by the cellular network. The present invention provides that each pico cell will consist of a spectrally dynamic, noncapturing, frequency agile, multi-purpose base station that is customer installed at customer selected locations. Each pico cell cooperates with the overlay cell framework and supports the enhanced cordless mode of operation of the special handsets. Each pico cell is capable of supporting multiple handsets and constitutes a separate, locally interconnected, limited coverage wireless communications system which effectively off-loads traffic from the cellular system. This is accomplished by each pico cell independently handling its registered special handset call traffic through said local interconnect to the PSTN without cellular network involvement.

In addition, however, as cellular network traffic capacities increase, an element of the present invention known as an alternate line option module can provide a wireless local interconnect capability. The alternate line option module is remotely programmable and allows the cellular service provider to selectively transfer or allocate call traffic to and from the public switched telephone network to and from the cellular radiotelephone network, creating a totally wireless system, if desired.

This alternate line option module includes in its programmable operating criteria the data needed to internally determine when it will operate and what specific functions it will perform.

As provided in the present invention, the alternate line option module can be deployed independently of the rest of the elements as an adjunct to the existing cellular network. This element is effectively an intelligent central office substitute when it becomes active in feeding the house wiring in lieu of the normal PSTN connection. This ability to provide a wireless interconnect alternative, while maintaining full compatibility with all existing equipment that is currently connected to the house wiring, will allow the cellular service provider to compete effectively for the local exchange market.

The present invention also provides service control units and host stations to facilitate wireless activation and control of each pico cell and special handset via the overlay cell framework. These elements of the system assure the integrity of each deployment while eliminating much of the manpower previously required. The method of integration to the existing customer activation system and the secure protocol greatly reduce the opportunity for fraudulent practices.

The present invention provides for incorporation of the capabilities of the remote programming system while eliminating the need for data modem hardware at the terminal equipment (pico cell and handset). This simplification of hardware coupled with the enhanced speed of operation, due to the improved data rate provided by the 10 K bit channel, has now created an economically viable remote programming process.

What is claimed is:

1. A method of operating an RF link module with customer telephone equipment located at a customer's premises, said method comprising:
   a) connecting said RF link module to customer premises wiring which couples to said customer telephone equipment;
   b) determining whether an identification number is programmed into said RF link module;
   c) automatically obtaining a programming parameter from a remote programming system via RF communication when said determining activity b) determines that said identification number is not programmed, said programming parameter being configured as said identification number;
   d) storing said programming parameter in non-volatile memory of said RF link module; and
   e) conducting calls directed to said identification number, said calls being conducted via RF communication.

2. A method of operating an RF link module as claimed in claim 1 wherein said conducting activity e) comprises:
   detecting an incoming call for said identification number;
   generating a ring signal through said wiring to said customer telephone equipment in response to detecting said incoming call to said identification number;
   supplying a predetermined DC voltage through said wiring to said customer telephone equipment; and detecting when said customer telephone equipment goes off-hook.

3. A method of operating an RF link module as claimed in claim 2 additionally comprising:

detecting an off-hook condition of said customer telephone equipment;

generating a dial tone signal through said wiring to said customer telephone equipment when said off-hook-condition-detecting activity detects said off-hook condition;

capturing a first digit dialed at said customer telephone equipment;

removing said dial tone in response to capturing said first dialed digit;

capturing a complete phone number dialed at said customer telephone equipment; and originating a call using said captured phone number.

4. A method of operating an RF link module as claimed in claim 1 wherein said automatically obtaining activity c) comprises automatically originating a call to a predetermined number.

5. A method of operating an RF link module as claimed in claim 1 wherein:

said programming parameter is one of a plurality of programming parameters; and said programming parameters include a system identification number (SID).

6. A method of operating an RF link module as claimed in claim 5 additionally comprising:

determining whether RF communication service is available which matches the SID obtained with said programming parameters; and indicating an alarm condition when no RF communication service is available which matches the SID obtained with said programming parameters.

7. A method of operating an RF link module as claimed in claim 6 additionally comprising logging said alarm condition in said non-volatile memory of said RF link module.

8. A method of operating an RF link module as claimed in claim 1 wherein said RF link module includes a real time clock, and said programming parameters include a current date and time setting for said real time clock.

9. A method of operating an RF link module as claimed in claim 8 additionally comprising:

determining whether said real time clock is functioning normally; and when said real time clock is determined not to be functioning normally, automatically originating a call to engage in a remote programming session which provides a real time clock update to said RF link module.

10. A method of operating an RF link module as claimed in claim 1 additionally comprising:

repetitively determining, after said storing activity d), whether RF communication service is available; and indicating an alarm condition when said repetitively determining activity determines that no RF communication service is available.

11. A method of operating an RF link module as claimed in claim 1 additionally comprising logging said alarm condition in said non-volatile memory of said RF link module.

12. A method of operating an RF link module as claimed in claim 1 additionally comprising:

detecting an off-hook condition of said customer telephone equipment;

generating a dial tone signal through said wiring to said customer telephone equipment when said off-hook-condition-detecting activity detects said off-hook condition;

capturing a first digit dialed at said customer telephone equipment;

removing said dial tone in response to capturing said first dialed digit;

capturing a complete phone number dialed at said customer telephone equipment; and originating a call using said captured phone number.

13. An RF link module for providing wireless communication services to customer telephone equipment which connects to said RF link module through customer premises wiring, said RF link module comprising:

a processor unit configured to automatically determine whether an identification number is programmed into said RF link module;

a radio frequency transmitter and receiver coupled to said processor unit and configured with said processor unit to automatically obtain a programming parameter from a remote programming system via wireless communication when said identification number is not programmed, said programming parameter being configured as an identification number; and a telephone line interface module coupled to said radio frequency transmitter and receiver.

14. An RF link module as claimed in claim 13 additionally comprising:

a ring voltage generator coupled to said processor unit and said telephone line interface module and configured with said processor unit to apply a ring signal through said wiring to said customer telephone equipment in response to detecting an incoming call directed to said identification number; and a talk battery generator coupled to said processor unit and to said telephone line interface module and configured to supply a predetermined DC voltage through said wiring to said customer telephone equipment.

15. An RF link module as claimed in claim 14 additionally comprising:

a dial tone generator coupled to said processor unit and to said telephone line interface module and configured with said processor unit to supply a dial tone through said wiring to said customer telephone equipment when said customer telephone equipment goes off-hook;

wherein said processor unit is further configured to capture a first digit dialed at said customer telephone equipment, remove said dial tone in response to capturing said first dialed digit, then capture a complete phone number dialed at said customer telephone equipment, and originate a wireless phone call using said captured phone number.

16. An RF link module as claimed in claim 13 wherein said processor unit, said radio frequency transmitter and receiver are configured to obtain said programming parameter from said remote programming system via wireless communication by originating a radio telephone call to a predetermined telephone number.

17. An RF link module as claimed in claim 13 wherein:

said programming parameter is one of a plurality of programming parameters; and said programming parameters include a system identification number (SID).

18. An RF link module as claimed in claim 17 wherein:

said RF link module additionally comprises a status indicator coupled to said processor unit; and said processor unit is configured to determine whether communication services are available which match said SID and to cause said status indicator to indicate an alarm condition when no communication services are available which match said SID.

19. An RF link module as claimed in claim 13 wherein said processor unit is configured to log said alarm condition for later reporting.

20. An RF link module as claimed in claim 13 wherein:

said RF link module additionally comprises a real time clock;

said programming parameter is one of a plurality of programming parameters; and said programming parameters include a current date and time setting for said real time clock.

21. An RF link module as claimed in claim 20 wherein said processor unit is configured to determine whether said real time clock is functioning normally; and, when said real time clock is not functioning normally, to originate a communication session to engage in a remote programming session which provides a real time clock update.

22. An RF link module as claimed in claim 13 wherein:

said RF link module additionally comprises a status indicator coupled to said processor unit; and said processor unit is configured to repetitively determine whether radio service is available; and, to cause said status indicator to indicate an alarm condition when no radio service is available.

23. An RF link module as claimed in claim 22 wherein said processor unit is configured to log said alarm condition for later reporting.

24. An RF link module as claimed in claim 13 wherein said identification number is a mobile identification number (MIN).

25. An RF link module as claimed in claim 13 additionally comprising:

a dial tone generator coupled to said processor unit and to said telephone line interface module and configured with said processor unit to supply a dial tone through said wiring to said customer telephone equipment when said customer telephone equipment goes off-hook;

wherein said processor unit is further configured to capture a first digit dialed at said customer telephone equipment, remove said dial tone in response to capturing said first dialed digit, then capture a complete phone number dialed at said customer telephone equipment, and originate a wireless phone call using said captured phone number.

26. A method of operating an RF link module with customer telephone equipment located at a customer's premises, said method comprising the steps of:

a) connecting said RF link module to customer premises wiring which couples to said customer telephone equipment;

b) determining whether an identification number is programmed into said RF link module;

c) automatically obtaining a programming parameter from a remote programming system via RF communication when said determining step b) determines that said identification number is not programmed, said programming parameter being configured as said identification number;

d) storing said programming parameter in non-volatile memory of said RF link module; and e) conducting calls directed to said identification number, said calls being conducted via RF communication.

27. A method of operating an RF link module as claimed in claim 26 wherein said conducting step e) comprises:

detecting an incoming call for said identification number;

generating a ring signal through said wiring to said customer telephone equipment in response to detecting said incoming call to said identification number;

supplying a predetermined DC voltage through said wiring to said customer telephone equipment; and detecting when said customer telephone equipment goes off-hook.

28. A method of operating an RF link module in cooperation with customer telephone equipment which is connected to customer premises wiring, said method comprising the steps of:

connecting said RF link module to said customer premises wiring;

determining whether a mobile identification number (MIN) is programmed into said RF link module;

obtaining a programming parameter from a remote programming system via radiotelephone communication; and storing said programming parameter in non-volatile memory of said RF link module.

29. A method as claimed in claim 28 additionally comprising the steps of:

detecting when said customer telephone equipment goes off-hook;

generating a dial tone signal through said customer premises wiring to said customer telephone equipment when said detecting step detects said off-hook condition;

capturing a first digit dialed at said customer telephone equipment; and removing said dial tone in response to capturing said first dialed digit.

30. A method as claimed in claim 28 wherein said obtaining step comprises the step of automatically originating a call to a predetermined phone number.

31. A method as claimed in claim 28 additionally comprising the step of conducting calls directed to said MIN, said calls being conducted via RF communication.

32. A method as claimed in claim 31 wherein said conducting step comprises the steps of:

detecting an incoming call for said MIN;

generating a ring signal through said wiring to said customer telephone equipment in response to detecting said incoming call;

supplying a predetermined DC voltage through said wiring to said customer telephone equipment; and detecting when said customer telephone equipment goes off-hook.

33. A method of operating an RF link module with customer telephone equipment located at a customer's premises, said method comprising:

a) programming said RF link module to have a mobile identification number (MIN);

b) connecting said RF link module to customer premises wiring which couples to said customer telephone equipment;

c) detecting an inbound call directed to said MIN via RF communication;

d) deciding whether to generate a ring signal on said customer premises wiring in response to said inbound call; and e) automatically capturing a programming parameter from a remote programming system via RF communication when said deciding activity d) decides not to generate said ring signal on said customer premises wiring.

34. A method of operating an RF link module as claimed in claim 33 additionally comprising conducting a call directed to said MIN through said customer telephone equipment when said deciding activity d) decides to generate said ring signal on said customer premises wiring.

35. A method of operating an RF link module as claimed in claim 34 wherein said conducting activity comprises:

generating said ring signal through said wiring to said customer telephone equipment in response to said deciding activity d); and detecting when said customer telephone equipment goes off-hook in response to said ring signal.

36. A method of operating an RF link module as claimed in claim 33 wherein said RF link module includes a real time clock, and said programming parameter is one of a plurality of programming parameters, said programming parameters including a current date and time setting for said real time clock.

37. A method of operating an RF link module as claimed in claim 33 additionally comprising:

repetitively determining, after said capturing activity e), whether RF communication service is available; and indicating an alarm condition when said repetitively determining activity determines that no RF communication service is available.

38. An RF link module for providing wireless communication services to customer telephone equipment which connects to said RF link module through customer premises wiring, said RF link module comprising:

a processor unit configured to decide whether to apply a ring signal to said customer premises wiring when an incoming call directed to an identification number of said RF link module is detected;

a radio frequency transmitter and receiver coupled to said processor unit and configured with said processor unit to automatically capture a programming parameter from a remote programming system via wireless communication when said processor decides not to apply said ring signal to said customer premises wiring; and a telephone line interface module coupled to said radio frequency transmitter and receiver and to said customer premises wiring for sending said ring signal to said customer premises wiring when said processor decides to apply said ring signal to said customer premises wiring.

39. An RF link module as claimed in claim 38 additionally comprising:

a ring voltage generator coupled to said processor unit and said telephone line interface module and configured with said processor unit to apply said ring signal through said wiring to said customer telephone equipment in response to detecting an incoming call directed to said identification number of said RF link module; and a talk battery generator coupled to said telephone line interface module and configured to supply a predetermined DC voltage through said wiring to said customer telephone equipment.

40. An RF link module as claimed in claim 39 additionally comprising:

a dial tone generator coupled to said processor unit and to said telephone line interface module and configured with said processor unit to generate a dial tone through said wiring to said customer telephone equipment when said customer telephone equipment goes off-hook;

wherein said processor unit is further configured to capture a first digit dialed at said customer telephone equipment, remove said dial tone in response to capturing said first dialed digit, then capture a complete phone number dialed at said customer telephone equipment, and originate a wireless phone call using said captured phone number.

41. An RF link module as claimed in claim 40 wherein said dial tone generator is configured with said processor unit so that said dial tone is generated when said customer telephone equipment goes off-hook and said ring signal is not being generated on said customer premises wiring.

42. An RF link module as claimed in claim 38 additionally comprising:

a dial tone generator coupled to said processor unit and to said telephone line interface module and configured with said processor unit to supply a dial tone through said wiring to said customer telephone equipment when said customer telephone equipment goes off-hook;

wherein said processor unit is further configured to capture a first digit dialed at said customer telephone equipment, remove said dial tone in response to capturing said first dialed digit, then capture a complete phone number dialed at said customer telephone equipment, and originate a wireless phone call using said captured phone number.

43. An RF link module as claimed in claim 38 wherein:

said RF link module additionally comprises a real time clock; and said programming parameters include a current date and time setting for said real time clock.

44. An RF link module as claimed in claim 38 wherein:

said RF link module additionally comprises a status indicator coupled to said processor unit; and said processor unit is configured to repetitively determine whether radio service is available and to cause said status indicator to indicate an alarm condition when no radio service is available.

45. An RF link module as claimed in claim 44 wherein said processor unit is configured to log said alarm condition for later reporting.

* * * * *